US008001208B2

(12) United States Patent
Suzuki et al.

(10) Patent No.: US 8,001,208 B2
(45) Date of Patent: Aug. 16, 2011

(54) INFORMATION PROCESSING APPARATUS

(75) Inventors: Takaaki Suzuki, Osaka (JP); Makoto Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 1066 days.

(21) Appl. No.: 10/898,388

(22) Filed: Jul. 26, 2004

(65) Prior Publication Data

US 2005/0044201 A1   Feb. 24, 2005

Related U.S. Application Data

(60) Provisional application No. 60/552,282, filed on Mar. 12, 2004.

(30) Foreign Application Priority Data

Aug. 6, 2003   (JP) ................................. 2003-287626

(51) Int. Cl.
 G06F 15/16       (2006.01)
(52) U.S. Cl. ....................................... 709/217; 709/218
(58) Field of Classification Search .......... 709/217–220; 725/100, 131
See application file for complete search history.

(56) References Cited

U.S. PATENT DOCUMENTS

| 6,157,645 | A | 12/2000 | Shobatake | |
|---|---|---|---|---|
| 6,169,725 | B1 | 1/2001 | Gibbs et al. | |
| 6,219,839 | B1 * | 4/2001 | Sampsell | 725/40 |
| 6,285,408 | B1 | 9/2001 | Choi et al. | |
| 6,360,275 | B1 * | 3/2002 | Chu et al. | 709/245 |
| 6,407,998 | B1 * | 6/2002 | Polit et al. | 370/365 |
| 6,516,412 | B2 * | 2/2003 | Wasilewski et al. | 713/168 |
| 6,588,012 | B2 * | 7/2003 | Tanaka et al. | 725/29 |
| 6,954,641 | B2 * | 10/2005 | McKenna et al. | 455/435.1 |
| 6,981,044 | B1 | 12/2005 | Coez et al. | |
| 7,154,566 | B2 * | 12/2006 | Gustafson et al. | 348/734 |
| 7,178,157 | B1 * | 2/2007 | Kimura et al. | 725/38 |
| 7,181,759 | B2 * | 2/2007 | Oz et al. | 725/119 |
| 7,313,137 | B2 * | 12/2007 | Chasin | 370/390 |
| 7,383,341 | B1 * | 6/2008 | Saito et al. | 709/228 |
| 7,650,621 | B2 * | 1/2010 | Thomas et al. | 725/87 |
| 2001/0018768 | A1 | 8/2001 | Horiguchi et al. | |

(Continued)

FOREIGN PATENT DOCUMENTS

CN   1305676   7/2001

(Continued)

OTHER PUBLICATIONS

An article entitled "Sun Microsystems Jini™ Architectural Overview", Sun Microsystems ICG White Paper, Jan. 1999, pp. 1-27.
English Language Abstract of JP 8-289220.

Primary Examiner — Djenane M Bayard
Assistant Examiner — Ninos Donabed
(74) Attorney, Agent, or Firm — Greenblum & Bernstein, P.L.C.

(57) ABSTRACT

A device manager (2205*f*) of a broadcast receiving apparatus includes a device basic information management unit (3201) operable to hold a type and the number of devices handled by the device manager (2205*f*), and information regarding the individual devices, a device object management unit (3202) operable to manage one-to-one correspondences of objects representing devices, a device physical connection management unit (3203) operable to manage hardware configuration physical connection information of devices, a device logical connection management unit (3204) operable to manage logical connection statuses of devices, a device logical connection unit (3205) operable to logically connect devices, and a device logical connection cancellation unit (3206) operable to perform cancellation of a logical connection of devices.

33 Claims, 45 Drawing Sheets

U.S. PATENT DOCUMENTS

| | | |
|---|---|---|
| 2001/0028782 A1 | 10/2001 | Ohno et al. |
| 2001/0030959 A1* | 10/2001 | Ozawa et al. ............... 370/386 |
| 2002/0059646 A1* | 5/2002 | Kim ............................... 725/139 |
| 2002/0099800 A1* | 7/2002 | Brainard et al. ............. 709/219 |
| 2003/0005130 A1 | 1/2003 | Cheng |
| 2003/0028451 A1* | 2/2003 | Ananian ........................ 705/27 |
| 2003/0112367 A1* | 6/2003 | Kang et al. .................... 348/441 |
| 2003/0169724 A1* | 9/2003 | Mehta et al. .................. 370/352 |
| 2003/0192061 A1* | 10/2003 | Hwangbo et al. ............ 725/138 |
| 2004/0031052 A1* | 2/2004 | Wannamaker et al. ......... 725/61 |
| 2004/0054771 A1* | 3/2004 | Roe et al. ...................... 709/224 |
| 2004/0165610 A1* | 8/2004 | Chasin .......................... 370/428 |
| 2004/0203859 A1* | 10/2004 | Yuen et al. ................... 455/456.1 |

FOREIGN PATENT DOCUMENTS

| | | |
|---|---|---|
| EP | 1085759 | 3/2001 |
| FR | 2779595 | 12/1999 |
| JP | 8-289220 | 11/1996 |

\* cited by examiner

FIG. 3

| Frequency band | Application | Modulation scheme |
|---|---|---|
| 5~130MHz | Out Of Band (OOB) Data exchange between head-end and terminal | QPSK |
| 130~864MHz | In-Band Regular television broadcast including video/audio | QAM |

FIG. 4

| Frequency band | Application |
|---|---|
| 70~74MHz | Data transmission from head-end 101 to terminal apparatus |
| 10.0~10.1MHz | Data transmission from terminal apparatus A 111 to head-end 101 |
| 10.1~10.2MHz | Data transmission from terminal apparatus B 112 to head-end 101 |
| 10.2~10.3MHz | Data transmission from terminal apparatus C 113 to head-end 101 |

FIG. 5

| Frequency band | Application |
|---|---|
| 150~156MHz | Television channel 1 |
| 156~162MHz | Television channel 2 |
| ⋮ | ⋮ |
| 310~311MHz | Radio channel 1 |
| ⋮ | ⋮ |

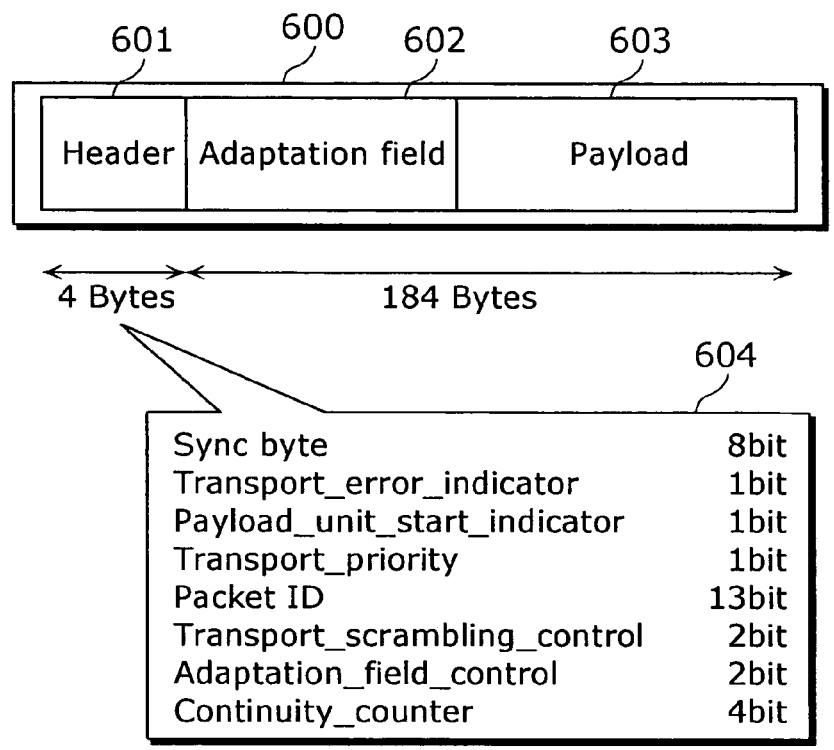
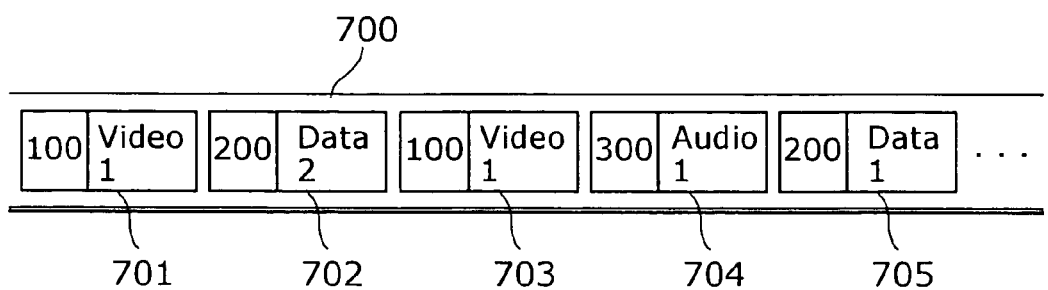

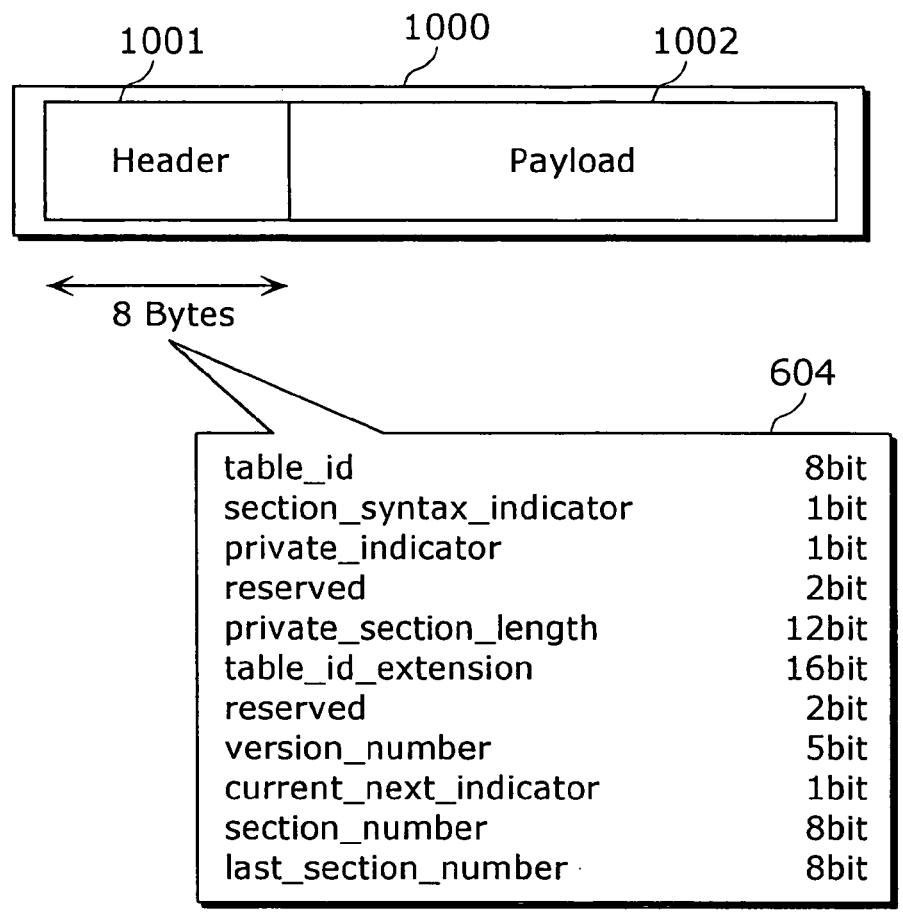

INFORMATION PROCESSING APPARATUS

CROSS-REFERENCE TO RELATED APPLICATIONS

This application claims the benefit of U.S. Provisional Application No. 60/552,282, filed Mar. 12, 2004, and also claims priority of Japanese Application No. 2003-287626, filed on Aug. 6, 2003.

TECHNICAL FIELD

The present invention relates to an information processing apparatus for executing a program, and particularly to a system for executing a program for using a plurality of devices that are unique to a broadcast receiving apparatus.

BACKGROUND ART

In hardware for broadcast receiving apparatuses represented by a television and a Set Top Box (STB), a configuration is adopted for realizing a greater function by forming an "information transfer path" series, where a plurality of devices having different functions are interconnected so that the output of one becomes the input of the other. For instance, taking the case of the outputting of images/sound onto a screen by a digital broadcast receiving apparatus, as an example, in terms of hardware, a "tuner device", a "TS decoder device", and an "AV decoder device" are connected, in the order of mention, to form an "information transfer path" series. The tuner device receives broadcast signals, and outputs a Motion Picture Expert Group-2 (MPEG-2) transport stream by filtering, using tuning information, such as frequency, or the like, as keys. The TS decoder device receives the MPEG-2 transport stream, and sorts out the MPEG-2 transport stream packet (hereinafter as TS packet) transmitting the desired video/audio data, from within the inputted MPEG-2 transport stream. It outputs a Packetized Elementary Stream (PES) packet containing the video/audio data transmitted by the matching TS packet. The AV decoder device receives the PES packet. It decodes the video/audio data transmitted by the PES packet, and outputs such decoded data in a form which can be displayed on-screen. Here, the accomplishment of the respective functions of each of the devices makes possible the display of images/sound onto a screen.

In order to carry out parallel processing in a broadcast receiving apparatus such as this, there are cases where a plurality of devices of the same type exists. For example, two tuner devices and two AV decoder devices exist, and these are connected to a TS decoder device. In addition, the TS decoder has a function for establishing "information transfer paths" in flexible combinations, with regard to the plurality of tuner devices and AV decoder devices. In such a case, it is possible to place the TS decoder device in between a tuner device A and an AV decoder device A to establish an "information transfer path 1", and place the TS decoder device in between a tuner device B and an AV decoder device B to establish an "information transfer path 2". In such a case, the "information transfer path 1" and the "information transfer path 2" demodulate MPEG-2 transport streams from a broadcast signal fully independently from one another, making possible the simultaneous decoding of a plurality of video/audio data, and enabling the realization of the so-called "Picture In Picture (hereinafter as PIP)" function for simultaneously displaying two types of images/sound on a single screen. In such devices, there is no necessity for implementing PIP at all times, and normally, single image display and PIP display can be switched, through inputs in a remote control, or the like, by a user. The "official publication of Japanese Laid-Open Patent Application No. 8-289220" is provided as a case in point for the method of use of each device, in cases such as the one above. This invention conceives a method for realizing PIP in a broadcast receiving apparatus having two tuner devices, one AV decoder, and one PIP data processing device. In this invention, the two tuners are ranked as a "main tuner" and an "insert screen tuner", and using the "insert screen tuner" during PIP display, enables the outputting of video/audio considered for selection, on a specified area of the screen, while the video/audio already selected, remains displayed on the entirety of the screen.

At present, a standard, referred to as Digital Video Broadcasting-Multimedia Home Platform (DVB-MHP), for operating an application on a broadcast receiving apparatus has been defined in Europe, and its operation has already begun. On the other hand, in the United States, Open Cable Application Platform (OCAP) standard, based on the DVB-MHP standard, is being laid out, and is scheduled to start operation sometime in 2005. In addition, the development and operation of similar standards is being pursued in other countries. A broadcast receiving apparatus, conforming to such application execution standards, is equipped with a function for executing a program obtained using a method such as downloading from a broadcast signal, and so on. Typical examples that can be given for such programs are games, Electrical Program Guide (EPG) applications, and so on.

Naturally, applications which simultaneously display a plurality of video/audio data on a single screen, such as the aforementioned PIP, advanced function EPG, and so on, are assumed as programs for execution on broadcast receiving apparatuses capable of program execution. In order to output a plurality of video/audio data simultaneously on a single screen, as represented in the example disclosed in the aforementioned patent, the control of multiple devices, particularly the setting of the "information transfer path" of each device, must be performed properly. In OCAP/DVB-MHP API (Application Program Interface), the function for individually controlling a tuner device, a TS decoder device, an AV decoder device, and so on, is already provided, and the implementation of such an application is not impossible, even under current conditions. Unfortunately, there is no function for setting an "information transfer path" between the individual devices in the current standard. For example, it is not possible to perform a designation to establish an "information transfer path" between a tuner device A, from among a plurality of tuner devices, and a certain TS decoder device B, from among a plurality of TS decoder devices. In OCAP/DVB-MHP, during video/audio outputting, for example, first the demodulation of an MPEG-2 transport stream transmitting video/audio data for outputting is set by furnishing tuning information such as frequency, and so on, to the tuner device. Next, an identifier for the video/audio data to be outputted to the AV decoder is set. At this point, a program, referred to as "middleware" (hereinafter as OCAP/DVB-MHP middleware), for implementing the functions prescribed in the OCAP/DVB-MHP standard by using the functions found in the OS of a broadcast receiving apparatus, searches within the broadcast receiving apparatus for the tuner device that outputs the MPEG-2 transport stream that includes the video/audio data pointed out by the identifier designated by the AV decoder. If such tuner device is found, a TS decoder is placed in between, with respect to the two devices, and an "information transfer path" is implicitly established.

Standards such as these, relieve a program from complicated processes concerning device management, and at first glance, seem beneficial to a program. However, from an opposite viewpoint, the implicit establishment of "information transfer paths" by middleware means that the program is unable to manage "information transfer paths". For example, consider the hardware configuration shown in FIG. 1. FIG. 1 illustrates a digital broadcast receiving apparatus having a structure with two tuners (tuner 101a and tuner 101b), and two AV decoders (AV decoder 103a and AV decoder 103b), which are respectively connected via a TS decoder 102. Consider the operation of a PIP program on the present hardware. In FIG. 1, since two tuners and two AV decoders exist in terms of hardware, if all of such devices are taken and two "information transfer paths", between the tuner 101a and the AV decoder 103a, and between the tuner 101b and the AV decoder 103b, via the TS decoder 102, are established, a PIP program able to fully separate and switch two sets of images can be realized. However, in current OCAP/DVB-MHP middleware, there is no function for establishing "information transfer paths" between devices. At the point when a PIP program specifies video and audio data and issues a decode request, an "information transfer path" is implicitly established between an AV decoder and a tuner demodulating the MPEG-2 transport stream which includes such video and audio data, via a TS decoder. As such, for example, in the case where a decode request for video/audio data within the same MPEG-2 transport stream is issued to two AV decoders, it is possible to have "information transfer paths" being established between a single tuner and the two AV decoders. In terms of the example in FIG. 1, "information transfer paths" would be set, via the TS decoder 102, between the tuner 101a and the AV decoder 103a, as well as between the tuner 101a and the AV decoder 103b. In such a case, and additionally, in the case where the implementation of the OCAP/DVB-MHP middleware is such that an "information transfer path" established once between an AV decoder and a tuner is maintained, and where the "information transfer path" established first, is used for decode requests issued thereafter to AV decoders, the PIP program will only be able to use one tuner from then on, and the two AV decoders will only be able to simultaneously decode video data within the same MPEG-2 transport stream.

A method that promotes in middleware, the implicit establishment of "information transfer paths" between devices in the above manner, reduces the burdens related to device controlling for a program, but at the same time also reduces the flexibility with regard to device management. In addition, as shown in the example using FIG. 1, since the dependency of program operations on the implementation of middleware is increased, there is a possibility of causing such instability as having a program operate differently for each environment.

DISCLOSURE OF THE INVENTION

Thus, the present invention was conceived in view of the aforementioned circumstances, and has providing an information processing apparatus which is able to control the setting of an information transfer path between devices from a program (application program), as an objective.

In order to achieve the aforementioned objective, the information processing apparatus in the present invention is an information processing apparatus having a plurality of devices for executing specific functions, the information processing apparatus including a program execution unit operable to execute a program, and a device management unit operable to manage information regarding the devices, as well as set an information transfer path between the devices, wherein the device management unit includes an information path setting unit operable to set an information transfer path between the devices based on a request from the program executed by the program execution unit.

Accordingly, it is possible for the program executed by the program execution unit to set an information transfer path in terms of hardware.

Here, the device management unit may further include a device identifier notification unit operable to notify the program executed by the program execution unit of device identifiers for identifying the devices, based on a request from the program, and the information path setting unit may set an information transfer path in a designated sequence between devices designated by the program using a plurality of device identifiers.

Furthermore, the information path setting unit may set an information transfer path between two designated devices, in the case where the two devices are designated by the program using two device identifiers.

Furthermore, the information path setting unit may set an information transfer path in a designated sequence between two or more designated devices, in the case where the two or more devices are designated by the program using two or more device identifiers.

Accordingly, it is possible for the program to set an information transfer path in terms of hardware by designating devices.

In addition, the device identifier notification unit may notify the program of the device identifiers corresponding to devices that are of a type designated by the program.

Accordingly, it is possible for the program to obtain only the device identifiers of the devices that match the type of the device to be used thereby.

Furthermore, the device identifier notification unit may notify the program of the device identifiers corresponding to all devices that can be set in an information transfer path with a device specified by a device identifier designated by the program.

Accordingly, it is possible for the program to obtain the device identifiers indicating the devices that can be set in an information transfer path with the designated device.

Furthermore, the device identifier notification unit may notify the program of the device identifiers corresponding to all devices that are set in an information transfer path with a device specified by a device identifier designated by the program.

Accordingly, it is possible for the program to obtain the device identifiers indicating the devices that are already set in an information transfer path with a designated device.

Furthermore, the device identifier notification unit may notify the program of the device identifiers corresponding to devices that can be set in an information transfer path with a specified device, and at the same time, are not yet a part of an information transfer path, said specified device being specified by a device identifier designated by the program.

Accordingly, it is possible for the program to obtain the device identifiers indicating the devices that can be immediately set in an information transfer path with a designated device.

Furthermore, the device management unit may further include a device shareability notification unit operable to notify the program of whether or not a device specified by a device identifier designated by the program can be set in a plurality of information transfer paths.

Accordingly, it is possible for the program to obtain a judgment result of whether or not the designated device can be set in a plurality of information transfer paths.

Here, the device shareability notification unit may notify the program of whether or not a device specified by a device identifier designated by the program can be set in a plurality of information transfer paths, by sending notice of a maximum number of information transfer paths in which the device can be set in.

Accordingly, it is possible for the program to obtain the number of information transfer paths in which the designated device can be set in, and in addition, it is possible to perform a judgment as to whether or not the device can be set in a plurality of information transfer paths.

Furthermore, the device management unit may further include a function interpretation unit operable to specify devices that are necessary for realizing a greater function, based on a function identifier which indicates the greater function realized by a plurality of the devices, and the information path setting unit may set an information transfer path between the devices specified by the function interpretation unit.

Accordingly, it is possible to set an information transfer path without designating individual devices.

Furthermore, the program receives a response from the device management unit and may synchronously resume a process, when the program makes a request to the device management unit.

Accordingly, it is possible for the program executed by the program execution unit to easily recognize a timing of a conclusion of an information path setting.

Furthermore, the program may asynchronously execute a process regardless of a response from the device management unit, when the program makes a request to the device management unit.

Accordingly, it is possible for the program executed by the program execution unit to proceed with another process thereof, while the information processing apparatus performs information path setting.

Furthermore, the information path setting unit may not set a new information transfer path, in the case where any of a plurality of devices designated by the program is already set as a part of another information transfer path.

Accordingly, it is possible to protect an information transfer path that is already set, from unintended modification.

Furthermore, the information path setting unit may notify the program of a process result indicating whether a setting of an information transfer path between a plurality of devices designated by the program succeeds or fails.

Accordingly, it is possible for the program executed by the program execution unit to acquire the process result of the information transfer path.

Furthermore, the information path setting unit may notify the program of a reason for failure, in the case where the setting of the information transfer path between the plurality of devices designated by the program fails.

Accordingly, it is possible for the program executed by the program execution unit to obtain the reason for the failure of an information transfer path setting.

Furthermore, the device management unit may further include an information path cancellation unit operable to perform setting cancellation of the information transfer path set between devices, based on a request from the program executed by the program execution unit.

Accordingly, it is possible for the program to cancel an information transfer path that has been set.

Furthermore, the device management unit may further include a device identifier notification unit operable to notify the program executed by the program execution unit of device identifiers for identifying the devices, based on a request from the program, and the information path cancellation unit may perform setting cancellation of the information transfer path set in a designated sequence between devices designated by the program using a plurality of device identifiers.

Furthermore, the information path cancellation unit may perform setting cancellation of an information transfer path set between two designated devices, in the case where the two devices are designated by the program using two device identifiers.

Furthermore, the information path cancellation unit may perform setting cancellation of an information transfer path set in a designated sequence between two or more designated devices, in the case where the two or more devices are designated by the program using two or more device identifiers.

Accordingly, it is possible for the program to cancel an information transfer path that has been set, by designating devices.

Furthermore, the device management unit may further include a function interpretation unit operable to specify devices that are necessary for realizing a greater function, based on a function identifier which indicates the greater function realized by a plurality of the devices, and the information path cancellation unit may perform setting cancellation of an information transfer path set between the devices specified by the function interpretation unit.

Accordingly, it is possible to cancel an information transfer path without designating individual devices.

Furthermore, the information path cancellation unit may notify the program of a process result indicating whether a setting cancellation of an information transfer path between a plurality of devices designated by the program succeeds or fails.

Accordingly, it is possible for the program to acquire the process result of an information transfer path cancellation.

Furthermore, the information path cancellation unit may notify the program of a reason for failure, in the case where the setting cancellation of the information transfer path between the plurality of devices designated by the program fails.

Accordingly, it is possible for the program to obtain the reason for the failure of a cancellation of an information transfer path.

Furthermore, the device management unit may further include a device number notification unit operable to notify the program of a number of the devices existing in the information processing apparatus, based on a request from the program executed by the program execution unit.

Accordingly, it is possible for the program to obtain the number of the devices existing in the information processing apparatus.

Furthermore, the device number notification unit may notify the program of the number of devices corresponding to a type of a device, said type being designated by the program.

Accordingly, it is possible for the program to obtain the number of devices that match the type of the device to be used thereby.

Furthermore, the device management unit may further include a path setting possibility notification unit operable to notify the program of whether or not an information transfer path can be set between the devices, based on a request by the program executed by the program execution unit.

Accordingly, it is possible for the program to acquire in advance, a judgment as to whether or not an information transfer path can be set.

Furthermore, the device management unit may further include a device identifier notification unit operable to notify the program executed by the program execution unit of device identifiers for identifying the devices, based on a request from the program, and the path setting possibility notification unit may notify the program of whether or not an information transfer path can be set in a designated sequence between devices designated by the program using a plurality of device identifiers.

Accordingly, it is possible for the program to obtain in advance, a judgment as to whether or not an information transfer path can be set by designating devices.

Furthermore, the path setting possibility notification unit may notify the program of whether or not an information transfer path can be set between two designated devices, in the case where the two devices are designated by the program using two device identifiers.

Accordingly, it is possible for the program to obtain a judgment as to whether or not an information transfer path can be set between two devices.

Furthermore, the path setting possibility notification unit may notify the program of whether or not an information transfer path can be set in a designated sequence between two or more designated devices, in the case where the two or more devices are designated by the program using two or more device identifiers.

Accordingly, it is possible for the program to obtain a judgment as to whether or not an information transfer path can be set between two or more devices.

Furthermore, the device management unit may further include a function interpretation unit operable to specify devices that are necessary for realizing a greater function, based on a function identifier which indicates the greater function realized by a plurality of the devices, and the path setting possibility notification unit may notify the program of whether or not an information transfer path can be set between the devices specified by the function interpretation unit.

Accordingly, it is possible for the program to obtain a judgment as to whether or not a required information transfer path can be set without designating individual devices.

Furthermore, the device management unit may further include a path status notification unit operable to notify the program of whether or not an information transfer path is set between the devices, based on a request from the program executed by the program execution unit.

Accordingly, it is possible for the program to obtain a judgment as to whether or not an information transfer path is already set between the devices.

Furthermore, the device management unit may further include a device identifier notification unit operable to notify the program executed by the program execution unit of device identifiers for identifying the devices, based on a request from the program, and the path status notification unit may notify the program of whether or not an information transfer path is set in a designated sequence between the devices designated by the program using a plurality of device identifiers.

Accordingly, it is possible for the program to obtain a judgment as to whether or not an information transfer path is already set between the devices, by designating devices.

Furthermore, the path status notification unit may notify the program of whether or not an information transfer path is set between two designated devices, in the case where the two devices are designated by the program using two device identifiers.

Accordingly, it is possible for the program to obtain a judgment as to whether or not an information transfer path is already set between two devices.

Furthermore, the path status notification unit may notify the program of whether or not an information transfer path is set in a designated sequence between two or more designated devices, in the case where the two or more devices are designated by the program using two or more device identifiers.

Accordingly, it is possible for the program to obtain a judgment as to whether or not an information transfer path is already set between two or more devices.

Furthermore, the device management unit may further include a function interpretation unit operable to specify devices that are necessary for realizing a greater function, based on a function identifier which indicates the greater function realized by a plurality of the devices, and the path setting possibility notification unit may notify the program of whether or not an information transfer path is set between the devices specified by the function interpretation unit.

Accordingly, it is possible for the program to obtain a judgment as to whether or not a required information transfer path is already set without designating individual devices.

Furthermore, the information path setting unit may always preferentially set an information transfer path which has been requested first, in the case where setting of information transfer paths which include the same device are requested by a plurality of programs executed by the program execution unit.

Accordingly, it is possible to settle a competition among a plurality of programs, for a device.

Furthermore, the program execution unit may manage priority levels among a plurality of programs, and perform program priority comparison using the priority levels.

Accordingly, it is possible to have a device management which is consistent in that, when a competition among a plurality of programs for a device occurs, a program having a higher priority level is given authority to use the device.

Furthermore, the information path setting unit may always preferentially set an information transfer path for a program having a high priority level, in the case where setting of information transfer paths which include the same device are requested by a plurality of programs executed by the program execution unit.

Accordingly, it is possible for a program having a high priority level to set an information transfer path, when a competition among a plurality of programs for a device occurs.

Furthermore, in the case where, after setting an earlier information transfer path, a setting of an information transfer path including a device set in the earlier information transfer path is requested by another program having a higher priority level, the information path setting unit may set the information transfer path requested by said another program and notify a program which requested the earlier information transfer path about the setting.

Accordingly, it is possible for the program having a low priority level, which requested the earlier information transfer path, to know that a device within the information transfer path has been taken.

Furthermore, in the case where the device set in the earlier information transfer path and then set in the information transfer path requested by said another program becomes usable again, the information path setting unit may notify the program which requested the earlier information transfer path that the device is usable again.

Accordingly, it is possible for the program having a low priority level, which requested the earlier information transfer path, to know that the device which was taken has become usable again.

Furthermore, in the case where the device set in the earlier information transfer path, and then set in the information transfer path requested by said another program becomes usable again, the information path setting unit may reset the earlier information transfer path and notify the program which requested the earlier information transfer path, of the resetting.

Accordingly, it is possible for the program having a low priority level, which requested the earlier information transfer path, to know that the device which was taken has become useable again and the information transfer path has been reset.

Furthermore, it is preferable that the device management unit controls the device according to a request from the program, and notifies the program of information regarding the device according to a request from the program.

In other words, the device management unit is middleware, and is able to control the setting of an information transfer path between devices, from the program executed by the program execution unit.

In addition, the present invention can be realized not only as an information processing apparatus such as this. The present invention can also be realized as an information processing method which includes, as steps, means that are characteristic of an information processing apparatus such as this, and also as a program which causes a computer to execute such steps. Furthermore, it goes without saying that such a program can be distributed via recording media such as a CD-ROM, or transmission media such as the internet, or the like.

As is clear from the aforementioned explanation, according to the information processing apparatus in the present invention, it is possible to control the setting of an information transfer path from a program (application program).

Further Information about Technical Background to this Application

The disclosure of Japanese Patent Application No. 2003-287626 filed on Aug. 6, 2003 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 3 shows an example of the use of the frequency band range used in transmission between a broadcast station-side system and terminal apparatuses, in a cable television system, in the present invention.

FIG. 4 shows an example of the use of the frequency band range used in transmission between a broadcast station-side system and terminal apparatuses, in a cable television system, in the present invention.

FIG. 5 shows an example of the use of the frequency band range used in transmission between a broadcast station-side system and terminal apparatuses, in a cable television system, in the present invention.

FIG. 6 is a structure diagram of a TS packet defined in the MPEG-2 specification.

FIG. 7 is a pattern diagram of an MPEG-2 transport stream.

FIG. 10 is a structure diagram of an MPEG-2 section defined in the MPEG-2 specification.

FIG. 11 is an example of the use of an MPEG-2 section defined in the MPEG-2 specification.

BEST MODE FOR CARRYING OUT THE INVENTION

First Embodiment

The present invention assumes the three types of operational configurations, namely a satellite system, a terrestrial system, and a cable system, as its target broadcast systems. The satellite system is a configuration that uses a satellite to transmit broadcast signals to a broadcast receiving apparatus. The terrestrial system is a configuration that uses a terrestrial signal transmitter to transmit broadcast signals to a broadcast receiving apparatus. The cable system is a configuration that uses a cable head-end to transmit broadcast signals to a broadcast receiving apparatus. As the present invention does not bear a direct relation to the differences in each broadcast system, it is applicable, irrespective of the broadcast system.

Figure 1:
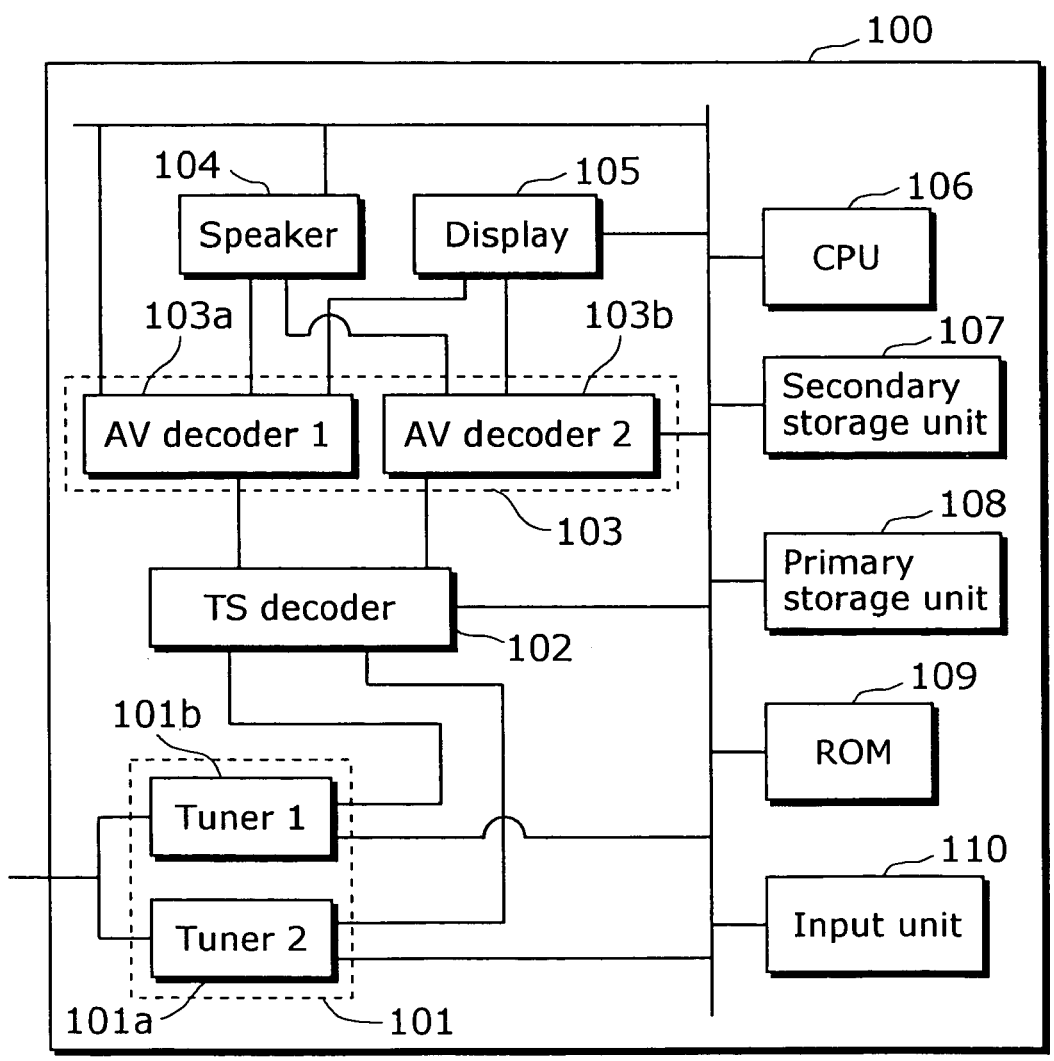
FIG. 1 is a hardware configuration diagram for explaining the issues in the present invention.
Figure 2:
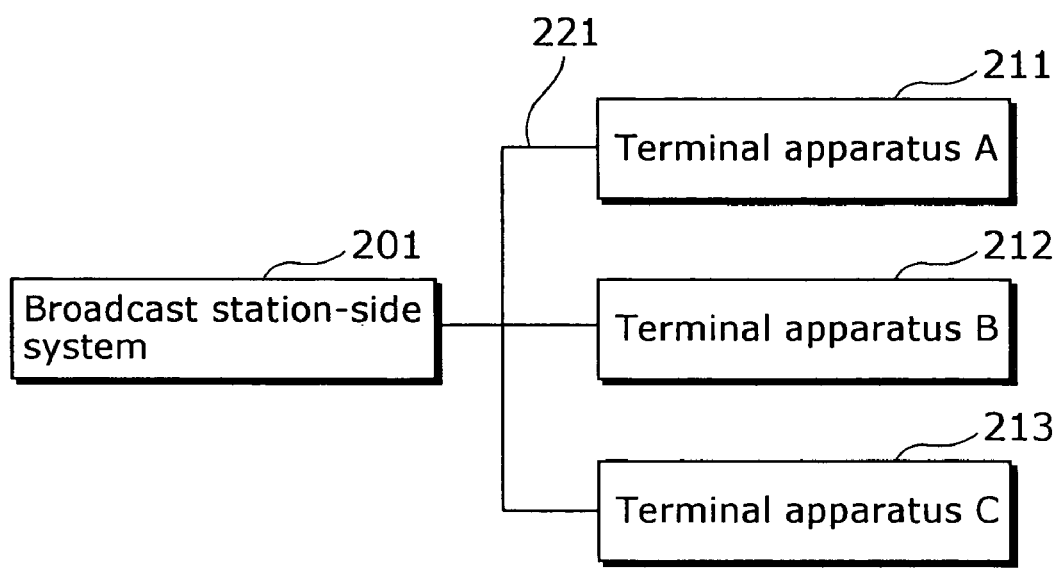
FIG. 2 is a diagram of a configuration of the broadcast system in the present invention.

The embodiments of the broadcast system concerning the present invention shall be explained with reference to the diagrams. FIG. 2 is a block diagram showing the relationship of devices making up a broadcast system, and is made up of a broadcast station-side system 201, and three terminal apparatuses, namely a terminal apparatus A 211, a terminal apparatus B212, and a terminal apparatus C 213. There are wired and wireless cases for the link 221 between the broadcast station-side system and each terminal apparatus. For example, in a cable system, a broadcast station-side system and each terminal apparatus are linked by wire. On the other hand, between a broadcast station-side system and each terminal apparatus in a satellite/terrestrial system, there are no wire links for the downward direction (from the broadcast station-side system to each terminal apparatus), and a broadcast signal is transmitted using radio waves. For the upward direction (from each terminal apparatus to the broadcast-side system), both cases of wired links such as telephone lines and wired internet, and wireless links which use wireless communication, exist. Each terminal apparatus transmits information such as user inputs, to the broadcast station-side system. Although the broadcast station-side system is linked to three terminal apparatuses in the present embodiment, the present invention is still applicable even when an arbitrary number of terminal apparatuses are linked to the broadcast station-side system.

The broadcast station-side system 201 includes data for video, audio and data broadcasting, and the like, into broadcast signals and transmits such signals to a plurality of terminal apparatuses. Broadcast signals are transmitted using a frequency within a frequency band set according to the prescribed operation of a broadcasting system, the laws of a region or country where a broadcast system operates, or the like.

An example of a prescribed broadcast signal transmission is given as an example. In the cable system shown in this example, the frequency band used for broadcast signal transmission is partitioned and used according to the content of the data and the direction of the transmission (upward, downward). FIG. 3 is a table showing an example of a frequency band partition. The frequency band is mainly partitioned into two types, namely Out Of Band (abbreviated as OOB) and In-Band. 5 to 130 MHz is allocated for OOB, and is mainly used for the exchange of data between the broadcast station-side system 201 and the terminal apparatus A 211, the terminal apparatus B 212, and the terminal apparatus C 213. 130 MHz to 864 MHz is allocated for In-Band, and is used mainly for broadcast channels which include video/audio. The QPSK modulation scheme is used in the OOB, and the QAM64 or QAM256 modulation schemes are used in the In-Band frequencies. Detailed explanation regarding modulation scheme technology shall be omitted as it is public knowledge of limited concern in the present invention. FIG. 4 shows a more detailed example of the use of the OOB frequency band. 70 MHz to 74 MHz is used for data transmission from the broadcast station-side system 201, with all the terminal apparatus A 211, terminal apparatus B 212, and terminal apparatus C 213, receiving the same data from the broadcast station-side system 201. On the other hand, 10.0 MHz to 10.1 MHz is used for the data transmission from the terminal apparatus A 211 to the broadcast station-side system 201, 10.1 MHz to 10.2 MHz is used for the data transmission from the terminal apparatus B 212 to the broadcast station-side system 201, and 10.2 MHz to 10.3 MHz is used for the data transmission from the terminal apparatus C 213 to the broadcast station-side system 201. Through this, data specific to each terminal apparatus can be transmitted to the broadcast station-side system 201 from each of the terminal apparatus A 211, terminal apparatus B 212, and terminal apparatus C 213. FIG. 5 shows an example for the use of the In-Band frequency band. 150 to 156 MHz and 156 to 162 MHz are allotted to a television channel 1 and a television channel 2, respectively, with frequencies subsequently being allotted to television channels in 6 MHz intervals. 310 MHz onwards is allotted to radio channels in 1 MHz units. Each of the respective channels may be used for analog broadcast or digital broadcast. In the case of digital broadcast, data is transmitted in the TS Packet format based on the MPEG-2 standard, and in addition to audio and video, various types of data for data broadcasting can also be transmitted.

In order to transmit the appropriate broadcast signal to a terminal apparatus using the respective frequency bands, the broadcast station-side system 201 has a QPSK modulation unit, a QAM modulation unit, and so on. In addition, in order to receive data from a terminal apparatus, it has a QPSK demodulation device. Moreover, the broadcast station-side system 201 is assumed to possess the various devices associated with the respective modulation units, as well as the demodulation unit. However, as the present invention is mainly concerned with a terminal apparatus, detailed explanation shall be omitted.

The terminal apparatus A 211, terminal apparatus B 212, and terminal apparatus C 213 receive and reproduce the broadcast signal from the broadcast station-side system 201. In addition, they transmit data which is specific to each terminal apparatus to the broadcast station-side system 201. The three terminal apparatuses adopt the same configuration in the present embodiment.

Moreover, although the details of an example regarding the operation of a cable system are introduced in the present example, the present invention can also be applied to configurations other than a satellite, a terrestrial system, as well as a cable system. In satellite and terrestrial systems, both wired and wireless cases exist in the links between the broadcast station-side system and each terminal apparatus, as previously mentioned. Moreover, the frequency bands, frequency interval, modulation scheme, broadcast station-side system configuration, and so on, are different depending on the type, operation, and so on, of the broadcast system. However, these bear no relevance to the present invention and the present invention can be applied regardless of how they are prescribed.

The broadcast station-side system 201 modulates an MPEG-2 transport stream and transmits it by including it in a broadcast signal. A broadcast receiving apparatus receives and demodulates the broadcast signal. It then replicates the MPEG-2 transport stream from within which it extracts and uses necessary information. In order to explain the functions and the structure of connections of the devices present in the digital broadcast receiving apparatus, first the structure of an MPEG-2 transport stream shall be described in brief.

FIG. 6 is a diagram showing the structure of a TS packet. A TS packet 600 has a length of 188 bytes, and is made up of a header 601, an adaptation field 602, and a payload 603. The header 601 holds the control information of the TS packet. It has a length of 4 bytes and adopts a structure as shown in 604. A field described as a "Packet ID (hereinafter as PID)" is carried within this, and the identification of a TS packet is performed using the value of the PID. The adaptation field 602 holds additional information such as time information, and so on. The existence of the adaptation field 602 is not essential and there are cases where it is not present. The payload 603 holds the information transmitted by the TS packet such as video/audio, data for data broadcasting, and so on.

FIG. 7 is a schematic diagram of an MPEG-2 transport stream. A TS packet 701 and a TS packet 703 hold a PID 100 in the header, and hold information regarding a video 1 in the payload. A TS packet 702 and A TS packet 705 hold a PID 200 in the header, and hold information regarding data 1 in the payload. A TS packet 704 holds a PID 300 in the header, and holds information regarding audio 1 in the payload.

The MPEG-2 transport stream 700 is made up of consecutive TS packets such as the TS packets 701 to 705. The TS packet holds, in its payload, a variety of information such as video and audio, data for data broadcasting, and so on. The broadcast receiving apparatus receives a TS packet and, by extracting the information held by each TS packet, reproduces the video/audio and uses data such as program information, and so on. At this point, TS packets holding the same PID hold the same type of information. So in FIG. 7, the TS packet 701 and the TS packet 703 both transmit information regarding the video 1, and the TS packet 702 and the TS packet 705 both transmit information regarding the data 1.

Figure 8:
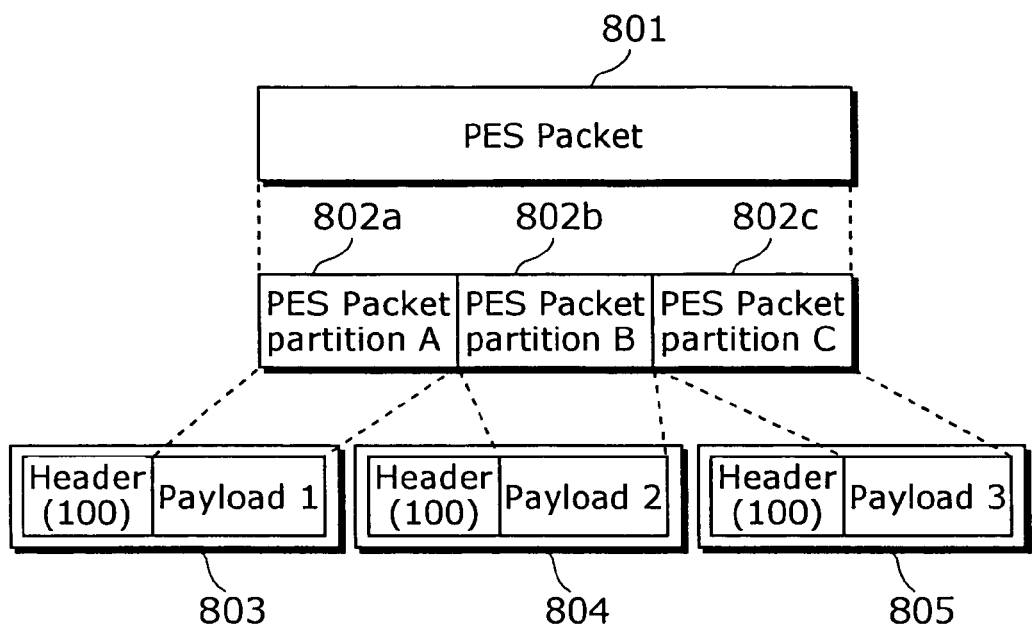
FIG. 8 shows an example of a partitioning during the transmission of a PES packet defined in the MPEG-2 specification, using a TS packet.

Video and audio are represented in a format referred to as a Packetized Elementary Stream (PES) packet. During the actual transmission of a PES packet, the PES packet is partitioned and stored into several TS packets. FIG. 8 shows an example of the partitioning during a PES packet transmission. As a PES packet 801 is too large to be stored and transmitted in the payload inside a single TS packet, it is partitioned into a PES packet partition A 802a, a PES packet partition B 802b, and a PES packet partition C 802c, and transmitted by way of the three TS packets 803 to 805 having the same PID. Moreover, depending on the operation, a PES packet transmits not only video/audio data, but also data for captions referred to as subtitle.

Figure 9:
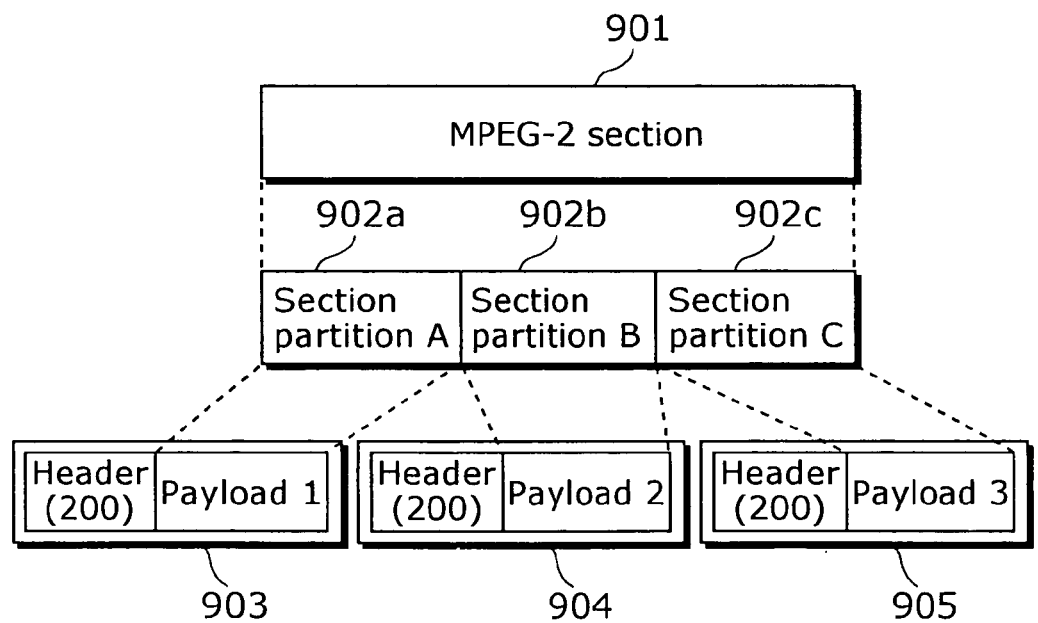
FIG. 9 shows an example of a partitioning during the transmission of an MPEG-2 section defined in the MPEG-2 specification, using a TS packet.

Program information, data for data broadcasting, and so on, are represented using a format referred to as MPEG-2 section. During the actual transmission of an MPEG-2 section, the MPEG-2 section is partitioned and stored into several TS packets. FIG. 9 shows an example of the partitioning during the transmission of an MPEG-2 section. As an MPEG-2 section 901 is too large to be to be stored and transmitted in the payload inside a single TS packet, it is partitioned into a section partition A 902a, a section partition B 902b, and a section partition C 902c, and transmitted by way of the three TS packets 903 to 905 having the same PID.

FIG. 10 represents the structure of an MPEG-2 section. An MPEG-2 section 1000 is made up of a header 1001 and a payload 1002. The header 1001 holds the control information of the MPEG-2 section. Its structure is represented by the header structure 1003. The payload 1002 holds the data transmitted by the MPEG-2 section 1000. A table_id found in the header structure 1003 represents the type of the MPEG-2 section. In addition, table_id_extension is an extended identifier to be used in differentiating MPEG-2 sections having roughly the same table_id. FIG. 11 provides a case where program information is transmitted, as an example of the use of an MPEG-2 section. In this example, as listed in row 1104, the information necessary for demodulating a broadcast signal is listed in the MPEG-2 section having a table_id of 64 in the header structure 1003. In addition such MPEG-2 section is transmitted by a TS packet assigned with a PID of 16.

In this manner, MPEG-2 transport streams adopt a hierarchal structure in order to transmit a variety of information. A broadcast reproduction apparatus is required to advance along the hierarchal structure of the MPEG-2 transport stream while extracting the information contained by the MPEG-2 transport stream existing in a broadcast signal, and is equipped with the devices for such purpose. The respective devices are physically interconnected so that the output of one becomes the input of the other. Furthermore, when a plurality of the same type of device exists, aside from merely being physically connected, there is a need to establish an "information transfer path" indicating "which among the same type devices to input to?", or "which among the same type devices' output should be received?" For example, even in an environment where a plurality of tuners, one TS decoder, and a plurality of AV decoders exist, and where the TS coder is "physically" connected to all the tuners and AV decoders, during the actual decoding of a single set of video/audio data, there is a need to establish a "information transfer path" by "logically" connecting a single tuner with a single AV decoder via the TS decoder. The phrases "physical connection", "logical connection", and "device logical connection path" to be used in all the embodiments hereinafter shall be defined.

"Physical connection" indicates that devices are connected, in terms of hardware. In saying that a device A and a device B are "physically connected", this indicates that the device A and the device B are connected in terms of hardware.

"Logical connection" indicates that devices are not only "physically connected" but that they also form an "information transfer path". In saying that the device A and the device B are "logically connected", this indicates that a "data transfer path" is established in such a way that the output of the device A becomes the input of the device B, or alternatively, in such a way that the output of the device B becomes the input of the device A.

"Device logical connection path" refers to the "data transfer path" itself.

The "physical connection" of the device A and the device B is the minimum condition for the "logical connection" of the device A and the device B. In the case where the device A and the device B are not "physically connected", the "logical connection" of the device A and the device B is not possible. In the case where the device A and the device B are "logically connected", naturally, the device A and the device B are "physically connected."

Hereinafter, the circumstances forming the premise of the present embodiment shall be explained.

Figure 12:
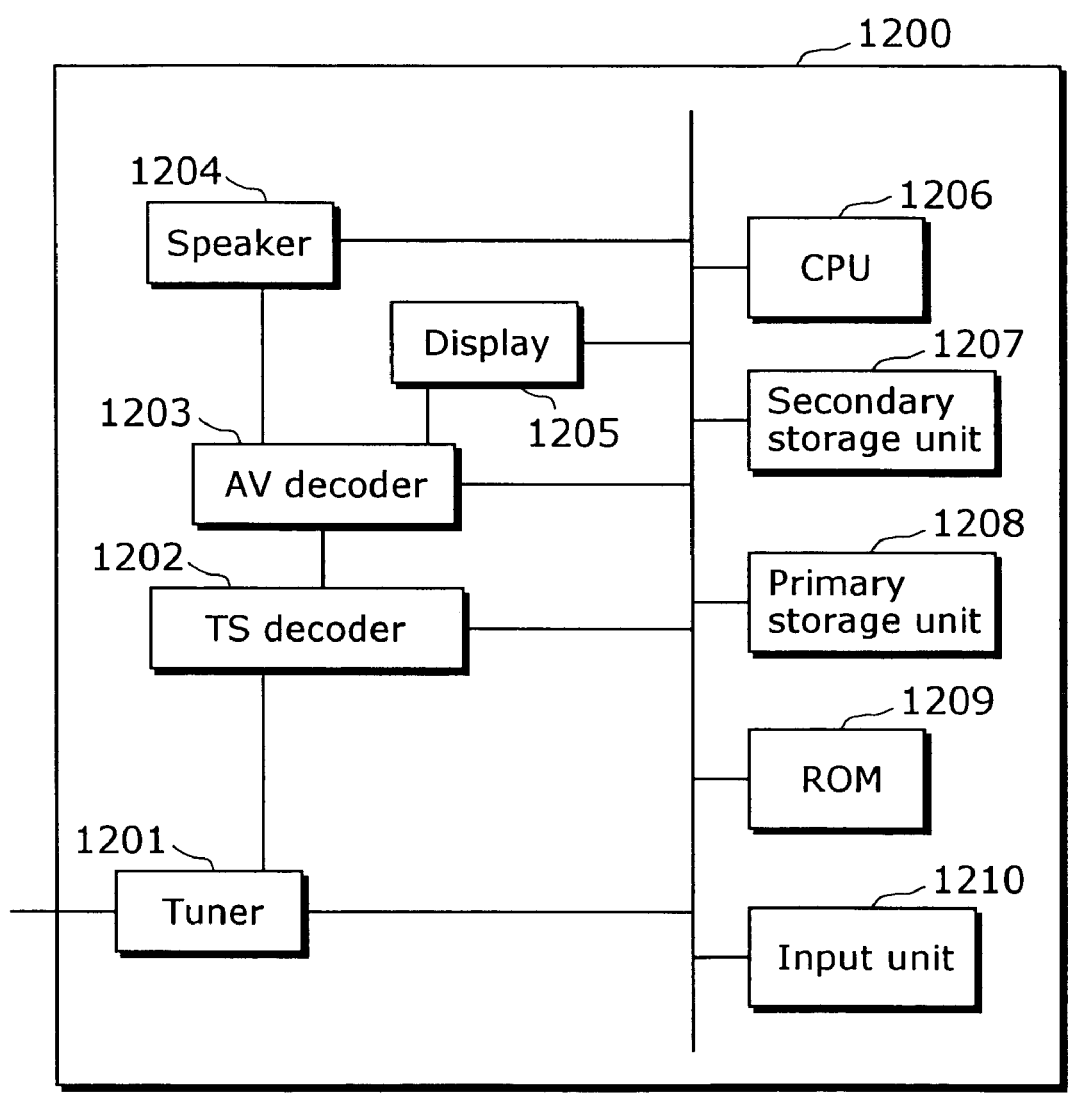
FIG. 12 shows a configuration example of the hardware configuration of a broadcast receiving apparatus in the present invention.

FIG. 12 is a block diagram showing a typical hardware configuration of a digital broadcast receiving apparatus. A terminal apparatus 1200 is made up of a tuner 1201, a TS decoder 1202, an AV decoder 1203, a speaker 1204, a display 1205, a CPU 1206, a secondary storage unit 1207, a primary storage unit 1208, a ROM 1209, and an input unit 1210.

The tuner 1201 is a device that demodulates, according to tuning information which includes the frequency designated by the CPU 1206, a broadcast signal modulated and transmitted from the broadcast station-side system 201. The MPEG-2 transport stream obtained from the demodulation by the tuner 1201 is transmitted to the TS decoder 1202.

The TS decoder 1202 is a device equipped with the function to sort out, from an MPEG-2 transport stream, the PES packet, MPEG-2 section, or the like, that matches designated conditions, based on the designation of the PID and the section sorting condition, and so on, designated by the CPU 1206. The PES packet sorted out by the TS decoder 1202 is transmitted to the AV decoder 1203. In addition, the MPEG-2 section sorted out by the TS decoder 1202 undergoes a Direct Memory Access (DMA) transfer to the primary storage unit 1208, to be used by a program executed by the CPU 1206. Moreover, aside from having the aforementioned PES packet and MPEG-2 section sorting function, the TS decoder 1202 also has other functions such as a function for decoding (descrambling) a coded (scrambled) PES packet and MPEG-2 section, and a function for transmitting an inputted MPEG transport stream to another device which is physically connected to the TS decoder 1202.

The AV decoder 1203 is a device which possesses the function for decoding digitally encoded video and audio. The AV signal obtained from the decoding by the AV decoder 1203 is transmitted to the speaker 1204 and the display 1205. Moreover, there are also cases where the AV decoder 1203 cannot always decode video and audio simultaneously. It is also possible to have a video decoder and an audio decoder existing as separate units. Moreover, in some circumstances, there are cases where the AV decoder 1203 also possesses a function for decoding subtitle data.

The speaker 1204 and the display 1205 are devices possessing the function for respectively outputting the audio and video transmitted from the AV decoder 1203.

The CPU 1206 executes a program operating on a broadcast receiving apparatus. There are cases where the program executed by the CPU 1206 is included in the ROM 1209, cases where it is downloaded from a broadcast signal, network, or the like, and held in the primary storage unit 1208, cases where it is downloaded from a broadcast signal, network, or the like, and stored in the secondary storage unit 1207, and so on. The tuner 1201, the TS decoder 1202, the AV decoder 1203 the speaker 1204, the display 1205, the secondary storage unit 1207, the primary storage unit 1208, the ROM 1209, and the input unit 1210, are controlled following instructions of the executed program.

The secondary storage unit 1207 is configured from devices in which information is not erased even during a cut-off of power in the terminal apparatus 1200 such as a non-volatile memory such as a FLASH-ROM, a Hard Disk Drive (HDD), and rewritable media such as CD-R, DVD-R, or the like. The secondary storage unit 1207 performs the storage of information according to the instructions of the CPU 1206. It is used for the storage of data, which if lost due to a power cut-off in the terminal apparatus 1200, would cause problems.

The primary storage unit 1208 is configured from a RAM, or the like, and is a device with a function for temporarily storing information according to the instructions of the CPU 1206, DMA transfer-capable devices, or the like. The information held in the primary storage unit 1208 is erased by a power cut-off in the terminal apparatus 1200.

The ROM 1209 is a non-rewritable memory device, and is specifically configured from a ROM, CD-ROM, DVD, or the like. The program executed by the CPU 1206 is stored in the ROM 1209.

Figure 13:
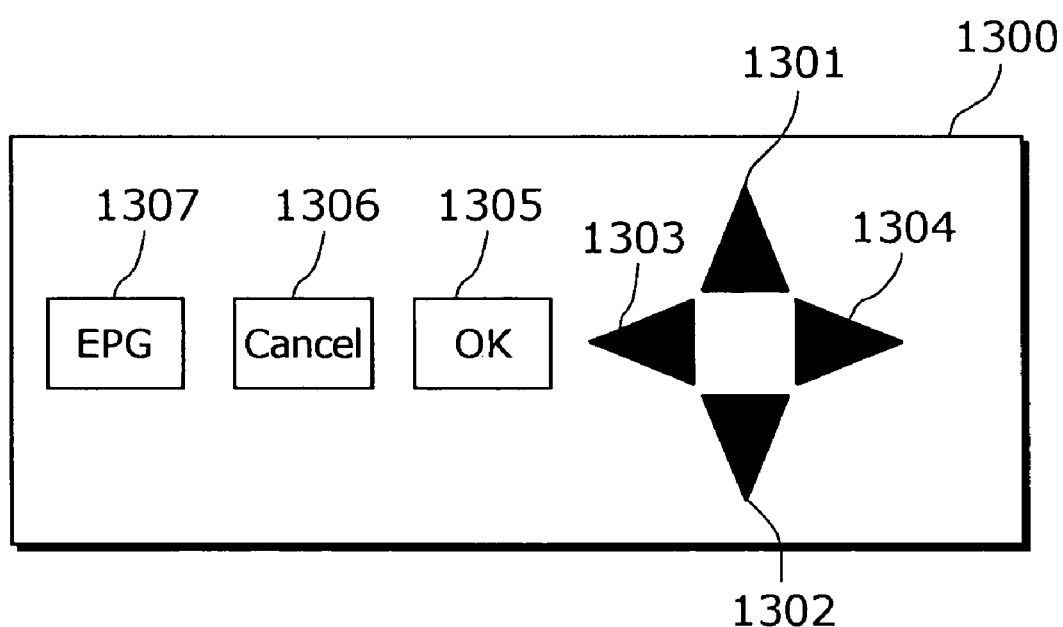
FIG. 13 shows an example of the front panel of the input unit 1210 in the hardware configuration of the terminal apparatus 1200 in the present invention.

The input unit 1210 is specifically made up of a front panel, remote control, or the like, and accepts input from a user. FIG. 13 is an example of the case where the input unit 1210 is made up of a front panel. A front panel 1300 includes seven buttons, namely an up cursor button 1301, a down cursor button 1302, a left cursor button 1303, a right cursor button 1304, an OK button 1305, a cancel button 1306, and an EPG button 1307. When a user presses a button, the identifier of the button pressed is relayed to the CPU 1206.

Furthermore, in FIG. 12 the display 1205 and the speaker 1204 are represented as being in a form included inside the broadcast receiving apparatus. However a type also exists in which the display 1205 and the speaker 1204 are not contained in the broadcast receiving apparatus, and the only external output is an AV signal. The location of the display 1205 and the speaker 1204 is not relevant to the present invention, and the present invention can be applied to either type.

Figure 14:
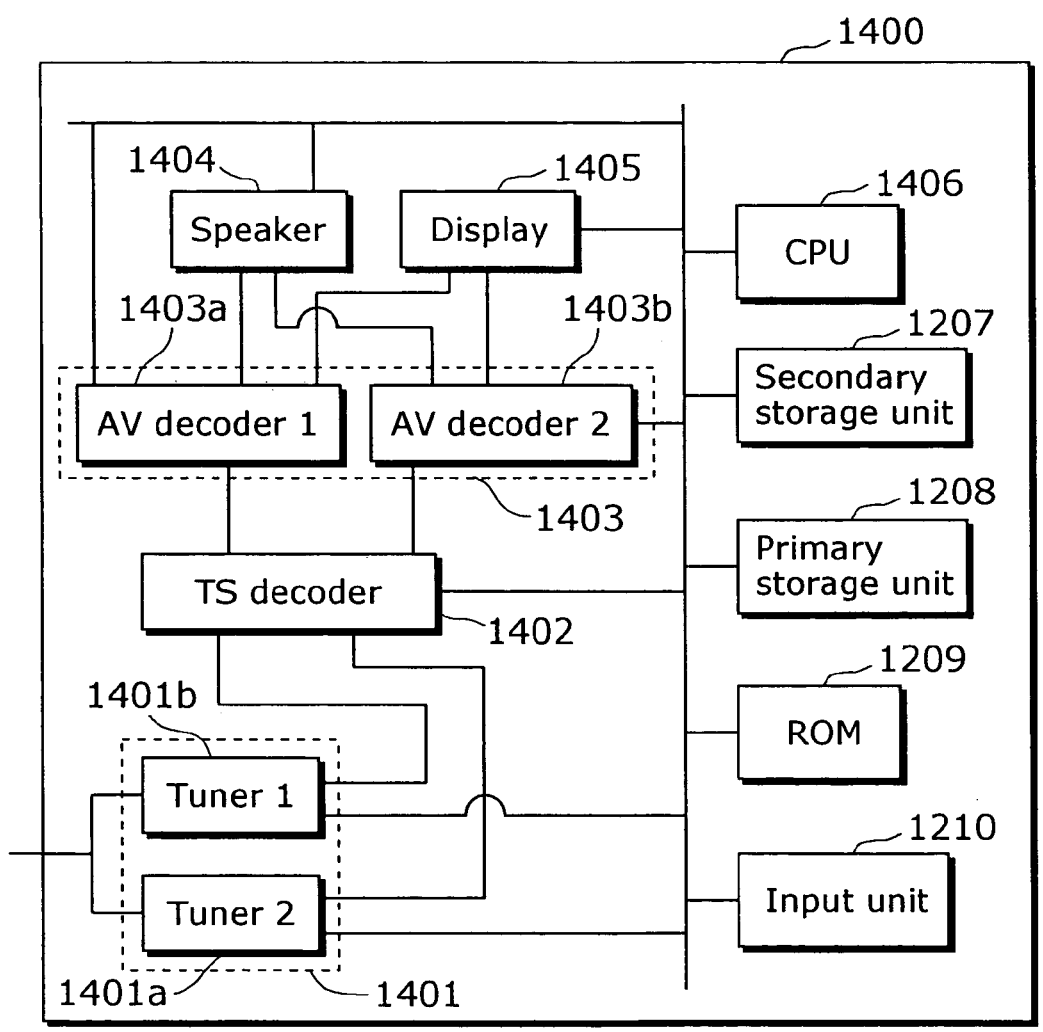
FIG. 14 shows a configuration example of the hardware configuration of the broadcast receiving apparatus in the present invention.

Next, FIG. 14 shows an example of a hardware configuration in the case where a plurality of devices exists in a terminal apparatus. A terminal apparatus 1400 is made up of a tuner 1401, a TS decoder 1402, an AV decoder 1403, a speaker 1404, a display 1405, a CPU 1406, a secondary storage unit 1207, a primary unit 1208, a ROM 1209, and an input unit 1210. The difference between FIG. 12 and FIG. 14 is that two tuners (a tuner 1401a and a tuner 1401b) exist in the part represented by the tuner 1401, and two AV decoders (an AV decoder 1403*a* and an AV decoder 1403*b*) exist in the part represented by the AV decoder 1403. The devices found in the terminal apparatus 1400 that are identified by the same numbering as in FIG. 12, perform the same operations as in FIG. 12, thus explanations shall be omitted. Hereinafter, the points of difference between the hardware configuration in FIG. 12 and the hardware configuration in FIG. 14 shall be explained.

The tuner 1401*a* and the tuner 1401*b* are devices for demodulating, according to tuning information which includes the frequency designated by the CPU 1406, a broadcast signal modulated and transmitted from the broadcast station-side system 201, and are capable of operating independently of one another. The MPEG-2 transport streams obtained from the demodulation by the tuner 1401*a* and the tuner 1401*b* are each transmitted to the TS decoder 1402.

Furthermore, although two tuners are found in the hardware configuration example shown in FIG. 14, the present invention can be applied regardless of the number of tuners.

The TS decoder 1402, like the TS decoder 1202, is a device having a function for sorting out, from an inputted MPEG-2 transport stream, a PES packet, MPEG-2 section, or the like, that matches designated conditions, based on the designation of a PID, a section filter condition, and so on. Although in the hardware configuration in FIG. 14, MPEG-2 transport streams are inputted to the TS decoder 1402 from the tuner 1401*a* and the tuner 1401*b*, the TS decoder can sort out PES packets, MPEG-2 sections, or the like, from each of the transport streams. Furthermore, in the hardware configuration in FIG. 14, the TS decoder 1402 can transmit the PES packet sorted out, to the two AV decoders 1403*a* and 1403*b*.

Moreover, although in the hardware configuration example shown in FIG. 14, the number of MPEG-2 transport stream inputs to the TS decoder 1402 is two, the present invention can be applied regardless of such number. In addition, although in the present hardware configuration, the number of PES packets outputted by the TS decoder 1402 to the AV decoders is two, the present invention can be applied regardless of such number. In addition, the present invention can be applied even if there is a plurality of the TS decoder 1402 itself.

The AV decoder 1403*a* and AV decoder 1403*b* are devices having the function for decoding encoded video data and encoded audio data contained in the inputted PES packet. The video and audio AV signals obtained from the decoding by the AV decoder 1403*a* and AV decoder 1403*b* are respectively transmitted to the display 1405 and the speaker 1404. Within the broadcast receiving apparatus 1400 in the hardware configuration example in FIG. 14, two AV decoders, namely the AV decoder 1403*a* and the AV decoder 1403*b* exist, and it is possible for each to decode the PES packet outputted from the TS decoder 1402, independently of one another.

Moreover, although the number of AV decoders in the hardware configuration example in FIG. 4 is two, the present invention can be applied regardless of such number.

The speaker 1404 and the display 1405 are devices having the function to output sound and images, respectively. In the present embodiment, the AV signals are inputted from two AV decoders, and the form for outputting such is determined by the instruction of the CPU 1406. For example, it is possible to have designations such as outputting only the output of the AV decoder 1403*a*, or displaying the images outputted by the AV decoder 1403*b* on the entire screen, or displaying the images outputted by the AV decoder 1403*a* on the lower right quarter, in front of the images outputted by the AV decoder 1403*b*, and so on.

The CPU 1406 executes a program operating on the broadcast receiving apparatus. For the program executed by the CPU 1406, there are cases where it is included in the ROM 1209, cases where it is downloaded from a broadcast signal, network, or the like, and held in the primary storage unit 1208, cases where the program is downloaded from a broadcast signal, network, or the like, and held in the secondary storage unit 1207, and so on. The tuner 1401, the TS decoder 1402, the AV decoder 1403, the speaker 1404, the display 1405, the secondary storage unit 1207, the primary storage unit 1208, the ROM 1209, and the input unit 1210 are controlled according to the instructions of the program executed. As with the tuner 1401 and the decoder 1403 in the hardware configuration in FIG. 14, in the case where a plurality of the same type of device exists, it is possible for the CPU 1406 to designate and control each device individually.

Figure 15:
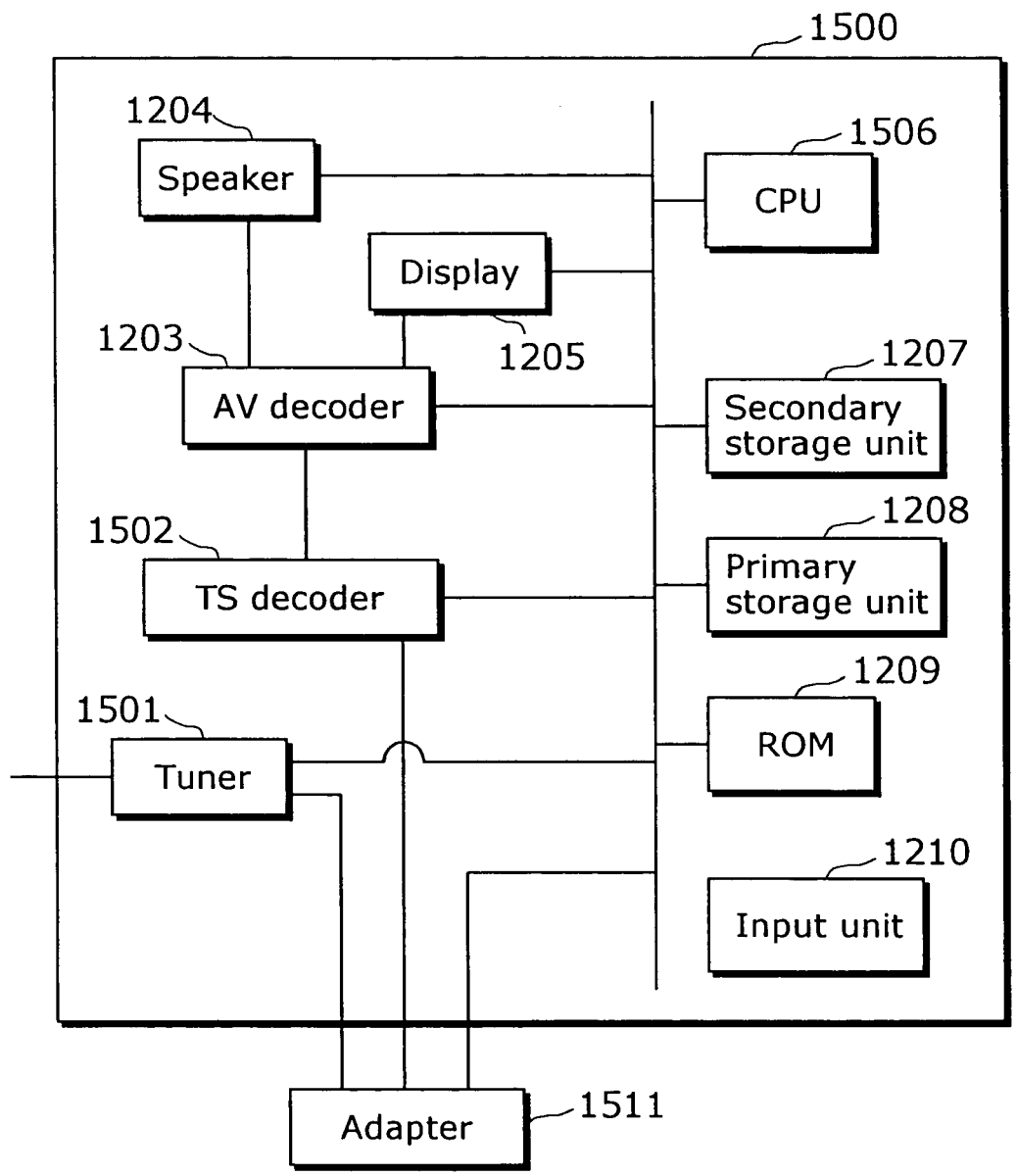
FIG. 15 shows a configuration example of the hardware configuration of the broadcast receiving apparatus in the present invention.

In the hardware configurations shown in FIG. 12 and FIG. 14, each device is included in the terminal apparatus by factory default. However, in order to add a device that is not installed in the terminal device, as well as to improve the function of a device installed in the terminal, there are instances where the addition of an adapter mounted with the device to be added, is carried out. FIG. 15 is provided as an example of such a hardware configuration. A terminal apparatus 1500 is made up of a tuner 1501, a TS decoder 1502, an AV decoder 1203, a speaker 1204, a display 1205, a CPU 1506, a secondary storage unit 1207, a primary storage unit 1208, a ROM 1209, and an input unit 1210. As the devices included in the terminal apparatus 1500 identified by the same numbering as in FIG. 12 possess the same functions as in FIG. 12, their explanations shall be omitted. An adapter 1511 is provided in the terminal apparatus 1500. A device with the function to be added on to the terminal apparatus 1500 is mounted on the adapter 1511. The adapter 1511 appearing in the hardware configuration example in FIG. 15, holds a device (descrambler) which has an MPEG-2 transport stream as an input, and with regard to the TS packets included in the inputted MPEG-2 transport stream, descrambles (decodes) a TS packet having the PID designated by the CPU 1506. In order for the device held by the adapter 1511 to operate, it is necessary for it to input the MPEG-2 transport stream demodulated by the tuner 1501 to the adapter 1511. For that reason, the tuner 1501 inputs the demodulated MPEG-2 transport stream to the adapter 1511. After decoding the TS packet, designated by the CPU 1506, within the inputted MPEG-2 transport stream, the adapter 1511 transmits such MPEG-2 transport stream to the TS decoder 1502. In the same way that the TS decoder 1202 in FIG. 12 can perform processing on the MPEG-2 transport stream inputted from the tuner 1201, it is also possible for the TS decoder 1502 to perform processing for the MPEG-2 transport stream inputted from the adapter 1511. The CPU 1506 can communicate with or control, not only the devices found in the terminal apparatus 1500, but also the devices within the adapter 1511.

Furthermore, although the adapter 1511 is equipped with a descrambler in the hardware configuration shown in FIG. 15, the present invention can be applied regardless of the type and number of devices held by the adapter 1511. In addition, although in the hardware configuration shown in FIG. 15, a configuration where the adapter 1511 receives an MPEG-2 transport stream from the tuner 1501, and transmits the MPEG-2 transport stream to the TS decoder 1502 is adopted, the present invention can be applied regardless of which stage in the broadcast signal processing, the device mounted on the adapter 1511 is inserted. For example, the present invention can still be applied even in a configuration where the adapter 1511 is mounted with an AV decoder, receives a PES packet from the TS decoder 1502, and outputs AV signals to the display 1205, as well as the speaker 1204. In addition, although Personal Computer Memory Card International Association (PCMCIA) is typical for the interface between the terminal apparatus 1500 and the adapter 1511, as the format of such interface bears no relevance to the present invention, the present invention can be applied regardless of the interface. Moreover, as the present invention is not dependent on the number of adapters which can simultaneously be physically connected to the terminal apparatus 1500, the present invention can be applied even if it is possible for the terminal apparatus 1500 to have a plurality of adapters physically connected.

Figure 16:
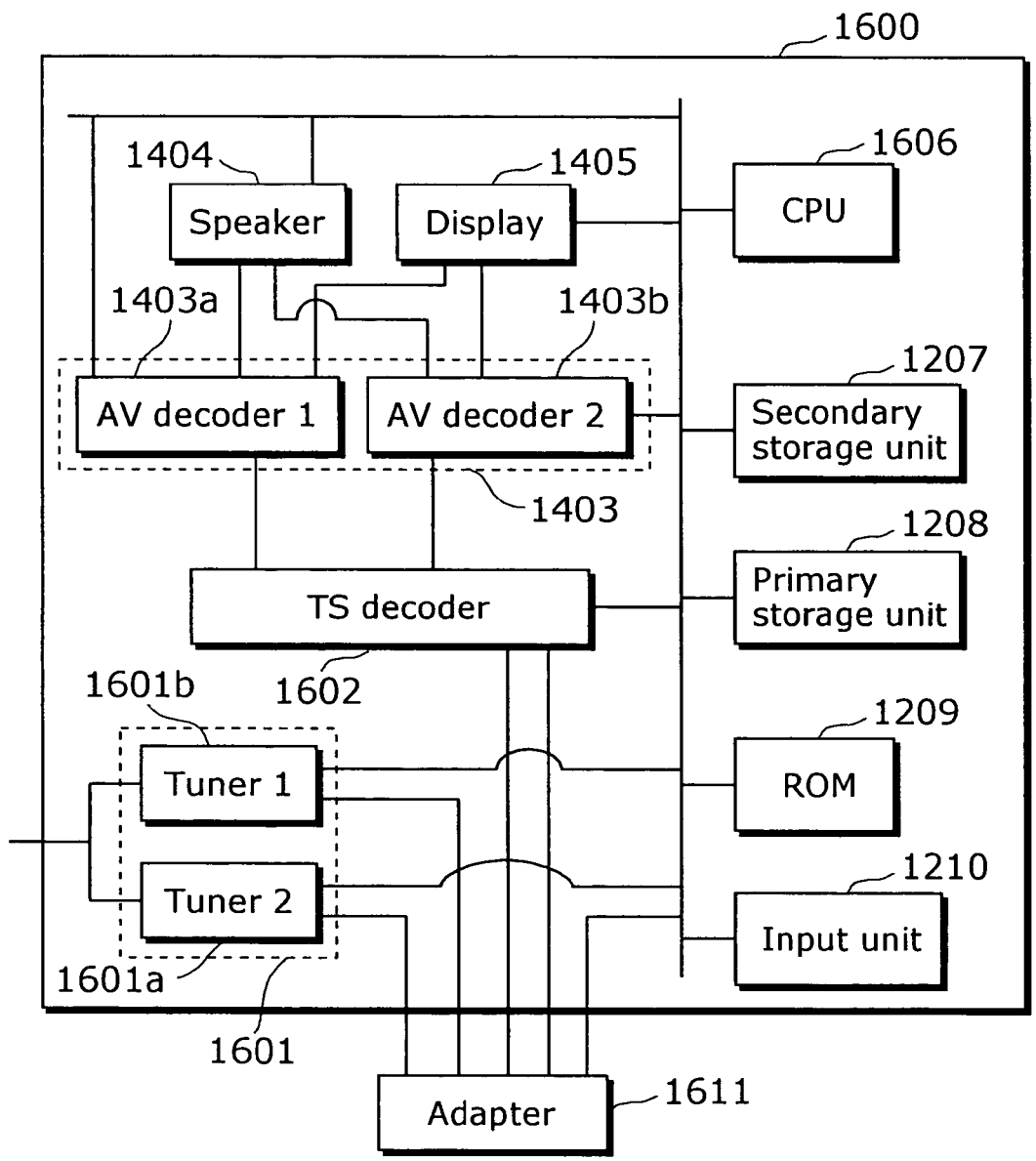
FIG. 16 shows a configuration example of the hardware configuration of the broadcast receiving apparatus in the present invention.

Next, FIG. 16 shows an example of a hardware configuration in the case where an adapter is further added onto a terminal apparatus in which a plurality of devices exists. A terminal apparatus 1600 is made up of a tuner 1601, a TS decoder 1602, an AV decoder 1403, a speaker 1404, a display 1405, a CPU 1606, a secondary storage unit 1207, a primary storage unit 1208, a ROM 1209, and an input unit 1210. The devices included in the terminal apparatus 1600 that are identified by the same numbering as in FIG. 12 or FIG. 14, have the same functions as in FIG. 12 or FIG. 14, thus their explanations shall be omitted. An adapter 1611 is provided in the terminal apparatus 1600. The device with the function to be added on to the terminal apparatus 1600 is mounted on the adapter 1611. As with the adapter 1511, the adapter 1611 in the hardware configuration example in FIG. 16 is mounted with a descrambler. The descrambler mounted on the adapter 1611 accepts an input of a plurality of MPEG-2 transport streams, and outputs a plurality of MPEG-2 transport streams. As there are two tuners found in the hardware configuration shown in FIG. 16, the MPEG-2 transport streams outputted from a tuner 1601*a* and a tuner 1601*b* are inputted to the adapter 1611. The adapter 1611 performs descrambling on the two MPEG-2 transport streams inputted, and transmits the two descrambled MPEG-2 transport streams to the TS decoder 1602. In the same way that the TS decoder 1402 in FIG. 14, can process the two MPEG-2 transport streams outputted by the tuner 1401*a* and the tuner 1401*b*, the TS decoder 1602 can process the two inputted MPEG-2 transport streams. The CPU 1606 can communicate with or control, not only the devices found in the terminal apparatus 1600, but also the devices within the adapter 1611.

Moreover, in the hardware configuration shown in FIG. 16, with respect to the adapter 1611 which requires MPEG-2 transport streams for input, the number of MPEG-2 transport streams transmitted is the same as the number of the tuners 1601. However, it is not required that all MPEG-2 transport streams be inputted to the adapter 1611, and the present invention can be applied, for example, even in configurations where only those of the tuner 1601*a* are inputted to the adapter 1611. In addition the present invention has no dependency on the format of information between the terminal apparatus 1600 and the adapter 1611. For example, before inputting to the adapter 1611, the MPEG-2 transport streams outputted by the tuner 1601*a* and the tuner 1601*b*, can be combined to create an "adapter 1611 interpretable bit stream" which is then inputted to the adapter 1611, and such processed bit stream outputted by the adapter 1611 can be separated into two MPEG-2 transport streams before inputting to the TS decoder 1602.

Figure 17:
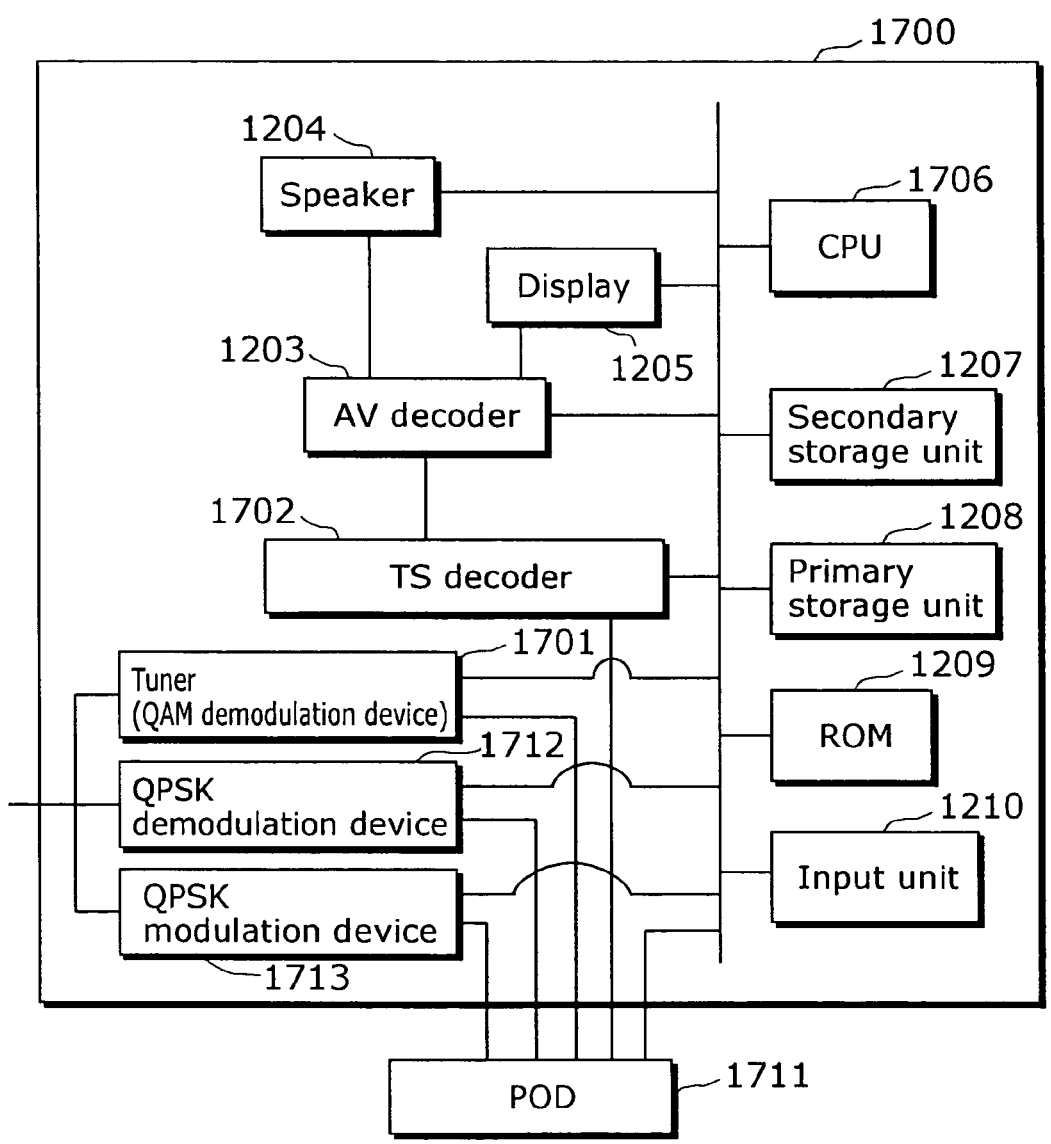
FIG. 17 shows an example of a front panel found in the hardware configuration example of the broadcast receiving apparatus in the present invention.

POD used in an American cable system shall be explained as an example of an adapter. FIG. 17 shows the hardware configuration of a terminal apparatus provided with a POD 1711. The devices existing inside the terminal apparatus 1700 that are identified by the same numbering as in FIG. 12 or FIG. 15 have the same functions as in FIG. 12 or FIG. 15. The POD 1711 is equipped with a descrambler, and like the adapter 1511 in FIG. 15, it receives an MPEG-2 transport stream from the tuner 1701, and outputs a descrambled MPEG-2 transport stream to the TS decoder 1702. In addition, in the American cable system, a variety of information is transmitted in the upward and downward directions using the so-called OOB frequency band, as shown in FIG. 3 and FIG. 4. At this point, as the format of information to be sent out by the broadcast station-side system 201, and the information format that can be interpreted by the terminal apparatus 1700 are different, the exchange of information, as it is, is not possible. The POD 1711 includes a device for performing format conversion for the respective upward and downward information transmitted through the OOB. The information transmitted through the OOB is modulated in the QPSK modulation scheme. As the present modulation scheme is publicly known technology, detailed explanation shall be omitted. The terminal apparatus includes a QPSK demodulation device 1712 and a QPSK modulation device 1713. The CPU 1706 can control not only the devices within the terminal apparatus 1700, but also the devices within the POD 1711.

With regard to the downward direction information reception of the terminal apparatus 1700, first, the QPSK demodulation device 1712 demodulates the downward signal transmitted from the broadcast station-side system 201 through the OOB, and inputs the generated bit stream to the POD 1711. The POD 1711 extracts the information designated by the CPU 1706 from among the variety of information included in the bit stream. It then converts the extracted information into a format that can be interpreted by the program operating on the CPU 1706, and provides such converted information to the CPU 1706.

With regard to the upward direction information transmission of the terminal apparatus 1700, first the CPU 1706 transmits, to the POD 1711, the information to be transmitted to the broadcast station-side system 201. The POD 1711 converts the information inputted from the CPU 1706 to a form that can be interpreted by the broadcast station-side system 201, and transmits this to the QPSK modulation device 1713. The QPSK modulation device 1713 performs QPSK modulation on the information inputted from the POD 1711, and transmits this to the broadcast station-side system 201.

Figure 18:
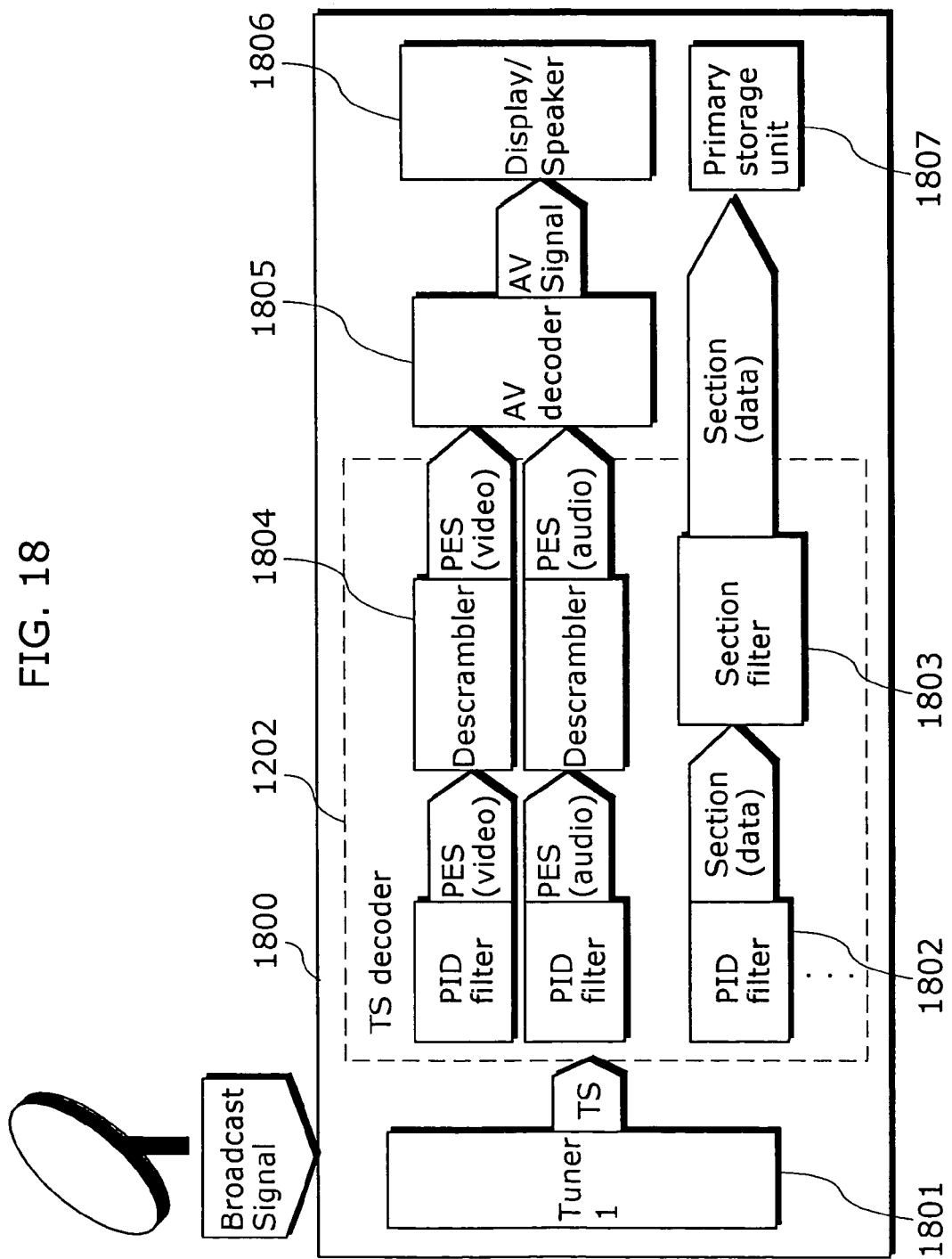
FIG. 18 shows an example of a device connection in the broadcast receiving apparatus in the present invention.

Using the respective devices appearing in FIG. 12 to FIG. 17, the broadcast receiving apparatus implements the function of outputting the transmitted video/audio data included in a broadcast signal onto a screen, the function of extracting data such as program information, from a broadcast signal and providing such data to a user, and so on. These functions are realized by physically and logically connecting each type of device in the broadcast receiving apparatus, in the proper form and proper sequence, and using the functions of these respective devices in the proper manner. FIG. 18 shows a conceptual diagram illustrating the physical connection sequence, processing details, and input/output data format, of the individual devices. A terminal apparatus 1800 includes a tuner 1801, a PID filter 1802, a section filter 1803, a descrambler 1804, an AV decoder 1805, a display/speaker 1806, and a primary storage unit 1807. The devices appearing in FIG. 18 are on a one-to-one or one-to-many correspondence, with the devices appearing in FIG. 12.

The tuner 1801 corresponds to the tuner 1201. It has broadcast signals as input and outputs an MPEG-2 transport stream.

There are three devices within the TS decoder 1202 for processing an MPEG-2 transport stream, namely the PID filter 1802, the section filter 1803, and the descrambler 1804. The functions of such devices shall now be described in detail.

The PID filter 1802 extracts the TS packet bearing the PID designated by the CPU 1206 from the inputted MPEG-2 transport stream, and further extracts the PES packet, MPEG-2 section, and so on, found in the payload of such TS packet. For instance, the case where the PES packet 801 is extracted under the circumstances shown in FIG. 8, is taken as an example. First, the CPU 1206 sets the PID 100 on the PID filter 1802, and then sends out a request for the extraction of the PES packet. At which point, the PID filter extracts, from among the TS packets flowing in the MPEG-2 transport stream, the TS packets 803 to 805 having the PID of 100. It then further draws out the PES packet partition A 802*a*, the PES packet partition B 802*b*, and the PES packet partition C 802*c*, contained in the payload of the extracted TS packets 803 to 805, and connects such partitions to form the PES packet 801. One or more of the PID filter 1802 is found within the TS decoder 1202.

The descrambler 1804 descrambles the PES packet and the MPEG-2 section outputted by the PID filter 1802. Even in the case where the PES packet and the MPEG-2 section are coded, they are still transmitted by being partitioned, as in FIG. 8 and FIG. 9. The descrambler 1804 is able to identify the TS packet transmitting the coded PES packet and MPEG-2 section, according to the PID designation of the CPU 1206, and in addition, performs descrambling using the descrambling key designated by the CPU 1206. Explanation regarding the method for obtaining the descrambling key shall be omitted as it bears no significant relevance to the present invention. The descrambler 1804 outputs the descrambled PES packet to the AV decoder 1805, and the descrambled MPEG-2 section to the section filter 1803, respectively. Descrambling is a process which is applied only to coded PES packets and MPEG-2 sections. The descrambler 1804 only receives the PES packet and MPEG-2 section from the PID filter 1802 and performs descrambling when necessary, according to the instructions of the CPU 1206. PES packets and MPEG-2 sections that are not scrambled are outputted directly from the PID filter 1802 to the AV decoder 1805 and section filter 1803, respectively. One or more of the descrambler 1804 is found within the TS decoder 1202.

The section filter 1803 extracts, from among the inputted MPEG-2 sections, the MPEG-2 section matching the section filter condition designated by the CPU 1206, and places it in the primary storage unit 1807 by DMA transfer. The MPEG-2 section held in the primary storage unit 1807 is read and used by the CPU 1206. For instance, the case of the obtainment of an MPEG-2 section holding the tuning information in FIG. 11 is taken as an example. The CPU 1206 first sets the PID 16 on the PID filter 1802, then requests for the obtainment of the section. The PID filter extracts the section from the TS packet having the PID 16, and provides this to the section filter 1803. Next the CPU 1206 requests the section filter 1803 to extract the section having a table_id of 64. The section filter 1803 extracts the section having the table_id of 64 from among the MPEG-2 sections inputted from the PID filter 1802, and performs a DMA transfer of such extracted section, to the primary storage unit 1807. One or more of the section filter 1803 is found within the TS decoder 1202.

The AV decoder 1805, corresponding to the AV decoder 1203, has a PES packet as input and outputs an AV signal to the display/speaker 1806. The display/speaker 1806 corresponds to the display 1205 and speaker 1204. It has an AV signal as an input and outputs video data to the display 1205, and audio data to the speaker 1204.

The primary storage unit 1807 corresponds to the primary storage unit 1208. It receives an MPEG-2 section, and enables the referencing of such MPEG-2 section's contents, by the program executed by the CPU 1206.

The procedure for outputting video and audio data to a display and a speaker, respectively, is exemplified using the representation in FIG. 18. The broadcast signal inputted to the broadcast receiving apparatus is first demodulated to an MPEG-2 transport stream by the tuner 1801. Next, the PES packet, transmitted by the TS packet having the PID designated by the CPU 1206, which contains video and audio information is extracted by the PID filter 1802. If necessary, the PES packet is transmitted to the descrambler 1804 and descrambling is carried out. After this, the PES packet is inputted to the AV decoder 1805 where it is decoded, and an AV signal is outputted. After this, the AV signal is inputted to the display and speaker 1806, enabling the video and audio reproduction.

The procedure for extracting data, such as program information, from a broadcast signal is exemplified using the representation in FIG. 18. The broadcast signal inputted to the broadcast receiving apparatus, is first demodulated to an MPEG-2 transport stream by the tuner 1801. Next, the MPEG-2 section, transmitted by the TS packet having the PID designated by the CPU 1206, which contains the data is extracted by the PID filter 1802. If necessary, the MPEG-2 section is transmitted to the descrambler 1804 and descrambling is carried out. In addition, the MPEG-2 sections are inputted to the section filter 1803, and only the MPEG-2 section that matches the section filter condition designated by the CPU 1206 is outputted. After this, the MPEG-2 section is inputted to the primary storage unit 1807, and provided to the CPU 1206.

Furthermore, in FIG. 18, as is in FIG. 12, a broadcast receiving apparatus possessing its own display/speaker 1806 is conceptually rendered. However, there are types in which the display/speaker 1806 is not contained within the broadcast receiving apparatus, but found externally, instead. The present invention can be applied for either type. In addition, although in the schematic diagram shown in FIG. 18, the descrambler 1804 is found within the TS decoder 1202, it can also be found outside a TS decoder, depending on the hardware configuration. The present invention can still be applied, even in such a case.

Figure 19:
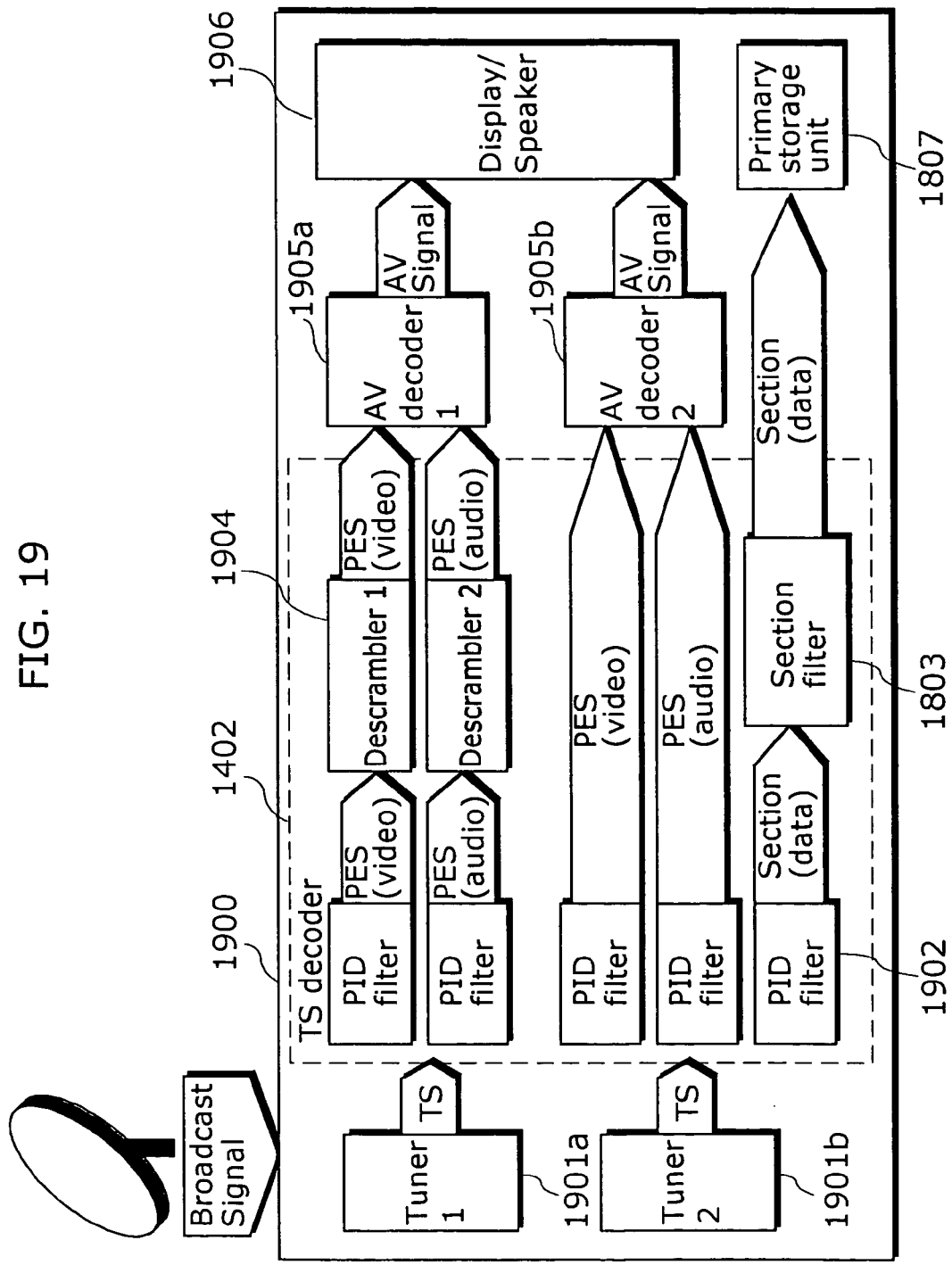
FIG. 19 shows an example of a device connection in the broadcast receiving apparatus in the present invention.

Next, FIG. 19 shows a schematic diagram corresponding to the hardware configuration where the tuner and AV decoder shown in FIG. 14, exist in a plurality. A terminal apparatus 1900 includes a tuner 1901*a* and a tuner 1901*b*, a PID filter 1902, a section filter 1803, a descrambler 1904, an AV decoder 1905*a* and an AV decoder 1905*b*, a display/speaker 1906, and a primary storage unit 1807. As the devices in FIG. 19 identified by the same numbering as in FIG. 18 possess the same functions as in FIG. 18, their explanation shall be omitted. The devices appearing in FIG. 19 have a one-to-one or one-to-many correspondence to the devices in FIG. 14. Two tuners, namely the tuner 1901*a* and the tuner 1901*b*, and two AV decoders, namely the AV decoder 1905*a* and the AV decoder 1905*b*, are found in FIG. 19. In FIG. 14, the input of a plurality of MPEG-2 transport streams, as well as the output of a plurality of PES packets is possible for the TS decoder 1402, and likewise, in FIG. 19, the establishment of "information transfer paths", in flexible combinations, is possible between the plurality of tuners and the plurality of AV decoders. The PID filter 1902 within the TS decoder 1402 can extract a PES packet and an MPEG-2 section from the MPEG-2 transport streams inputted from either the tuner 1901*a* as well as the tuner 1901*b*. In addition, it can also output a PES packet to either one of the AV decoder 1905*a* and the AV decoder 1905*b*. Likewise, the descrambler 1904 can also output a PES packet to either one of the AV decoder 1905*a* and the AV decoder 1905*b*.

Figure 20:
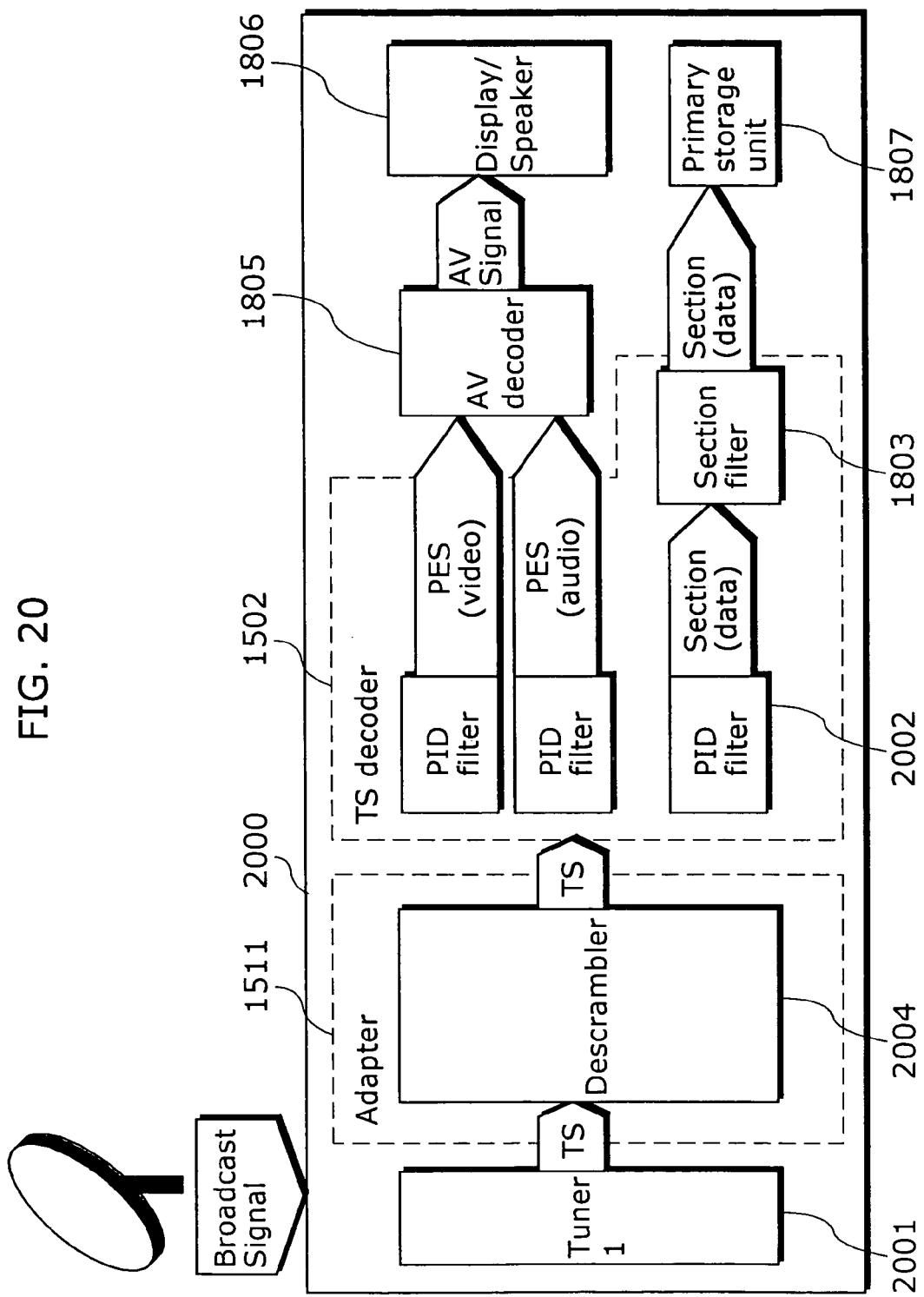
FIG. 20 shows an example of a device connection in the broadcast receiving apparatus in the present invention.

Next, FIG. 20 shows a schematic diagram corresponding to the hardware configuration where the adapter is physically connected, shown in FIG. 15. A terminal apparatus 2000 includes a tuner 2001, a PID filter 2002, a section filter 1803, an AV decoder 1805, a display/speaker 1806, and a primary storage unit 1807. In addition, an adapter 1511 is physically connected to the terminal apparatus 2000, and the adapter 1511 includes a descrambler 2004. As the devices identified with the same numbering as in the case of FIG. 18, possess the same functions as in the case of FIG. 18, their explanation shall be omitted. It is different from the terminal in FIG. 18 as to the physical and logical connection point and function of the descrambler. In FIG. 18, the descrambler 1804 exists within the TS decoder 1202, and performs descrambling on the PES packet and the MPEG-2 section outputted by the PID filter 1802, using the descrambling key designated by the CPU 1206. In contrast, in FIG. 20, the descrambler 2004 is physically and logically connected directly to the tuner 2001, and receives the MPEG-2 transport stream demodulated by the tuner 2001. The descrambler 2004 extracts the TS packet bearing the PID designated by the CPU 1506, and performs descrambling by extracting, on its own, the key required for descrambling, from within the MPEG-2 transport stream. The MPEG-2 transport stream that was descrambled by the descrambler 2004 is inputted to the TS decoder, and from there, undergoes the same process flow as in FIG. 18. The PID filter 2002 can extract the TS packet from the MPEG-2 transport stream inputted from the descrambler 2004, as well as form the PES packet and MPEG-2 section.

Figure 21:
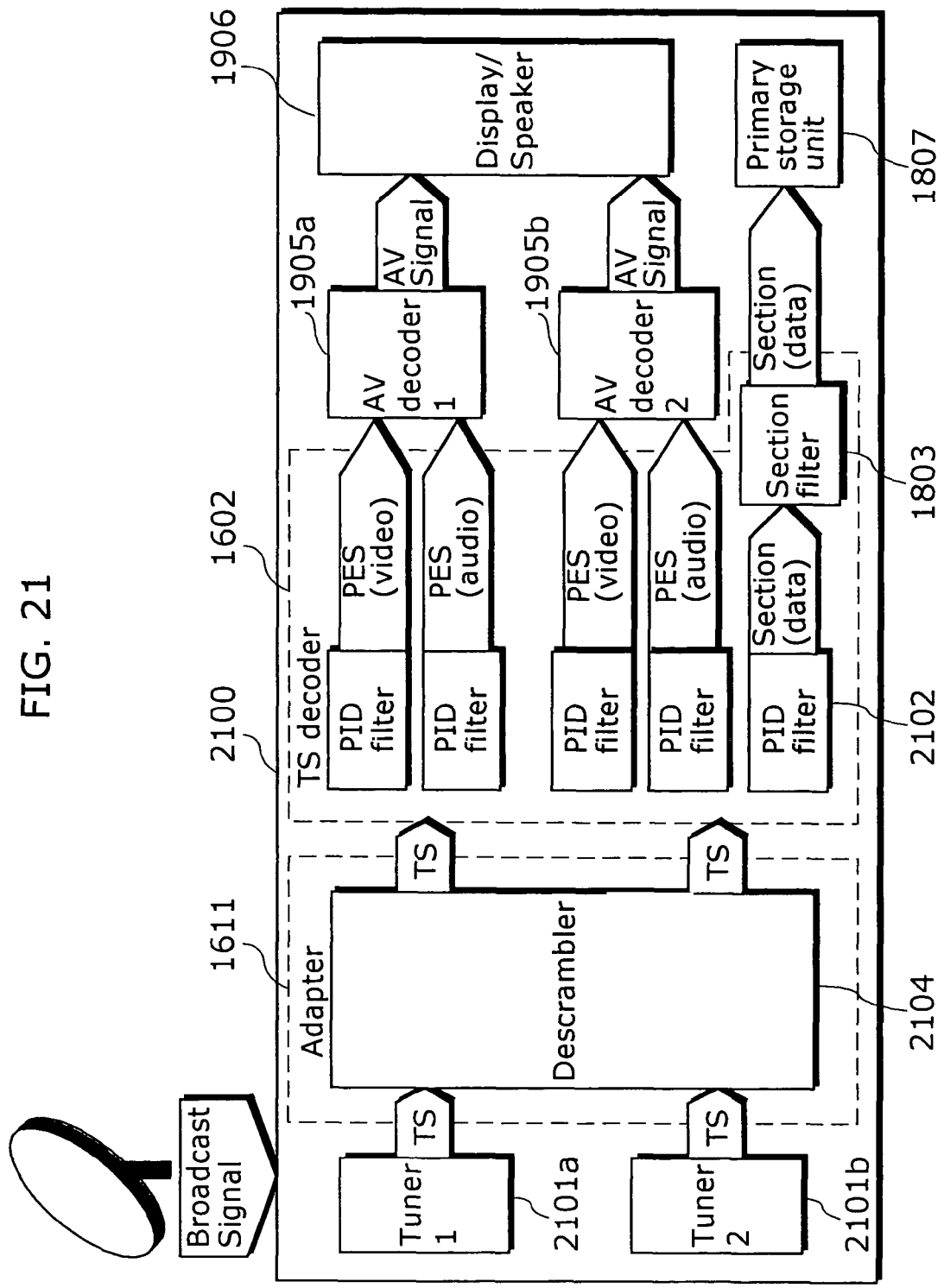
FIG. 21 shows an example of a device connection in the broadcast receiving apparatus in the present invention.

Next, FIG. 21 shows a schematic diagram for the case where an adapter is physically connected to an apparatus in which a plurality of tuners and AV decoders exist, shown in FIG. 16. A terminal apparatus 2100 includes a tuner 2101*a* and a tuner 2101*b*, a PID filter 2102, a section filter 1803, an AV decoder 1905*a* and 1905*b*, a display/speaker 1906, and a primary storage unit 1807. In addition, an adapter 1611 is physically connected to the terminal apparatus 2100, and the adapter 1611 includes a descrambler 2104. The devices, identified with the same numbering as in FIG. 18 and FIG. 19, possess the same functions as in FIG. 18 and FIG. 19, thus their explanation shall be omitted. The point of difference with FIG. 19 is the physical and logical connection point, and function, of the descrambler 2104. With regard to the function of the descrambler 2104, except for the point of being able to receive and output a plurality of MPEG-2 transport streams, it is the same with that in the descrambler 2004. The tuner 2101*a* and the tuner 2101*b* inputs MPEG-2 transport streams to the descrambler 2104. The descrambler 2104 inputs the descrambled MPEG-2 transport streams to the TS decoder 1602. The PID filter can extract TS packets from any one of the MPEG-2 transport streams inputted from the descrambler 2104, and form a PES packet and an MPEG-2 section.

With regard to the hardware configuration having a POD, shown in FIG. 17, the process regarding the transmission of a signal through the In-Band frequency band is the same as in FIG. 20, thus explanation shall be omitted.

Figure 22:
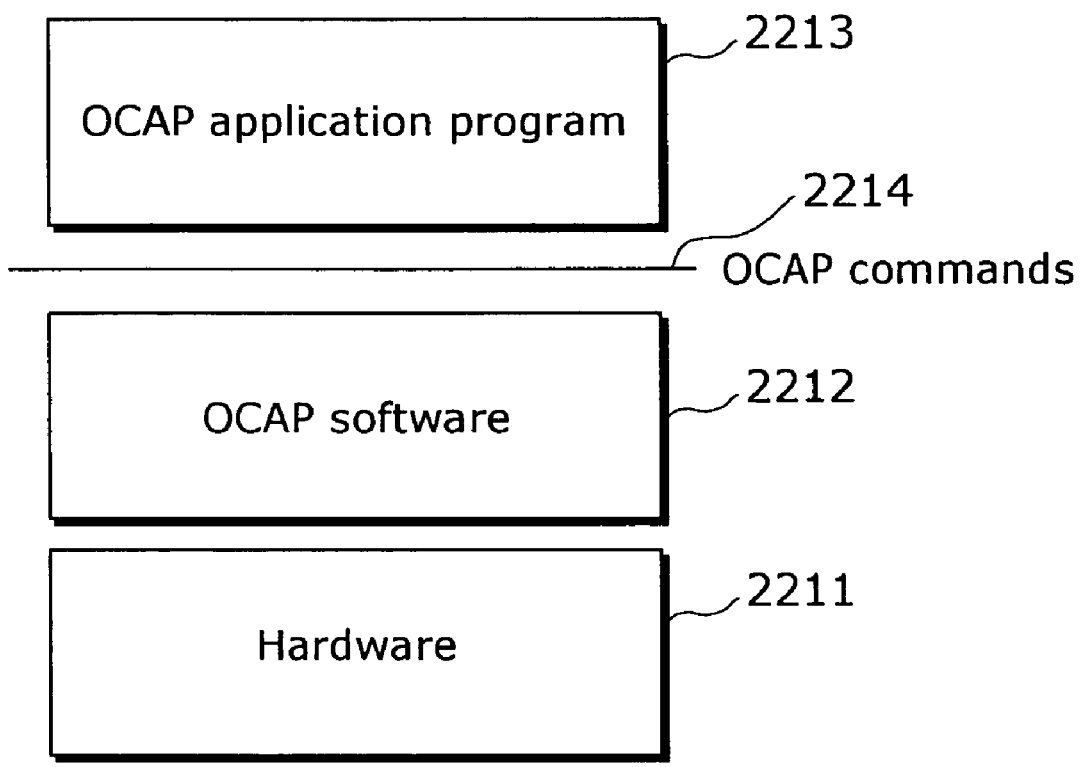
FIG. 22 is a conceptual diagram showing the relationship of hardware and software in the broadcast receiving apparatus in the present invention.

Next, an explanation shall be made regarding the conceptual relationship of the hardware and software discussed previously. FIG. 22 is a conceptual diagram indicating the relationship of hardware and software.

As shown in FIG. 22, a terminal apparatus includes hardware 2211 as a bottom layer, OCAP software (middleware) 2212 for executing OCAP commands 2214 which is an API, as a middle layer, and an OCAP application program 2213 for providing specific operations using the OCAP commands 2214, and so on, as a top layer.

Figure 23:
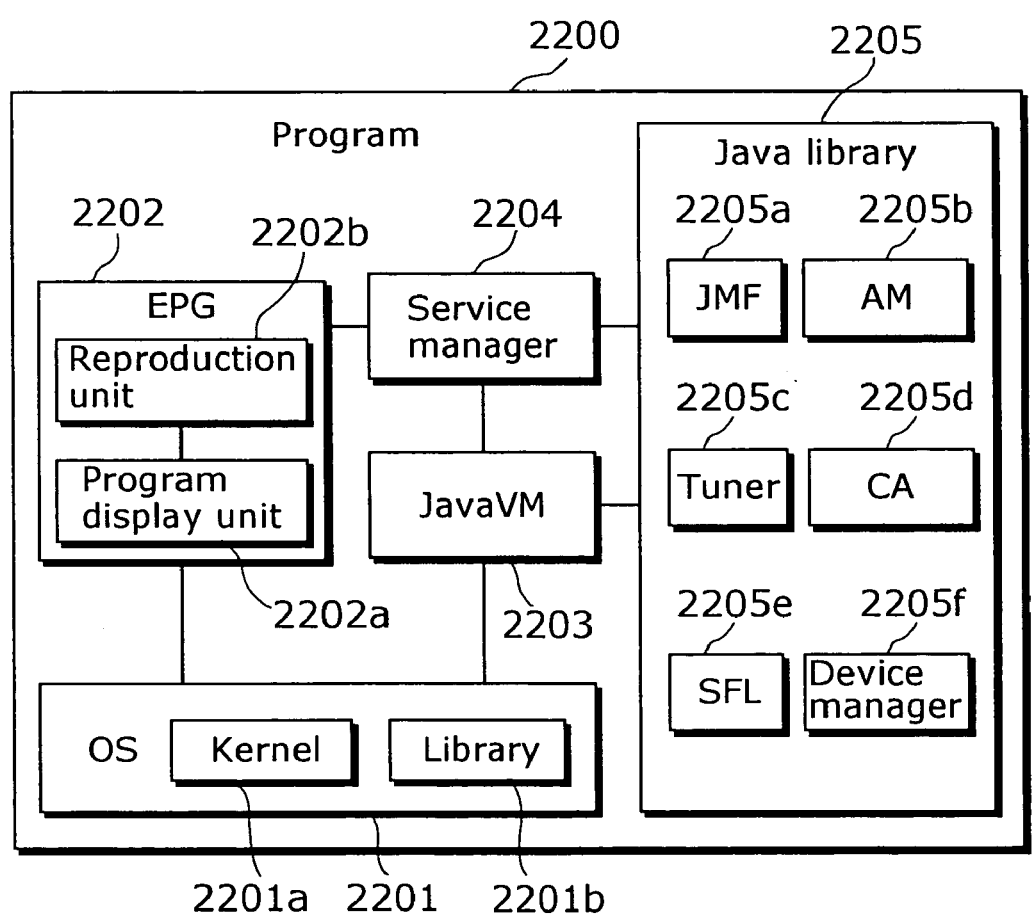
FIG. 23 is a diagram of the program configuration stored by the terminal apparatus in the present invention.

Next, the procedure for program operation on a terminal apparatus shall be described. FIG. 23 shows an example of a configuration diagram of a program stored in the ROM 1209, and executed by the CPU 1206.

A program 2200 is made up of a plurality of subprograms, specifically, an OS 2201, an EPG 2202, a Java VM 2203, a service manager 2204, and a Java library 2205.

Here, the OS 2201, the Java VM 2203, and the Java library 2205 are classified as OCAP software 2212 in FIG. 22. Furthermore, the EPG 2202, and the service manager 2204 are classified as an OCAP application program 2213 in FIG. 22. Moreover, although the OS 2201, and so on, are classified as OCAP software 2212, these can also be treated as a different layer.

The OS 2201 is the subprogram initiated by the CPU 1206 when the power source of the terminal apparatus 1200 is turned on. OS 2201 stands for Operating System, and examples of these are Linux, Windows, and so on. As the OS 2201, made up of a kernel 2201*a* and a library 2201*b* that are executed in parallel with other subprograms, is a generic term for publicly known technology, explanation shall be omitted. In the present embodiment, the kernel 2201*a* of the OS 2201, executes the EPG 2202 and the Java VM 2203 as subprograms. In addition, the library 2201*b* provides these subprograms with a plurality of functions for controlling the components held by the terminal apparatus 1200.

The tuning function is introduced as an example of a function. The tuning function receives tuning information including frequency from another subprogram, and forwards this to the tuner 1201. The tuner 1201 performs demodulation based on the tuning information provided, and can forward the demodulated MPEG-2 transport stream to the TS decoder 1202. As a result, another subprogram is able to control the tuner 1201 through the library 2201*b*.

Figure 24A:
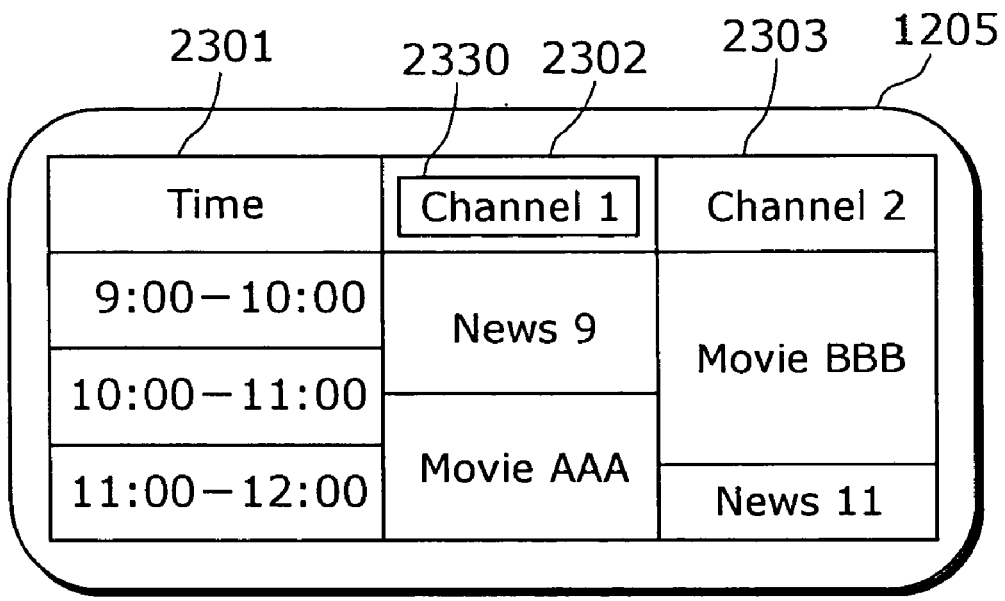
FIGS. 24A and B show an example of an EPG executed by the terminal apparatus in the present invention.
Figure 24B:
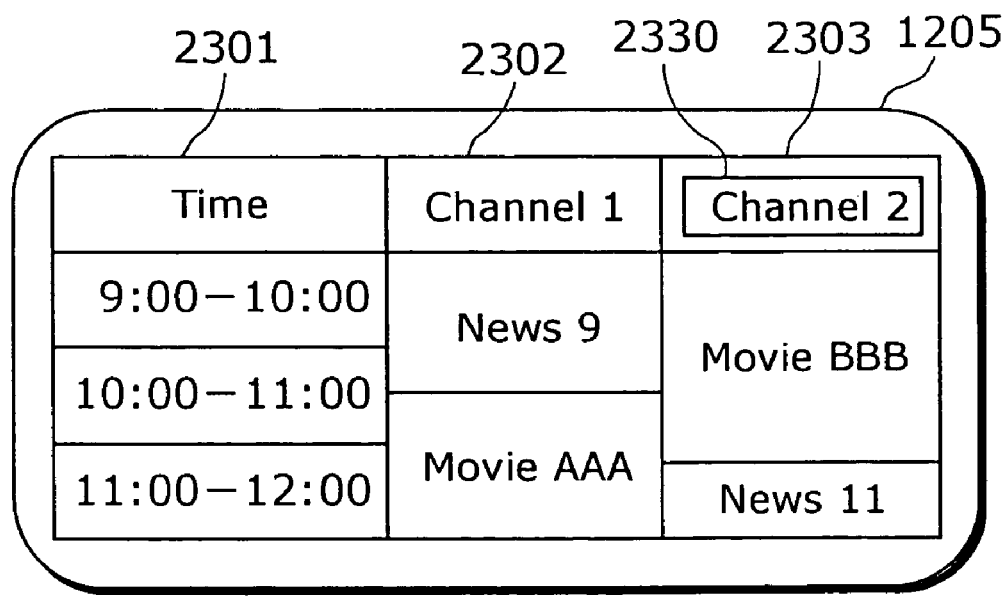

EPG 2202 is made up of a program display unit 2202*a* for displaying a program list to, and accepting inputs from a user, and a reproduction unit 2202*b* for performing channel selection. Here, EPG stands for Electric Program Guide. The EPG 2202 is initiated by the kernel 2201*a* when the power source of the terminal apparatus 1200 is turned on. Within the initiated EPG 2202, the program display unit 2202*a* awaits inputs from a user, through the input unit 1210 of the terminal apparatus 1200. At this point, in the case where the input unit 1210 is made up of a front panel as shown in FIG. 13, when the EPG button 1307 of the input unit 1210 is pressed, the identifier of the EPG button is relayed to the CPU 1206. The program display unit 2202*a* of the EPG 2202 which is a subprogram operating on the CPU 1206, receives such identifier and displays program information onto the display 1205. FIGS. 24A and B show an example of a program list displayed on the display 1205. Referring to FIG. 24A, program information is displayed in a grid pattern, on the display 1205. In a column 2301, time information is displayed. In a column 2302, a channel name "channel 1", and programs to be aired on the time slots corresponding to the time in the column 2301 are displayed. In "channel 1", it is shown that at 9:00 to 10:30, a program "News 9" is to be aired, and at 13:30 to 12:00, "Movie AAA" is to be aired. As in the column 2302, in a column 2303, a channel name "channel 2", and programs to be aired on the time slots corresponding to the time in the column 2301 are displayed. At 9:00 to 11:00, a program "Movie BBB" is to be aired, and at 11:00 to 12:00, "News 11" is to be aired. 2330 is a cursor. The cursor 2330 moves when the left cursor 1303 and the right cursor 1304 of the front panel 1300 are pressed. In the state in FIG. 24A, when the right cursor 1304 is pressed, the cursor 2330 moves to the right as shown in FIG. 24B. Furthermore, in the state in FIG. 24B, when the left cursor 1303 is pressed, the cursor 2330 moves to the left as shown in FIG. 24A.

In the state in FIG. 24A, when the OK button 1305 of the front panel 1300 is pressed, the program display unit 2202a relays the identifier for "channel 1" to the reproduction unit 2202b. In the state in FIG. 24B, when the OK button 1305 of the front panel 1300 is pressed, the program display unit 2202a relays the identifier for "channel 2" to the reproduction unit 2202b.

In addition, the program display unit 2202a periodically pre-stores program information to be displayed from the broadcast station-side system 201 into the primary storage unit 1208 or the secondary storage unit 1207. In general, obtaining program information from a broadcast station-side system takes time. A program list can be displayed rapidly by displaying the program information pre-stored in the primary storage unit 1208 or the secondary storage unit 1207 when the EPG button 1307 of the input unit 1210 is pressed.

Figure 25:
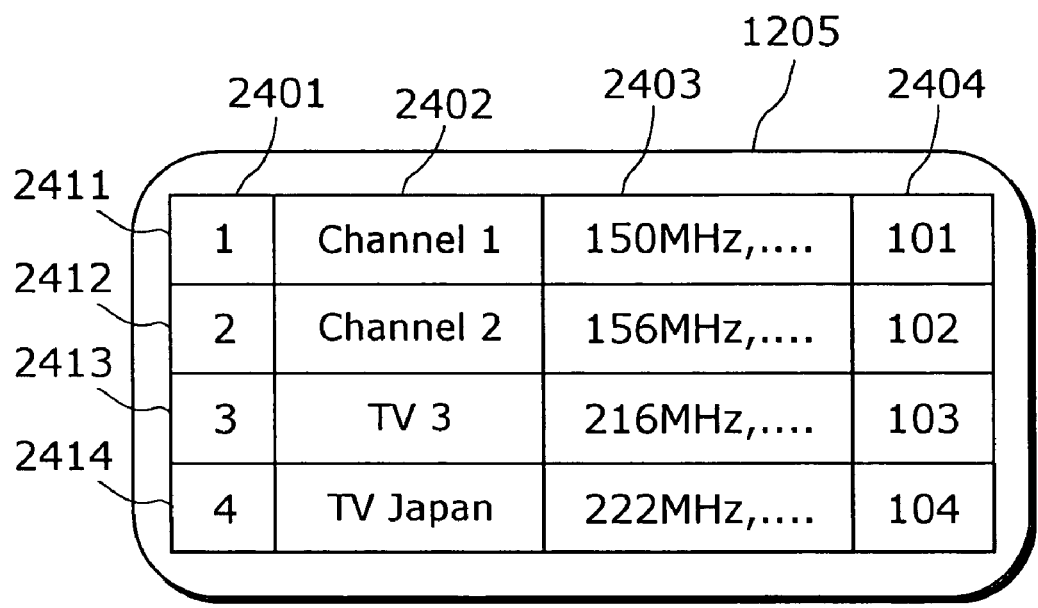
FIG. 25 is an example of information stored by the secondary storage unit in the present invention.

The reproduction unit 2202b reproduces a channel using the channel identifier received. The relation between the channel and the identifier is stored, in advance, in the secondary storage unit 1207, as channel information. FIG. 25 is an example of channel information stored in the secondary storage unit 1207. Channel information is stored in tabular-form. A column 2401 shows channel identifiers. A column 2402 shows channel names. A column 2403 shows tuning information. Here, tuning information includes frequency, transmission rate, encoding rate, and so on, which are values provided to the tuner 1201. A column 2404 shows program numbers. A program number is a number for identifying a PMT prescribed in the MPEG-2 standard. An explanation regarding PMT shall be made later. Each row in rows 2411 to 2414 forms the set for each channel's identifier, channel name, tuning information, and program number. The row 2411 is the set which includes an identifier "1", a channel name "channel 1", tuning information as the frequency "150 MHz", and a program number "101". In order to reproduce a channel, the reproduction unit 2202b forwards the channel identifier received, as it is, to the service manager.

Figure 26A:
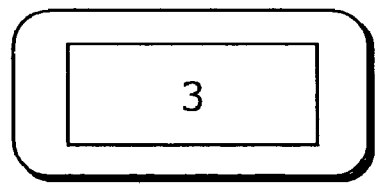
FIGS. 26A, B, and C are examples of information stored by the primary storage unit in the present invention.
Figure 26B:
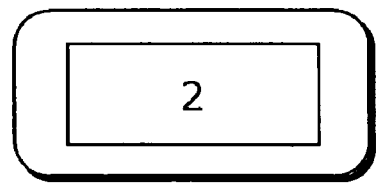
Figure 26C:
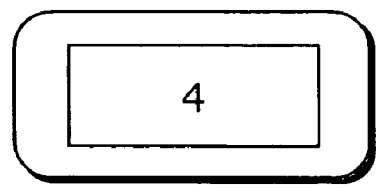

Furthermore, when a user presses the up cursor 1301 and down cursor 1302 on the front panel 1300 during reproduction, the reproduction unit 2202b receives the pressed notification from the input unit 1210 through the CPU 1206, and switches the channel being reproduced. First, the reproduction unit 2202b stores the identifier of the channel currently being reproduced, into the primary storage unit 1208. FIGS. 26A, B, and C, are examples of channel identifiers stored in the primary storage unit 1208. In FIG. 26A, an identifier "3" is stored, indicating, with reference to FIG. 25, that the channel having a channel name "TV 3" is currently being reproduced. In the state in FIG. 26A, when a user presses the up cursor 1301, the reproduction unit 2202b refers to the channel information in FIG. 25, and in order to switch the reproduction to the previous channel on the list having the channel name "channel 2", it forwards the identifier "2" of the channel name "channel 2", to the service manager. At the same time, it rewrites "2" as the channel identifier stored in the primary storage unit 1208. FIG. 26B shows the state after the channel identifier is rewritten. In addition, in the state in FIG. 26A, when a user presses the down cursor 1302, the reproduction unit 2202b refers to the channel information in FIG. 25, and in order to switch the reproduction to the next channel on the list having the channel name "TV Japan", it forwards the identifier "4" of the channel name "TV Japan", to the service manager. At the same time, it rewrites "4" as the channel identifier stored in the primary storage unit 1208. FIG. 26C shows the state after the channel identifier is overwritten.

The Java VM 2203 is a Java virtual machine for sequentially analyzing and performing a program written in the Java™ language. A program written in the Java language is compiled into an intermediate code, referred to as a bytecode, which is not dependent on hardware. The Java virtual machine is an interpreter for executing such bytecode. In addition, some Java virtual machines forward a bytecode to the CPU 1206 after translating it to an execution format understandable to the CPU 1206, and execution is also carried out. Java VM 2203 is initiated by the designation of a Java program to be executed by kernel 2201a. In the present embodiment, the kernel 2201a designates the service manager as the Java program to execute. The details of the Java language are explained in many publications, such as "Java Language Specification (ISBN 0-201-63451-1)" and so on. Here, such details shall be omitted. In addition, the detailed operation, and so on, of the Java VM itself are explained in many publications, such as "Java Virtual Machine Specification (ISBN 0-201-63451-X)", and so on. Here, such details shall be omitted.

The service manager 2204 is a program written in the Java language, and is sequentially executed by the Java VM 1203. Through a Java Native Interface (JNI), it is possible for the service manager 2204 to call, or be called, by another program that is not written in the Java language. Likewise, with regard to JNI, explanations are provided in many publications, such as "Java Native Interface", and so on. Here, such details shall be omitted.

The service manager 2204 receives a channel identifier from the reproduction unit 2202b, by way of a JNI.

The service manager 2204, first forwards the channel identifier to a tuner 2205c located within the Java library 2205, and requests for tuning. The tuner 2205c refers to the channel information stored in the secondary storage unit 1207, and obtains tuning information. Now, when the service manager 2204 forwards a channel identifier "2" to the tuner 2205c, the tuner 2205c refers to the row 2412 in FIG. 25, and obtains the corresponding tuning information which is "156 MHz". The tuner 2205c forwards the tuning information to the tuner 1201 through the library 2201b of the OS 2201. The tuner 1201 demodulates a signal transmitted from the broadcast station-side system 201 according to the tuning information provided, and forwards this to the TS decoder 1202.

Next, the service manager 2204 makes a request to a CA 2205d located within the Java library 2205 for descrambling. The CA 2205d provides information required for decoding to the descrambler 1804 within the TS decoder 1202, through the library 2201b of the OS 2201.

Next, the service manager 2204 provides the channel identifier to a JMF 2205a located within the Java library 2205, and requests video and audio reproduction.

Figure 27:
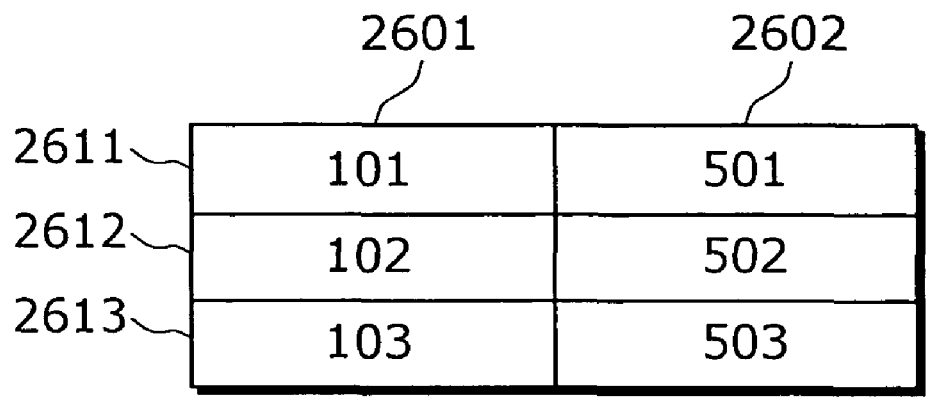
FIG. 27 is a pattern diagram representing the contents of a PAT prescribed in the MPEG-2 standard, in the present invention.
Figure 28:
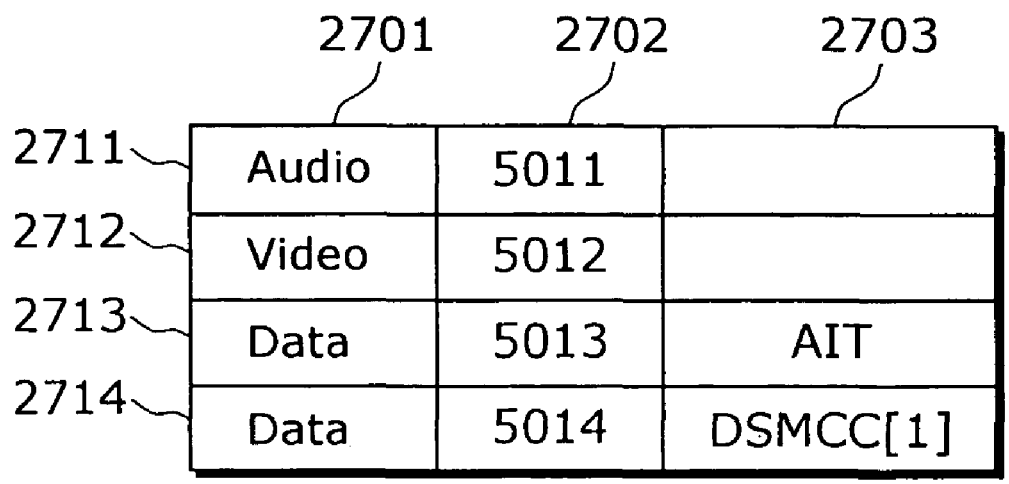
FIG. 28 is a pattern diagram representing the contents of a PMT prescribed in the MPEG-2 standard, in the present invention.

First, the JMF 2205a obtains the PID for identifying the video and audio to be reproduced, from a PAT and a PMT. The PAT, PMT, and so on, are tables prescribed in the MPEG-2 standard, which describe the program structure within an MPEG transport stream. They are embedded, as an MPEG-2 section, in the payload of a TS packet included in an MPEG-2 transport stream, and are transmitted alongside video and audio data. Refer to the Specifications for details. Here, only the outline shall be explained. PAT stands for Program Association Table, and is the MPEG-2 section having a table_id of "0" stored and transmitted in the TS packet having the PID "0". In order to obtain the PAT, the JMF 2205a specifies the PID "0" and the CPU 1206, to the TS decoder 1202, through the library 2201b of the OS 2201. The TS decoder 1202 performs filtering with the PID "0" and the table_id "0", and by forwarding results to the CPU 1206, through the primary storage unit 1208, the JMF 2205a acquires the PAT. FIG. 27 is a chart showing, schematically, an example of the information of the acquired PAT. A column 2601 shows the program number. A column 2602 shows the PID. The PID in the column 2602 is used for obtaining the PMT. Rows 2611 to 2613 are sets of channel program numbers and corresponding PIDs. Here, three channels are defined. In the row 2611, the set of a program number "101" and a PID "501" are defined. Now, assuming that "2" is the channel identifier provided to the JMF 2205a, the JMF 2205a refers to the row 2412 in FIG. 25, and obtains the corresponding program number which is "102". Next, it refers to the row 2612 of the PAT in FIG. 27, and obtains the PID "502" which corresponds to the program number "102". PMT stands for Program Map Table, and is the MPEG-2 section bearing the table_id "2", stored and transmitted in the TS packet having the PID identified by the PAT. In order to obtain a PMT, the JMF 2205a specifies the PID obtained from the PAT and the table_id "2" to the TS decoder 1202, through the library 2201b of the OS 2201. At this point, it is assumed that the specified PID is "502". The TS decoder 1202 performs filtering with the PID "502" and the table_id "2", and by forwarding results to the CPU 1206, through the primary storage unit 1208, the JMF 2205a acquires the PMT. FIG. 28 is a chart showing, schematically, an example of the information of the acquired PMT. A column 2701 shows the stream type. A column 2702 shows the PID. The information designated by the stream type is stored and transmitted in the payload of the TS packet having the PID designated by the column 2702. A column 2703 shows supplementary information. The rows 2711 to 2714 are the sets, known as elementary streams, of the PID and the type of the information being transmitted. The row 2711 is the set consisting of a stream type as "audio" and a PID "5011", indicating that audio data is stored in the payload of the TS packet having the PID "5011". The JMF 2205a obtains the PID of the video and audio to be reproduced from the PMT. Referring to FIG. 28, JMF 2205a obtains the audio PID "5011" from the row 2711, and the video PID "5012" from the row 1712.

Next, the JMF 2205a specifies the obtained video/audio PID, and the AV decoder 1203 as the destination, to the TS decoder 1202, through the library 2201b of the OS 2201. The TS decoder 1202 performs filtering based on the PID and output destination provided. Here the TS Packets of PID "5011" and "5012" are forwarded to the AV decoder 1203. The AV decoder 1203 decodes the PES packets provided, and reproduces the video/audio through the display 1205 and the speaker 1204.

Finally, the service manager 2204 relays the channel identifier to the AM 2205b located within the Java library 2205, and requests data broadcast reproduction. Here, data broadcast reproduction refers to the extraction of a Java program included in an MPEG-2 transport stream, and the execution of such Java program by the Java VM 2203. A format, known as DSMCC, described in the MPEG Specification ISO/IEC 13818-6 is used as the method for embedding a Java program in an MPEG-2 transport stream. Here, the detailed explanation for DSMCC shall be omitted. The DSMCC format prescribes a method for encoding a file system using an MPEG-2 section. Such file system is found within the TS packet of an MPEG-2 transport stream, and is made up of a directory, a file, and so on, to be used in a computer. In addition, the information of the Java program to be executed is the format known as AIT. It is embedded in the TS packet of an MPEG-2 transport stream, and is transmitted as the MPEG-2 section having a table_id of "0×74". The AIT stands for Application Information Table, and is defined in chapter 10 of the DVB-MHP Specification (formally, ETSI TS 101 812 DVB-MHP specification V1.0.2).

In order to obtain the AIT, the AM 2205b first obtains the PAT and PMT in the same manner as the JMF 2205a, and acquires the PID of the TS packet where the AIT is stored. Now, when the identifier of the channel provided is "2", and the PAT in FIG. 27 and the PMT in FIG. 28 is being transmitted, the PMT in FIG. 28 is obtained, in the same procedure as with the JMF 2205a. The AM 2205b extracts the PID from the elementary stream having "data" as stream type and "AIT" as supplementary information, from the PMT. Referring to FIG. 28, the elementary stream of row 2713 falls under this description, thus the PID "5013" is acquired.

Figure 29:
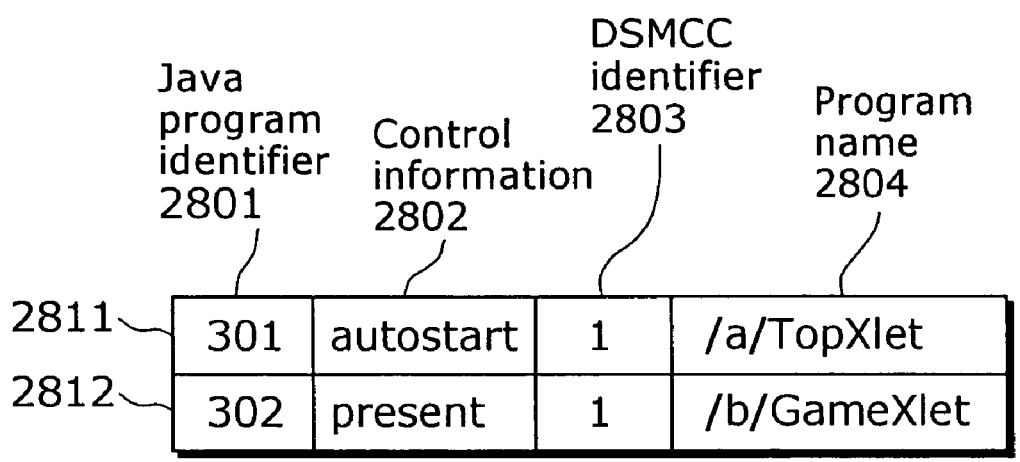
FIG. 29 is a pattern diagram representing the contents of an AIT prescribed in the DVB-MHP standard, in the present invention.

The AM 2205b provides the PID of the AIT and the table_id "0×74" to the TS decoder 1202, through the library 2201b of the OS 2201. The TS decoder 1202 performs filtering with the PID and table_id provided, and forwards the result to the CPU 1206, through the primary storage unit 1208. As a result, the AM 2205b is able to acquire the AIT. FIG. 29 is a chart showing, schematically, an example of information of the acquired AIT. A column 2801 shows the Java program identifiers. A column 2802 shows Java program control information. "Autostart", "present", "kill", and so on, are found in the control information. "Autostart" means that the terminal 1200 automatically executes this program immediately, "present" means that an automatic execution is not performed, and "Kill" means the termination of a program. A column 2803 shows the DSMCC identifiers for extracting the PID which includes the Java program, in the DSMCC format. A column 2804 shows the program names of the Java program. Rows 2811 to 2812 show sets of Java program information. A Java program defined in the row 2811 is the set with an identifier "301", control information "autostart", a DSMCC identifier "1", and a program name "a/TopXlet". A Java program defined by the row 2812 is the set with an identifier "302", control information "present", a DSMCC identifier "1", and a program name "b/GameXlet". Here, two Java programs have the same DSMCC identifier. This indicates that two Java programs are included within a file system encoded in a single DSMCC format. Here, although only four items of information are prescribed for the Java programs, in actuality, more items of information are defined. Refer to the DVB-MHP Specification for details.

The AM 2205b finds the Java program of "autostart" within the AIT, and extracts the corresponding DSMCC identifier and program name. Referring to FIG. 29, the AM 2205b extracts the Java program of the row 2811, and acquires the DSMCC identifier "I" and the Java program name "a/TopXlet".

Next, the AM 2205b acquires the PID of the TS packet storing a file system in a DSMCC format, from the PMT, using the DSMCC identifier obtained from the AIT. To be specific, the PID of an elementary stream, within the PMT, with a stream type as "data", and supplementary information of a matching DSMCC identifier, is acquired.

Now, assuming that the DSMCC identifier is "1", and the PMT is the one shown in FIG. 28, the elementary stream of the row 2714 conforms, and a PID "5014" is obtained.

The AM 2205b specifies, to the TS decoder 1202, the PID of the TS packet transmitting the MPEG-2 section where data is embedded in the DSMCC format, as well as the section filter condition, through the library 2201b of the OS 2201. Here, PID "5014" is provided. The TS decoder 1202 performs filtering with the MPEG-2 section for the DSMCC using the PID provided, and forwards the result to the CPU 1206 through the primary storage unit 1 208. As a result, the AM 2205*b* is able to acquire the necessary MPEG-2 section for the DSMCC. The AM 2205*b* restores the file system from the acquired MPEG-2 section, according to the DSMCC format, and stores it in the primary storage unit 1208. The obtainment of data such as a file system from a TS packet within an MPEG-2 transport stream, for storage in a means for storage such as the primary storage unit 1208 and the secondary storage unit 1207 shall be referred to, hereinafter, as a download.

Figure 30:
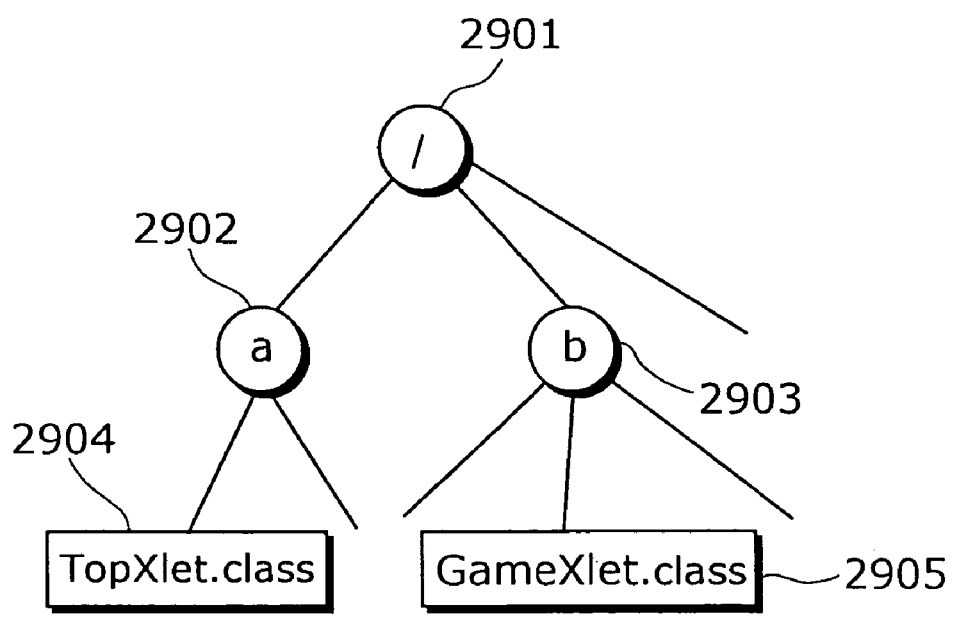
FIG. 30 is a pattern diagram representing a file system, transmitted in the DSMCC format, in the present invention.

FIG. 30 shows an example of a downloaded file system. In the illustration, a circle indicates a directory and a square indicates a file. 2901 is a route directory, 2902 is a directory "a", 2903 is a directory "b", 2904 is a file "TopXlet.class", and 2905 is a file "GameXlet.class".

Next, the AM 2205*b* forwards the Java program to be executed from within the file system downloaded in the primary storage unit 1208, to the Java VM 2203. Assuming that "a/TopXlet" is the Java program name to be executed now, the file adding ".class" at the end of the program name, namely "a/TopXlet.class" becomes the file to be executed. "/" is a delimiter for a directory, a file name, and the like, and referring to FIG. 30, the file 2904 is the Java program to be executed. Next, the AM 2205*b* forwards the file 2904 to the Java VM 2203.

Moreover, AIT is not the only method of reference for the Java program to be executed by the AM 2205*b*. In OCAP which is being considered for use in the American cable system, XAIT which lists the reference information of applications in the OOB shown in FIG. 3, is used. Aside from this, other methods such as one where a program recorded, in advance, in the ROM 1209 is initiated, one where a program downloaded and stored in the secondary storage unit 1207 is initiated, and so on, are also assumed.

The Java VM 2203 executes the forwarded Java program.

Upon receiving the identifier of another channel, the service manager 2204 terminates the execution of the video/audio being reproduced through each of the libraries included in the Java library 2205, through the same libraries included in the Java library 2205, and executes the video/audio reproduction, as well as the Java program, based on the newly received channel identifier.

The Java library 2205 is the aggregate of the plurality of Java libraries stored in the ROM 1209. In the present embodiment, the Java library 2205 includes the JMF 2205*a*, the AM 2205*b*, the tuner 2205*c*, the CA 2205*d*, a section filter 2205*e*, a device manager 2205*f* which is a device management unit, and so on.

Next, explanation shall be made regarding the device manager 2205*f*, which is the basis of the present invention.

A program described in the Java language and initiated in the previously mentioned manner is able to implement a variety of functions. The Java program implements such functions by using the Java library 2205. Included within the Java library 2205 is the device manager 2205*f* which performs management with regard to the devices located inside the digital broadcast receiving apparatus. The device manager 2205*f* has a function for logically connecting a plurality of devices, as well as a function for providing information related to such connection function.

Figure 31A:
FIGS. 31A, B, C, and D show configuration examples of device connection paths, in the present embodiment.
Figure 31B:
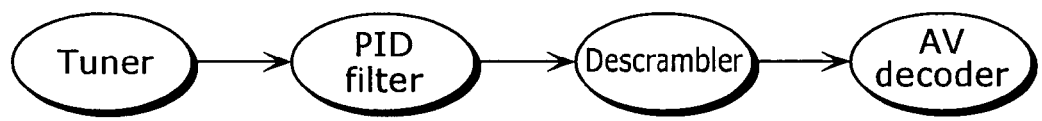
Figure 31C:
Figure 31D:
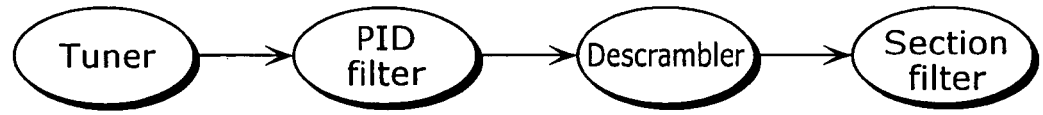
Figure 32:
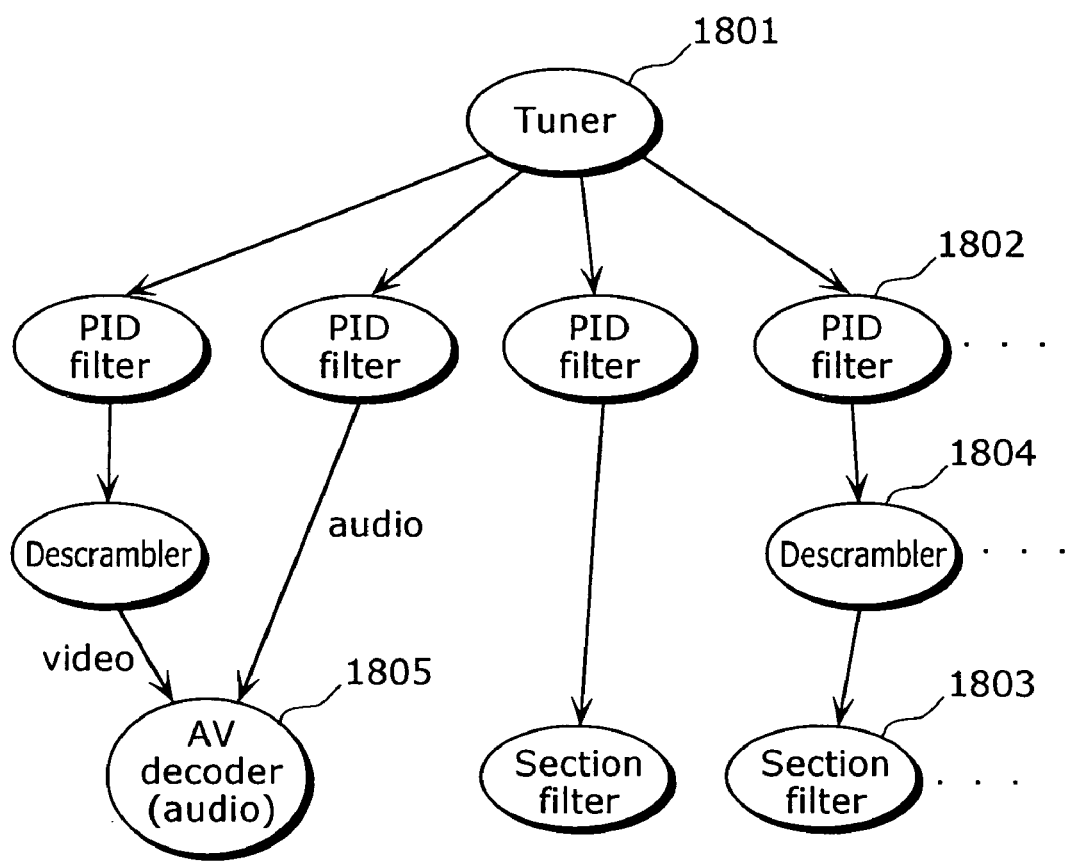
FIG. 32 shows an example of the overall configuration of device connection paths in the present embodiment.

As shown in the hardware configuration examples illustrated in FIG. 12 to FIG. 17, as well as in the corresponding device configurations and input/output of each device illustrated in FIG. 18 to FIG. 21, the type of hardware used during the process of extracting required information from a digital broadcast signal is somewhat limited, regardless of the hardware configuration. In the present embodiment, the "tuner", "PID filter", "section filter", "descrambler", and the "AV decoder" are perceived as the devices used in the processing of a broadcast signal, and the Java program is provided with the function for controlling such devices. FIG. 12 illustrates such a hardware configuration, and the number of each device in the present embodiment shall be in conformance with that in FIG. 12. The AV decoder 1203 has the function for simultaneously decoding video and audio data, and can simultaneously receive a PES packet transmitting video data, and a PES packet transmitting audio data. Assume that there are an X number of PID folders found within the TS decoder 1202, a Y number of section filters, and a Z number of descramblers. In the case where devices of the same type exist in a plurality, as long as they are all physically connected according to the sequence depicted in FIG. 18, it is assumed that the logical connection of any device is also possible. In other words, all the PID filters can be logically connected to the tuner, all the descramblers can be logically connected to all the PID filters, all the section filters can be logically connected to all the PID filters and all the descramblers, and the AV decoder can be logically connected to all the PID filters and all the descramblers. FIG. 31 shows the logical connection paths possible under this situation. FIG. 31A shows a device logical connection path used during video and audio reproduction. It is used during the reproduction of video and audio data transmitted by a PES packet which has not undergone scrambling. FIG. 31B shows a device logical connection path used during video and audio reproduction. It is used during the reproduction of video and audio data transmitted by a PES packet which has undergone scrambling. FIG. 31C shows a device logical connection path used during the access of data transmitted by an MPEG-2 section. It is used in the case of accessing data transmitted by an MPEG-2 section which has not undergone scrambling. FIG. 31D shows a device logical connection path used during the access of data transmitted by an MPEG-2 section. It is used in the case of accessing data transmitted by an MPEG-2 section which has undergone scrambling. The Java program can access a broadcast signal using any of the four paths shown in FIG. 31. FIG. 32 shows an overall conceptual diagram of logical connections in the present embodiment. As the hardware configuration in the present embodiment follows that in FIG. 12, the tuner 1801 and the AV decoder 1805, each existing singly, and the PID filter 1802, the section filter 1803, and the descrambler 1804, existing in a plurality, are logically connected to each other in abidance to sequence.

Figure 33:
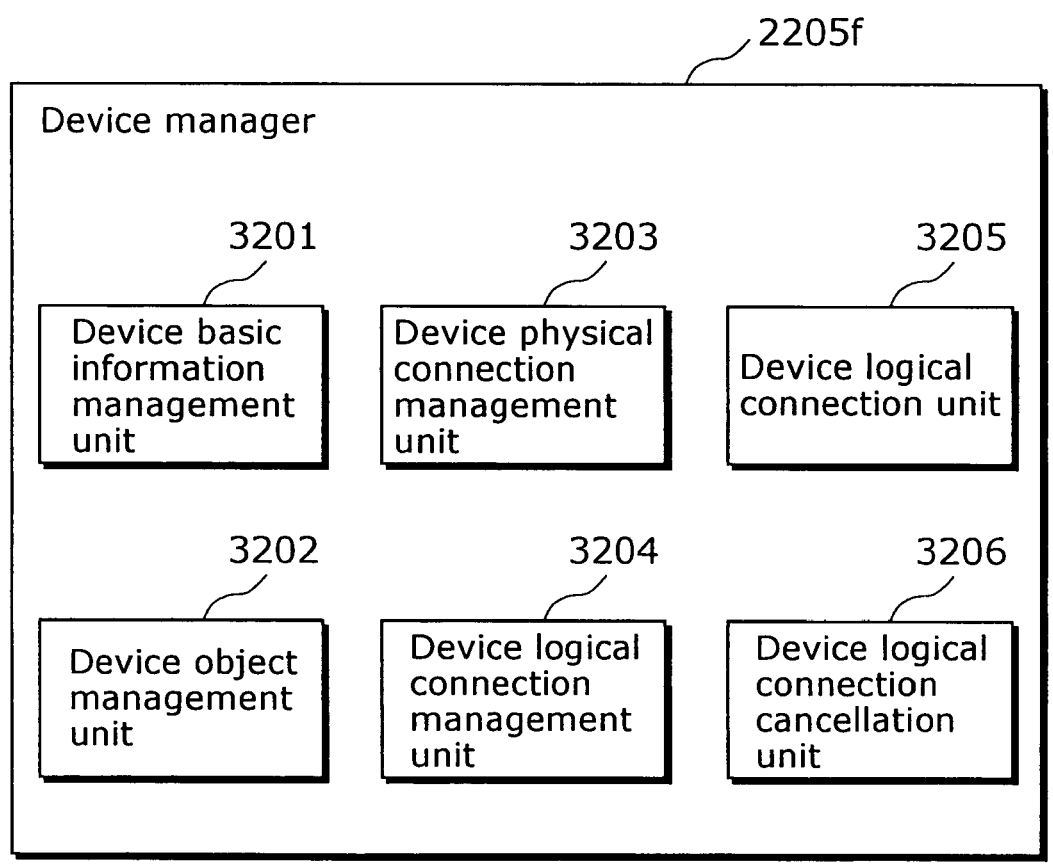
FIG. 33 shows the internal configuration of the device manager in the first embodiment of the present invention.

The Java program can format a device logical connection path by accessing the device manager 2205*f*. In the present embodiment, the device manager 2205*f* adopts a configuration as shown in FIG. 33. The device manager 2205*f* is made up of the six modules, namely a device basic information management unit 3201, a device object management unit 3202, a device physical connection management unit 3203, a device logical connection unit management 3204, a device logical connection unit 3205, and a device logical connection cancellation unit 3206.

The device basic information management unit 3201 holds information on the type and number of the devices handled by the device manager 2205*f*, as well as information regarding the individual devices. The device basic information management unit 3201 holds information in the primary storage unit 1208, or the secondary storage unit 1207, or the ROM 1209, and is managed by the device manager 2205*f*. In addition, it can also be managed through dedicated hardware such as a register, and the like.

The device object management unit 3202 manages the one-to-one correspondence of objects which represent devices. The device object management unit 3202 stores information within the primary storage unit 1208, and is managed by the device manager 2205*f*. In addition, it can also be managed through dedicated hardware such as a register, and the like.

The device physical connection management unit 3203 manages the physical connection information of devices in terms of hardware configuration. It manages such information as, in FIG. 18 for example, the tuner 1801 being physically connected to the PID filter 1802, and the PID filter 1802 being connected to the tuner 1801, and the section filter 1803, and the descrambler 1804, and the AV decoder 1805. The device physical connection management unit 3203 basically holds information in the primary storage unit 1208, or the secondary storage unit 1207, or the ROM 1209, and is managed by the device manager 2205*f*. In addition, as an alternative implementation, it is possible to adopt an implementation where the status of the device itself is used as the physical connection management unit, and the physical connection configuration of devices in terms of hardware itself, is checked when the obtainment of the physical connection status is necessary. Furthermore, it can also be managed through dedicated hardware such as a register, and the like.

The device logical connection management unit 3204 manages the logical connection status of devices. The device logical connection unit management 3204 basically holds information within the primary storage unit 1208, and is managed by the device manager 2205*f*. However, as an alternate implementation, it is possible to adopt an implementation where the status of the device itself, is used as the logical connection management unit, and the device itself is checked, when the obtainment of the connection status is required. In addition, it can also be managed through dedicated hardware such as a register, and the like.

The device logical connection unit 3205 has a function for logically connecting devices. The device logical connection unit 3205 is implemented as a library for performing the connection of devices. It is stored in the ROM 1209, and executed by the CPU 1206.

The device logical connection cancellation unit 3206 has a function for performing the cancellation of a logical connection of devices. The device logical connection cancellation unit 3206 is implemented as a library for performing the cancellation of device logical connections. It is stored in the ROM 1209, and executed by the CPU 1206.

Next, the functions necessary for the device manager 2205*f* shall be enumerated, and the procedures for implementation with regard to each function shall be shown while indicating the association with each of the units 3201 to 3206 in FIG. 33.

Figure 34:
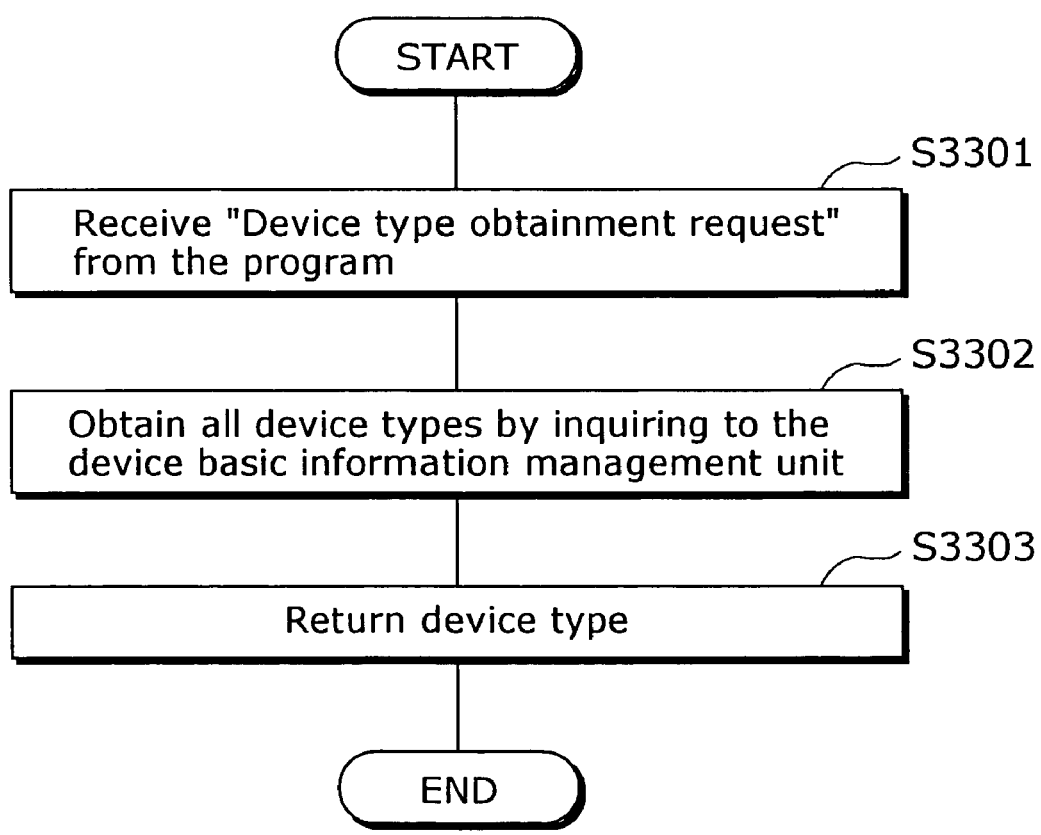
FIG. 34 shows the sequence for the device type obtainment by the device manager in the present invention.

The first function of the device manager 2205*f* is providing the Java program with the function for obtaining the type of the device (hereinafter as device type) being managed by the device manager 2205*f*. In the present embodiment, as the "tuner", "PID filter", "section filter", "descrambler", and "AV decoder" are being handled as mentioned earlier, the function for obtaining the types of these devices are provided to the Java program. By using the present function, the Java program can obtain the device type of the devices that are possible for it to logically connect. FIG. 34 is a flowchart showing the procedure for implementing the present function. First, upon receiving a device type obtainment request from the Java program (S3301), the device manager 2205*f* obtains all the device types managed by the device basic information management unit 3201 by inquiring to the device basic information management unit 3201 (S3302), and returns this to the Java program (S3303).

Figure 35:
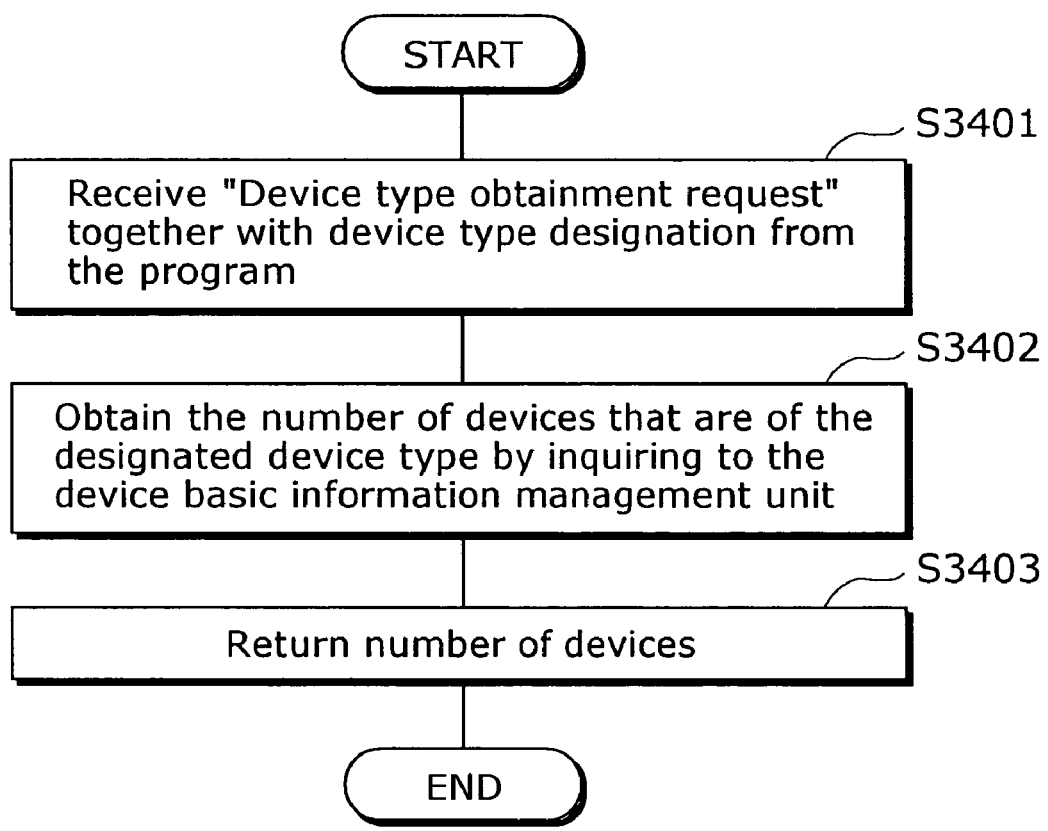
FIG. 35 shows the sequence for the device number obtainment by the device manager in the present invention.

The second function of the device manager 2205*f* is providing the Java program with the function for returning the number of the devices being managed by the device manager 2205*f*. With regard to the present embodiment, as only one of the tuner 1801 exists in terms of hardware, one is returned. As for the PID filter, since an X number exist, X is returned. By using the present function, the Java program is able to obtain the number of devices existing, in terms of hardware configuration, for each device type. FIG. 35 is a flowchart showing the procedure for implementing the present function. Upon receiving a designation of device types and a device number obtainment request from the Java program (S3401), the device manager 2205*f* obtains the number of the devices matching the designated device type by inquiring to the device basic information management unit 3201 (S3402), and returns the obtained number of devices (S3403). Moreover, it is also possible to have an implementation where the designation of device types is not received in the step 3401, and the number of all devices found in the broadcast receiving apparatus is returned.

Figure 36:
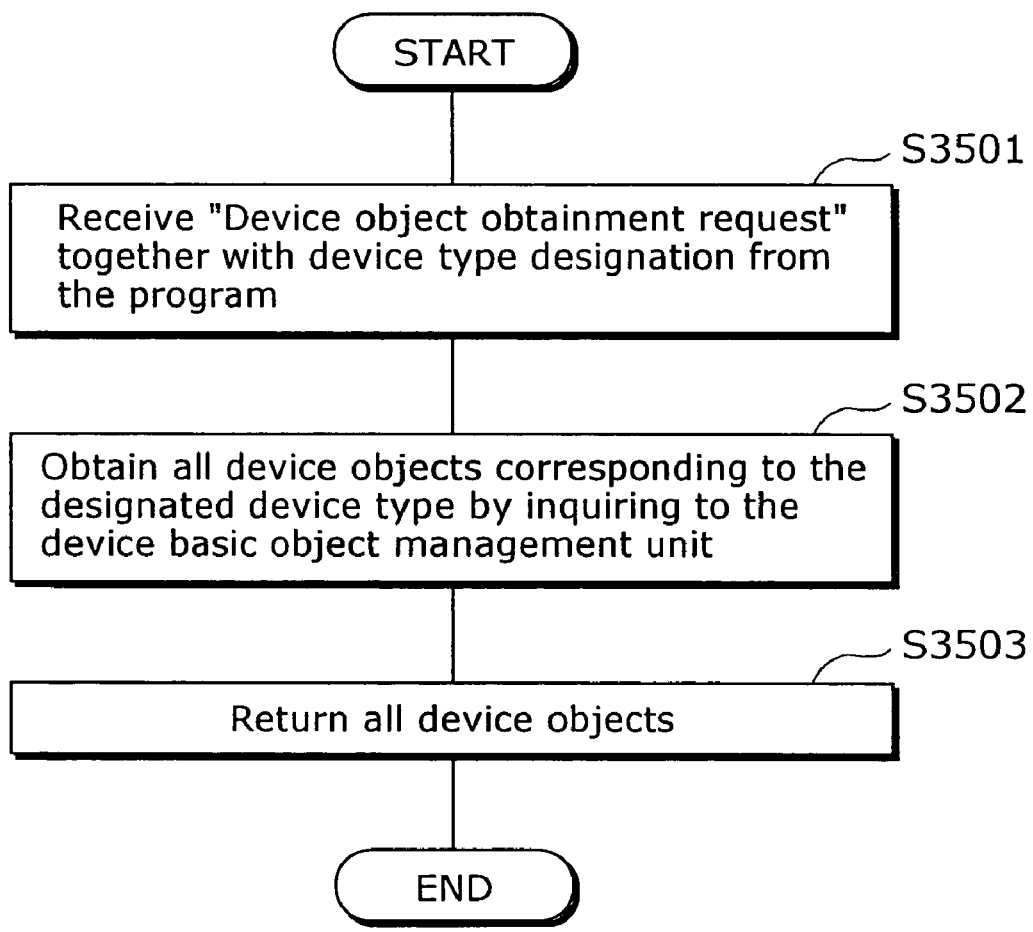
FIG. 36 shows the sequence during the device object obtainment by the device manager in the present invention.

The third function of the device manager 2205*f* is to provide the function for returning Java objects (hereinafter as device objects (device identifiers)) having a one-to-one correspondence with the devices managed by the device manager 2205*f*. As the only tuner in the present embodiment is the single tuner 1801 in FIG. 18, the object having a one-to-one correspondence with the tuner 1801 is returned for the "device object obtainment request" having a device type as "tuner". In addition, since a Y number exist for the section filter in the present embodiment, as previously mentioned, a Y number of objects corresponding on a one-to-one basis with the respective section filters is returned, for the "device object obtainment request" with the device type as "section filter". As the object returned by the present function corresponds to a particular device, the object can be used as the identifier for the device during the execution of the Java program. For example, in the case where a tuner and a PID filter are to be logically connected, the logical connection procedure for the device object representing the tuner 1801 and the device object representing one of the X number of PID filters 1802 on a one-to-one basis, is in itself interpreted as logically connecting the tuner 1801 and the "PID filter among the X number of PID filters 1802, corresponding to the device object on a one-to-one basis". Using the present function, the Java program is able to obtain identifiers for the devices existing in the hardware configuration. FIG. 36 is a flowchart showing the procedures for implementing the present function. First, a device type designation and an "all device object obtainment request" is received from the Java program (S3501). The device manager 2205*f* then obtains all the device objects corresponding to the devices having the designated device type by inquiring to the device object management unit 3202 (S3502). After this, it returns all the obtained device objects to the Java program (S3503).

Figure 37:
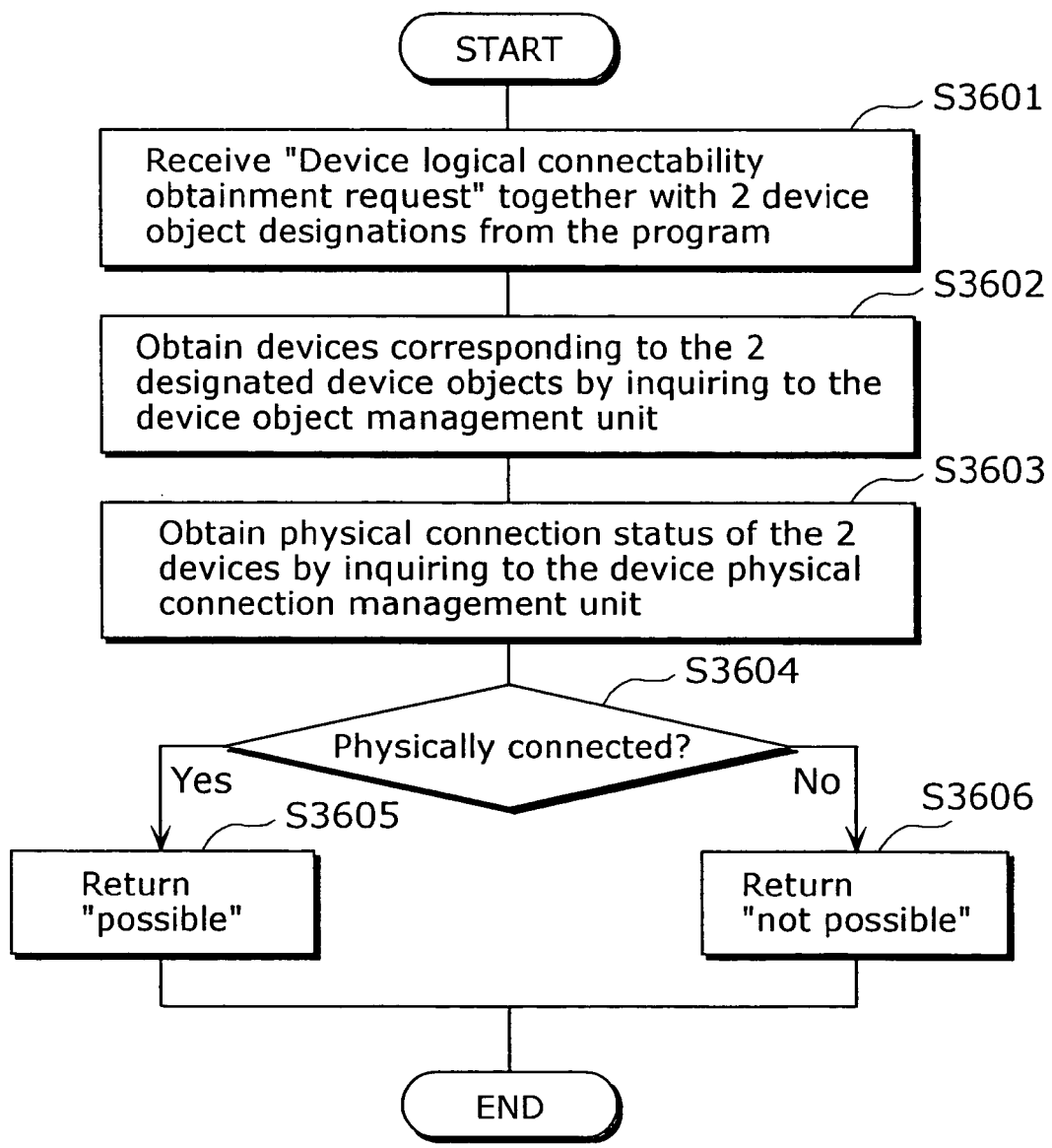
FIG. 37 shows the sequence for the device connectability obtainment by the device manager in the present invention.

As the fourth function of the device manager 2205*f*, the device manager 2205*f* provides the Java program with a device logical connectability obtainment function for obtaining a judgment result as to whether or not a logical connection is possible (logical connectability) between devices managed by the device manager 2205*f*. For example, in the present embodiment, as the section filter and the AV decoder are not physically connected, as can be seen in FIG. 18, a logical connection is not possible. In such manner, the function for obtaining whether the connection according to the device designation, itself, is possible or not is realized. Using the present function, the Java program is able to recognize the possibility of logical connections between devices. FIG. 37 shows the procedure for implementing the present function. First, upon receiving the designation of the device objects corresponding to the two devices for which the logical connectability is to be evaluated, and a "logical connectability obtainment request for the devices", from the Java program (S3601), the device manager 2205f obtains the devices corresponding to the two designated device objects by inquiring to the device object management unit 3202 (S3602). Next, it obtains the physical connection status with regard to the two devices by inquiring to the device physical connection management unit 3203 (S3603). It then judges the physical connection obtained (S3604), and returns "possible" if the devices are directly, physically connected (S3605), or "not possible" if they are not directly, physically connected (S3606). If there is no physical connection, nothing further is done.

Figure 38:
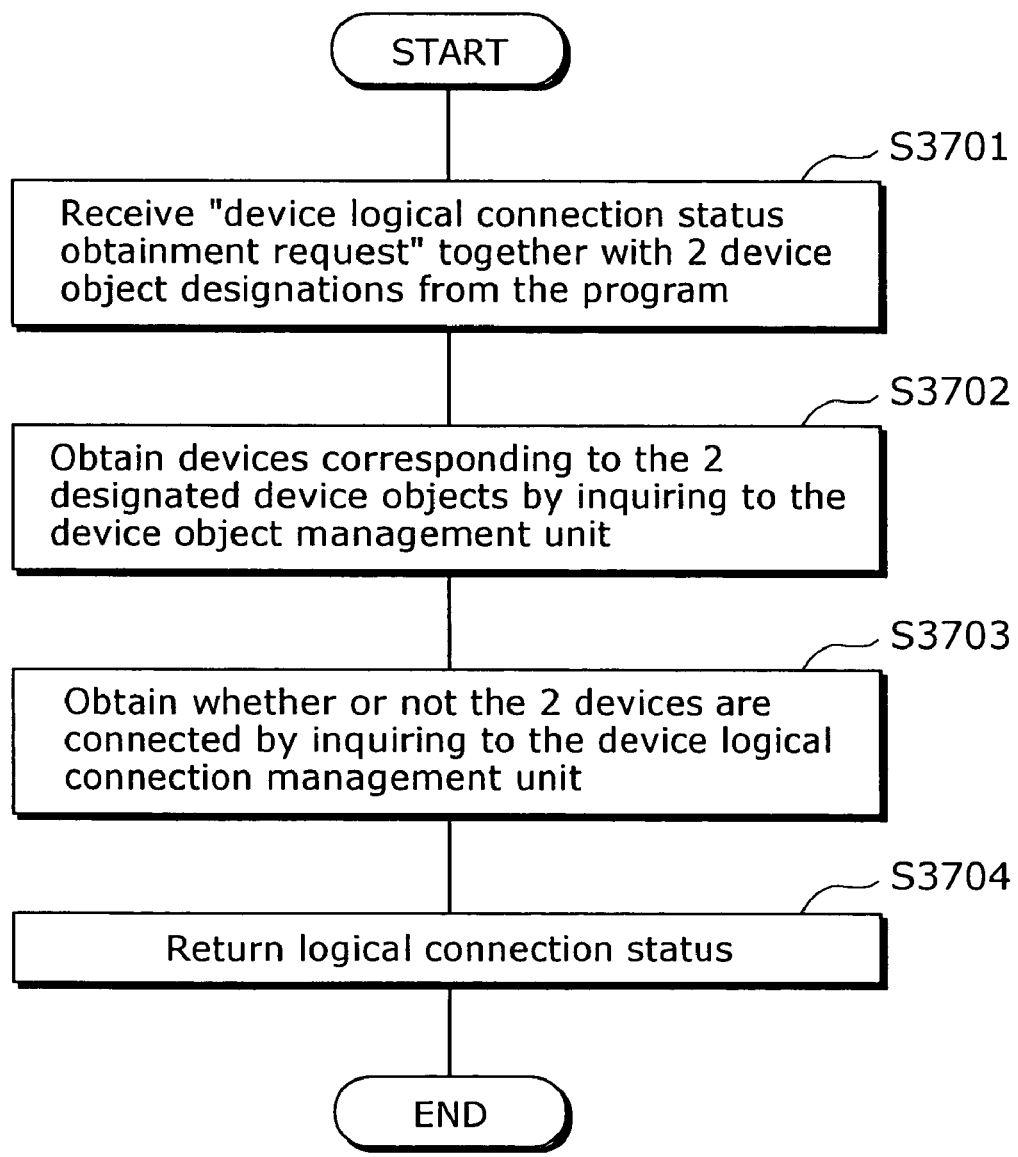
FIG. 38 shows the sequence for the device connection status obtainment by the device manager in the present invention.

The fifth function of the device manager 2205f is providing the Java program with the function for obtaining the logical connection status of the devices managed by the device manager 2205f. For example, in the case where a certain section filter is logically connected to a PID filter, logically connecting such section filter to another PID filter is not desirable as the device configuration within the device logical connection path is altered, affecting the operational results of devices. Using the present function, the Java program is able to obtain the device status, as to whether they are logically connected or not. FIG. 38 shows the procedures for implementing the present function. Upon receiving the designation for the device objects corresponding to the two devices for which status of the logical connection is to be evaluated, and a "device logical connection status obtainment request" from the Java program (S3701), the device manager 2205f obtains the devices corresponding to the two device objects by inquiring to the device object management unit 3203 (S3702). Next, it obtains the status of the logical connection of the two devices by inquiring to the device logical connection management unit 3204 (S3703), and returns the result to the Java program (S3704).

Figure 39:
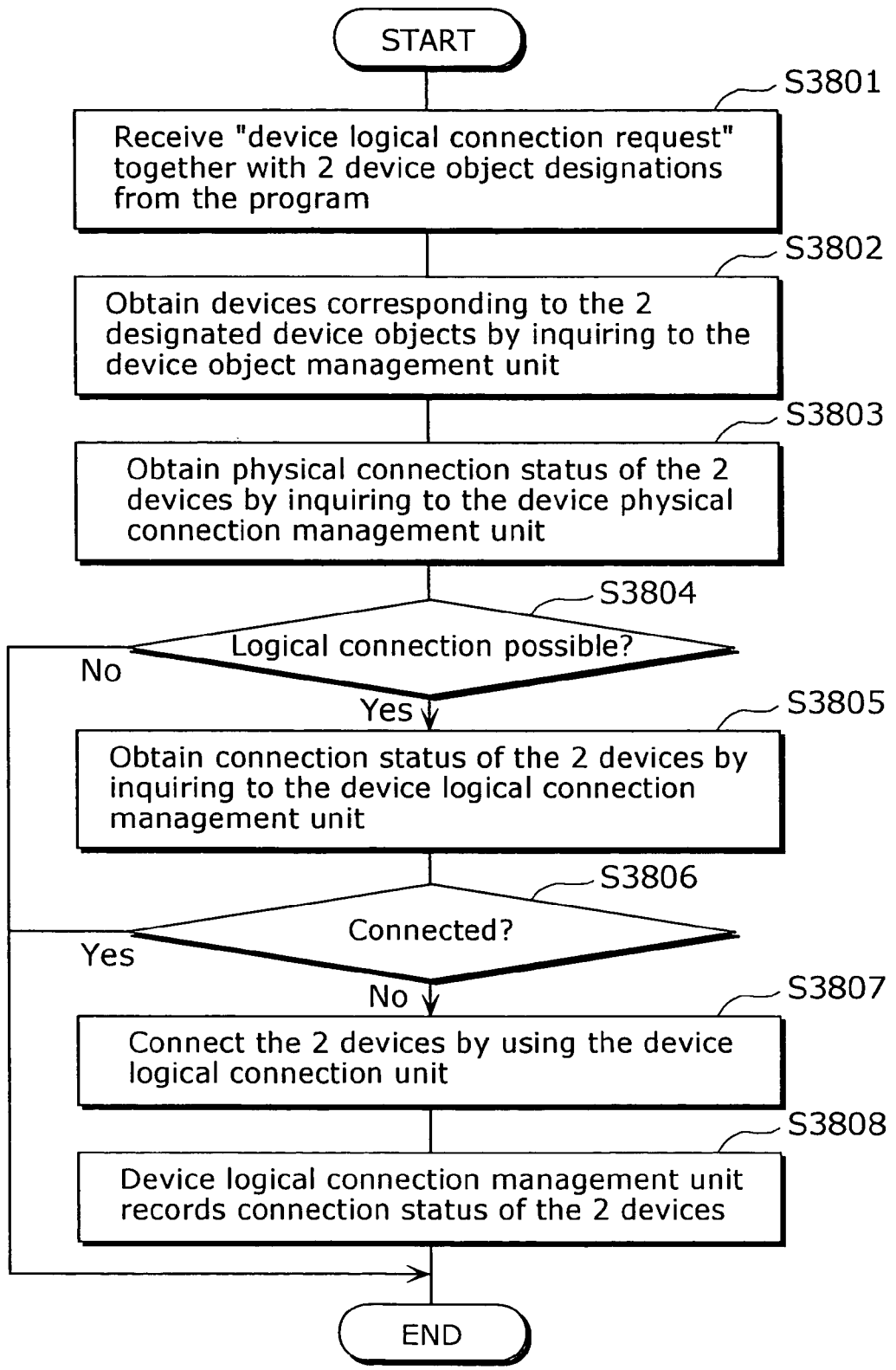
FIG. 39 shows the sequence for device connection by the device manager in the present invention.

The sixth function of the device manager 2205f is to provide the Java program with the function for performing logical connections between devices managed by the device manager 2205f. It logically connects devices in the case where devices that can be logically connected are designated. Using the present function, the Java program carries out logical connection of devices. FIG. 39 shows the procedure for implementing the present function. Upon receiving the designation for the device objects corresponding to the two devices for which the logical connection is desired, and a "device logical connection request" from the Java program (S3801), the device manager 2205f obtains the devices corresponding to the two designated device objects by inquiring to the device object management unit 3202 (S3802). Next, it obtains the physical connection status of the two devices by inquiring to the device physical connection management unit 3203 (S3803), and judges the possibility of a logical connection (S3804). If the logical connection is possible, it obtains the logical connection status of the two devices by inquiring to the device logical connection management unit 3204 (S3805), and performs judgment (S3806). If there is no logical connection between the two devices, and one of the devices is not logically connected to another device which is of the same device type as the other device, the two devices are logically connected using the device logical connection unit 3205 (S3807), and the connection of the two devices is recorded onto the device logical connection management unit 2304 (S3808). To describe the judgment in S3806 in more detail, first in the case where "a logical connection between the two devices already exists", as there is no point in connecting again, nothing is done. In addition, if "one of the two devices is connected to another device which is of the same type as the other device", forcing a logical connection would break existing device logical connection paths. For example, when the PID filter A and the section filter A are specified, an evaluation of the logical connection status is performed. In the case where the PID filter A is already connected to a section filter B, nothing is done. However, if the PID filter A is in a logically connected status with the tuner A but is not logically connected to other section filters, as it is not "of the same device type", the device logical path would not be broken, and the connection is carried out.

Figure 40:
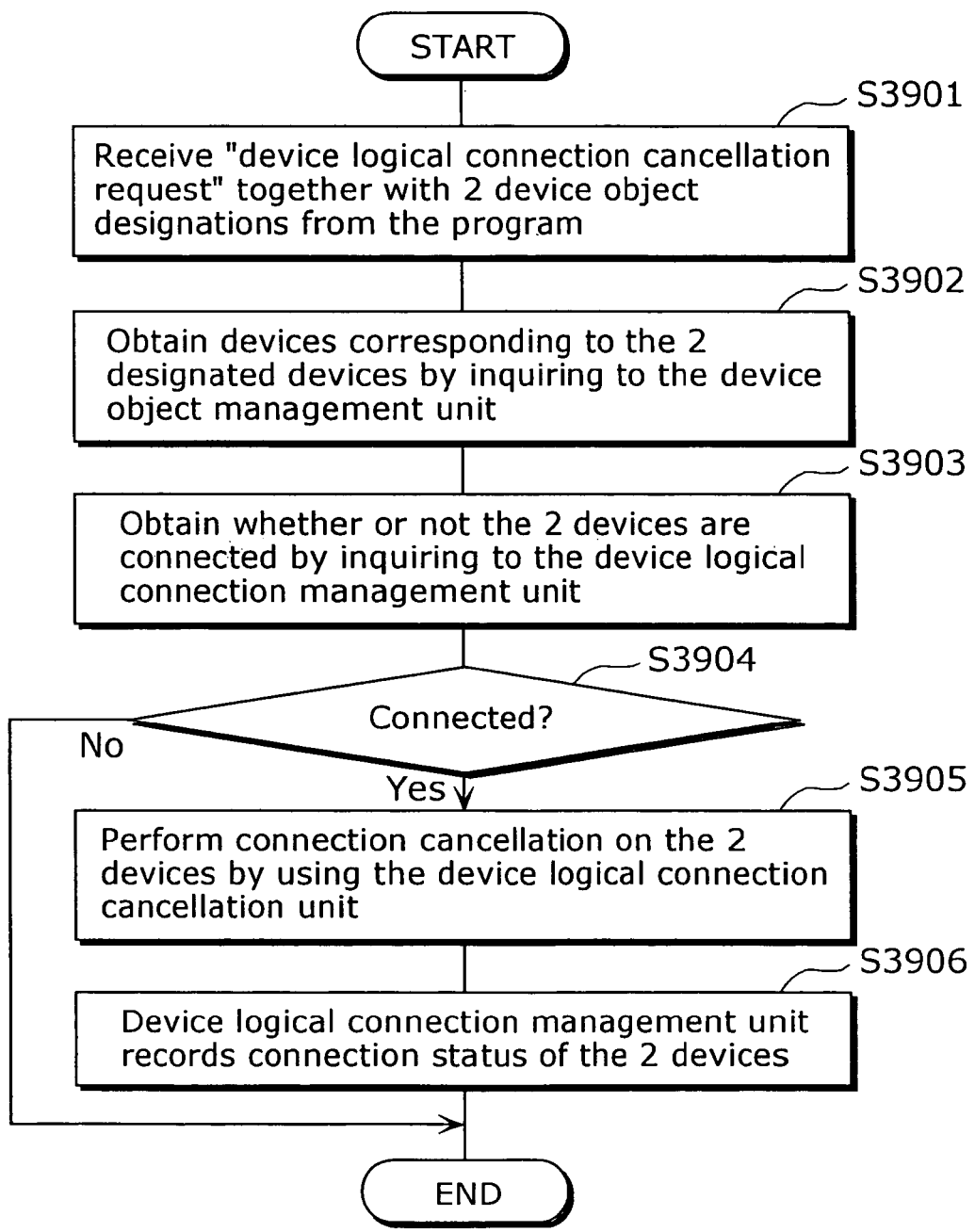
FIG. 40 shows the sequence for device connection cancellation by the device manager in the present invention.

The seventh function of the device manager 2205f is to provide the Java program with the function for canceling a logical connection between devices managed by the device manager 2205f. Using the present function, the Java program performs the cancellation of logical connections of devices. FIG. 40 shows the procedures for implementing the present function. Upon receiving the designation for the device objects corresponding to the two devices for which the cancellation of the logical connection is desired, and a "device logical connection cancellation request", from the Java program (S3901), the device manager 2205f obtains the devices corresponding with the two designated device objects by inquiring to the device object management unit 3202 (S3902). Next, it obtains the logical connection status of the two devices by inquiring to the device logical connection management unit 3204 (S3903), and performs judgment (S3904). If they are logically connected, the connection of two devices is cancelled using the device logical connection cancellation unit 3206 (S3905), and the cancellation of the connection of the two devices is recorded onto the device logical connection management unit 3204 (S3906). If they are not logically connected, nothing is done.

Figure 41:
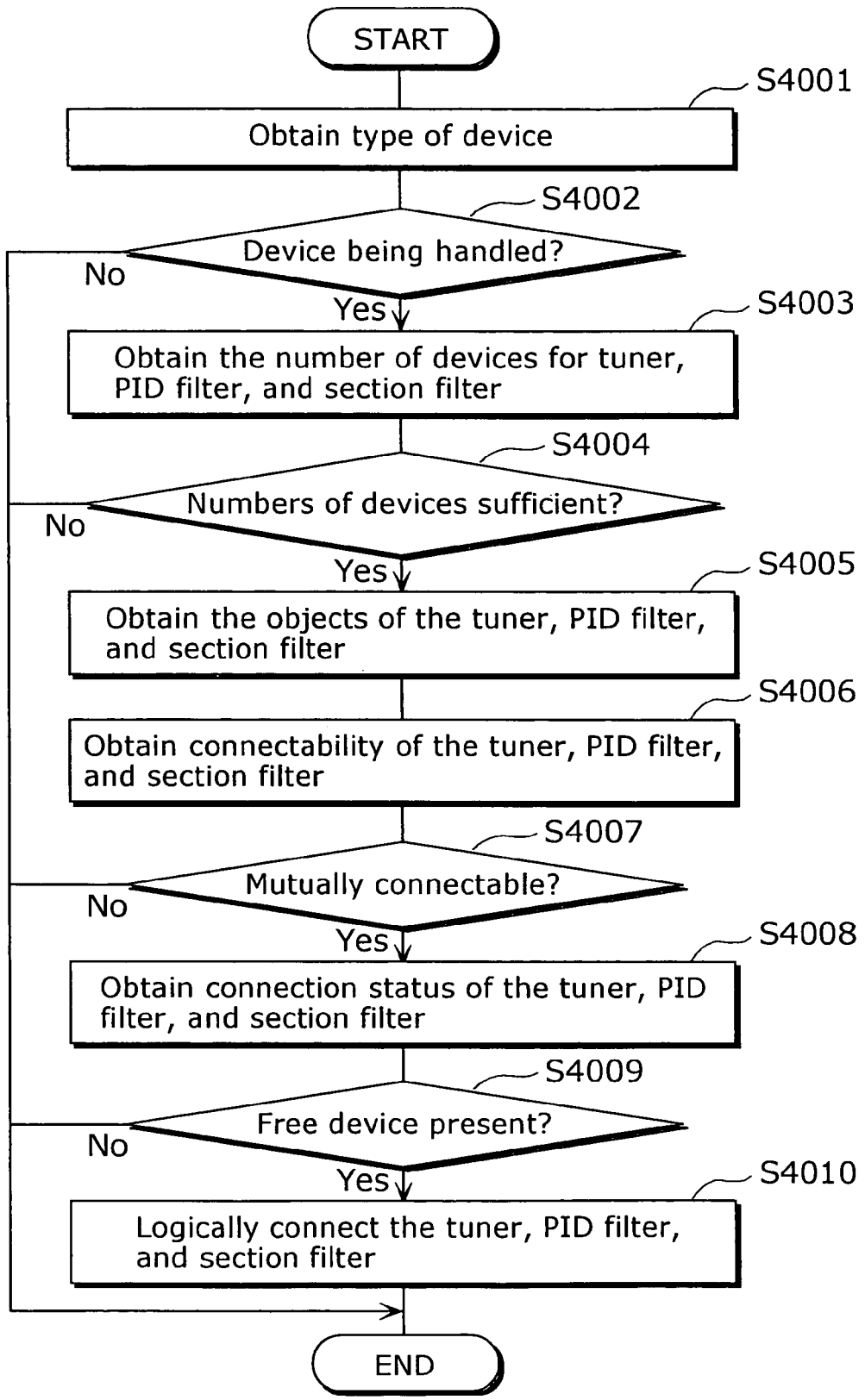
FIG. 41 shows the sequence for device connection by a program, using the device manager in the present invention.

FIG. 41 shows an example of the procedure for the performance of a logical connection of devices by the Java program. The flowchart in FIG. 41 lists the procedure used during the extraction of data from a broadcast signal using three section filters. In the present embodiment, it is presumed that the Java program previously possesses the knowledge regarding the devices required during the use of the section filters, as well as the connection sequences of such devices. First, the types of the devices are obtained (S4001). Next, the obtained device types are checked of whether they cover a tuner, PID filter, or section filter (S4002). If the required device types are all handled by the device manager 2205f, the number of devices found for each device type of the devices is obtained (S4003). Judgment is made (S4004) as to whether the number of devices actually existing is larger than the number of devices to be used (for this example, whether there are one or more tuners, three or more PID filters, and three or more section filters), and in the case where the number is larger, device objects for each device type are obtained (S4005). Next, the possibility of logical connection between the device objects is obtained (S4006), and an evaluation is made as to whether logical connection is mutually possible (S4007). To be specific, the logical connectability of the tuner and each PID filter, as well as the logical connectability of each PID filter and each section filter is evaluated. If all devices can be logically connected, the logical connection status of each device is then obtained (S4008). If a devices in an unconnected state are found (S4009), each device is logically connected (S4010). By carrying out this procedure, the Java program is able to logically connect devices to each other, and subsequently, by using "an operation library for each individual device" such as the tuner 2205a found in the Java library 2205, the realization of a desired function is made possible. In the case where conditions are not met in the judgment procedure S4002, the judgment procedure S4004, the judgment procedure S4007, and the judgment procedure S4009, the logical connection of devices, as is, is not possible. In the case where conditions are not met in the judgment procedure S4007 and the judgment procedure S4009, if there is an excess available in the device objects obtained in S4005, it is possible to try with such excess device objects. In addition, in the case where the condition is not met in the judgment procedure S4009, it is possible to cancel an existing logical connection between the devices, using the device logical connection cancellation function which is the seventh function of the device manager 2205f, and try again.

Furthermore, in the present embodiment, the deletion of the ROM 1209 can be carried out by storing the contents stored in the ROM 1209 in the secondary storage unit 1207. In addition, the secondary storage unit 1207 is made up of a plurality of sub-secondary storage units, and the storage of different information in individual sub-secondary storage units can be carried out. For example, it is possible to have detailed partitions such as storing only tuning information in one sub-secondary storage unit, storing the library 2201b of the OS 2201 in another sub-secondary storage unit, and storing the downloaded Java program in yet another sub-secondary storage unit, and so on.

In addition, although in the present embodiment the downloaded Java program is stored in the secondary storage unit 1207, storage in the primary storage unit 1208 can also be carried out. In the case of storage in the primary storage unit 1208, when the power source is turned OFF, all information stored shall be lost.

Furthermore, although explanation is made exemplifying the broadcast receiving apparatus as an information processing apparatus, aside from this, the present invention can also be applied even for information processing apparatuses such as a personal computer, a mobile telephone, or the like. In addition, the present invention is likewise naturally applicable for information processing apparatuses for performing data processing (for example, recording, playback, and so on) within recording media for recording information, such as a CD, a DVD, a BD (Blue-ray Disc), a DVHS, and a memory, even if broadcast receiving is not possible.

Second Embodiment

The hardware configuration of the first embodiment conforms to that in FIG. 12, and assumes that the descrambler 1804 is located inside the TS decoder 1202. However, the physical connection sequence of devices handled by the device manager 2205f is not always constant. The hardware configuration of the present embodiment conforms to that in FIG. 15. In the hardware configuration shown in FIG. 15, as shown in the corresponding FIG. 20, the descrambler is not found inside the TS decoder 1502, and the descrambler 2004 is found inside the adapter 1511. In the present configuration, the sequence of physical connections is different to those in the first embodiment. Even in such cases, the device physical connection management unit 3203 manages information regarding the physical connection sequence of devices. During the obtainment of the connectability for devices, the device manager 2205f, in the same manner as in FIG. 37, obtains the device connection sequence by inquiring to the device physical connection management unit 3203, and a judgment considering the obtained result is made possible. By performing such implementation, the present invention can be applied to any hardware configuration without dependence on the physical connection sequence of devices.

Third Embodiment

The hardware configuration of the first embodiment conforms to that in FIG. 12, and the device manager 2205f handles as devices, the "tuner", "PID filter", "section filter", "descrambler", and "AV decoder". However, in FIG. 12, other devices such as the "display" and the "speaker" also exist. In addition, devices other than those found in FIG. 12 and FIG. 18 can also exist. For example, aside from the devices found in FIG. 18, a case where a "switch" device for outputting an inputted MPEG-2 transport stream to another device that is physically connected to the TS decoder 1202, is located in the TS decoder 1202 found in FIG. 12. In addition, it is also possible to have a device which deletes unnecessary information from an inputted MPEG-2 transport stream according to the specification of the CPU 1206, and passes sectional TS known as a "partial TS" to other devices that are physically connected to the TS decoder 1202. In HDD recorders possessing an HDD (Hard Disk Drive), there exists a device where the HDD has an MPEG-2 transport stream as an input, and with regard to DVD recorders, there exists a device where a "DVD media control apparatus" has an MPEG-2 program stream as an input. In this manner, aside from the devices covered in the first embodiment, a variety of devices exist inside the broadcast receiving apparatus.

Figure 42:
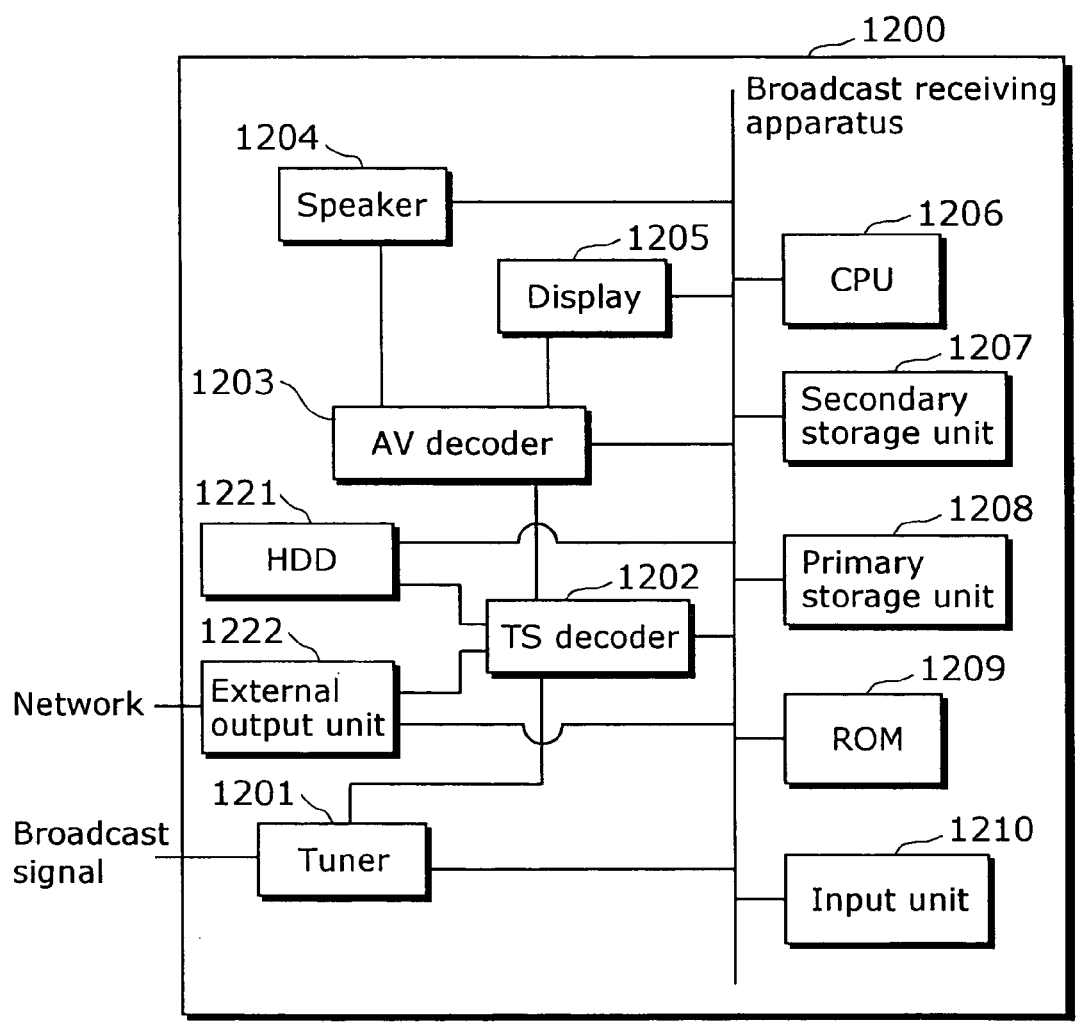
FIG. 42 shows a configuration example of the hardware configuration of the broadcast receiving apparatus in the present invention.

For example, a hardware configuration as that shown in FIG. 42 is also possible. In this hardware configuration, an HDD 1221 to which an MPEG-2 transport stream is inputted, and an external output unit 1222 for outputting an MPEG-2 transport stream to a network, and so on, are included in addition to the configuration in FIG. 12

The device manager 2205f in the present embodiment can handle even information regarding such variety of devices. For this purpose, it is sufficient for each unit of the device manager 2205f to manage the information to the effect that such variety of devices are to be handled as devices. To be specific, in the device basic information management unit 3201, the information on individual devices managed is increased, and in the device object management unit 3202, the sets of devices and device objects managed is increased, the physical connection information managed by the device physical connection management unit 3203 is increased, the device logical connection management unit 3204 manages the logical connection information regarding the devices added, and the device logical connection unit 3205 as well as the device logical connection cancellation unit 3206 are modified to handle the devices added. In the case where a module is further added within the device manager in the other embodiments, the present invention can still be applied by enabling the management of information for the devices added.

In this manner, the handling of other devices is readily made possible in the present invention, without changing the fundamental structural relationships of each unit within the device manager 2205f, or the implementation sequence of each function of the device manager 2205f.

Fourth Embodiment

In the first embodiment, the "tuner", "PID filter", "section filter", "descrambler", and "AV decoder" are cited as the devices managed by the device manager 2205f. However, there are cases where a device not particularly requiring connection or a device for which implied management is desired, exists among such devices. In FIG. 31, as the PID filter is used by necessarily being connected to either the section filter or the AV decoder, flexibility is lost to some extent. However, on the premise that "the PID filter is connected to either the section filter or the AV decoder, in advance," it is possible to recognize by abstraction, a "PID filter and section filter" and a "PID filter and AV decoder", as two types of devices. For example, in the case where the section filter is used, in the first embodiment, there is a need to connect the three types of devices, namely the "tuner", the "PID filter" and the "section filter". However, in the present embodiment, it is sufficient to carry out the connection of the two types of devices, namely the "tuner" and the "PID filter and section filter", enabling the enhancement of the advantages of the Java program. In fact, in the OCAP/DVB-MHP standard, with regard to the section filter for example, on the premise that "the section filter is previously connected to the PID filter," the pair of "the PID filter and the section filter" can be abstracted as one type of device. In this manner, the present invention can be applied even if previously logically connected devices are treated as a single device by abstraction.

In the present embodiment, the abovementioned function is realized by recognizing and recording the actual device pairs as single devices, for all the modules 3201 to 3206 found in the device manager 2205f. By carrying out such implementation, the improvement of the concept of the device manager in the present invention and its compatibility with other existing libraries is made possible.

Fifth Embodiment

In the first embodiment, the device manager 2205f includes the device number obtainment function as its second function. The present function finds out, for every device type, the number of devices that match such device types. It is also possible find out the simple number of devices by counting the number of device objects obtained using the device object obtainment function which is the third function of the device manager 2205f. In other words the device number obtainment function is not an indispensable function.

In the present embodiment, the device manager 2205f does not include the device number obtainment function, which is the second function. The Java program is able to obtain the number of the devices by counting the number of device objects obtained using the device object obtainment function, which is the third function.

Sixth Embodiment

In the first embodiment, the device manager 2205f provides the Java program with the device type obtainment function, which is the first function. However, in the middleware standard, and so on, in particular, in DVB-MHP/OCAP, there are instances where the types of devices covered by middleware are prescribed in the standard. In such cases, it is sufficient to use a device type determined in such standards, as the device type to be specified for the device manager 2205f.

In the present embodiment, the device manager 2205f is not equipped with the device type obtainment function, which is the first function. In the present embodiment, the device manager 2205f does not have the device type obtainment function, which is the first function, and the Java program instructs the device manager 2205f by using the prescribed device types.

Seventh Embodiment

In the sixth embodiment, the device manager 2205f does not provide the device type obtainment function which is the first function, and the Java program uses the useable device types prescribed by the middleware, as the device types to designate to the device manager. In addition, a library capable of returning device objects representing devices on a one-to-one basis exists in the DVB-MHP/OCAP standard. For example, the tuner control library found in DVB-MHP/OCAP middleware holds a function for providing a device object that corresponds to a tuner found in a broadcast receiving apparatus. With the use of this function, the Java program is able to obtain the device object. Originally, the present function is assumed to be designated for the purpose of identifying a tuner during the use of the function of the tuner control library. However, as to the point of being able to identify a device, it has the same function as the device object explained in the first embodiment.

The device manager 2205f in the present embodiment does not hold a device type obtainment function which is the first function, as well as a device object obtainment function which is the third function. In the present embodiment, the Java program operating in a broadcast receiving apparatus can designate the device objects obtained from the middleware as the identifiers of devices, when using the respective functions of the device manager 2205f. By coordinating with other libraries in the middleware and sharing the device object management unit 3202 with the other libraries, the device manager 2205f can be implemented so that the device objects returned by the other libraries can be designated to the device manager 2205f.

Eighth Embodiment

In the first embodiment, the device manager 2205f includes a device logical connectability obtainment function as its fourth function. As used in the procedure S4006 in FIG. 41, this function is used for judging whether or not the logical connection of devices is possible prior to the performance of the logical connection of such devices by the Java program operating in the broadcast receiving apparatus. Whether or not the logical connection of devices is possible can be obtained by inquiring to the device physical connection management unit 3203, as indicated in the procedure S3603 in FIG. 37. However, as shown in the procedures S3803 and S3804 in FIG. 39, even in the implementation of the device logical connection function which is the sixth function of the device manager 2205f, judgment on the device logical connectability is carried out, and in the case where devices which cannot be logically connected are designated, device logical connection is not performed. In other words, the judgment of device logical connectability is a procedure which can be omitted. In addition, in the case of the device logical connection cancellation function, there is no particular need for judgment of device logical connectability as logical connection cancellation is only performed in the case where the device logical connection status is verified by inquiring to the device logical connection management unit 3204, in the procedure S3903 in FIG. 40, and a device logical connection is already established.

The device manager 2205f in the present embodiment does not include a device logical connectability obtainment function which is the fourth function. Even is such a case, when the Java program operating in a broadcast receiving apparatus uses the device logical connection function, the logical connectability of devices is judged automatically. If the device logical connection function which is the sixth function, is implemented so as to return results, in the case where a device logical connection is not possible, the Java program is able to recognize this from the result notification indicated during the use of the device logical connection function.

Ninth Embodiment

In the embodiments mentioned up to this point, the device manager 2205f includes a device logical connection status obtainment function as a fifth function. This function, as used in the procedure S4008 in FIG. 41, is used to find out whether a logical connection between devices is already established, before the Java program operating in a broadcast receiving apparatus performs a device logical connection or logical connection cancellation. The logical connection status of devices is obtained by inquiring to the device logical connection management unit 3204, as indicated in the procedure S3703 in FIG. 38. However, checking the device logical connection status prior to using the device logical connection function as well as the device logical connection cancellation function is not particularly a necessity. During the logical connection of devices, in the case where the device logical connection function is implemented as indicated in FIG. 39, a check of the logical connection status is performed implicitly. In addition, during the use of the device logical connection cancellation function, the judgment of the device logical connection status in procedure S3903 in FIG. 40 is performed implicitly before the logical connection cancellation. In other words, the obtainment of the device logical connection status is not an indispensable function in using the device logical connection function as well as the device logical connection cancellation function, and the device logical connection and logical connection cancellation using the device manager 2205f is possible even when such function does not exist.

The device manager 2205f in the present embodiment does not include a device logical connection status obtainment function which is the fifth function. During the use of the device logical connection function as well as the device logical connection cancellation function, the Java program operating in a broadcast receiving apparatus is able to use the respective functions without the checking of the device logical connection status. However, in this case, as there is no function in the device manager 2205f for obtaining the device logical connection status, it is necessary for the Java program, itself, to manage the information on the device logical connection paths established using the device logical connection function and the device logical connection cancellation function, which are the sixth and seventh function of the device manager 2205f.

Tenth Embodiment

In the first embodiment, there is a premise that as long as all devices are physically connected, logical connection is possible. However, in actual hardware configurations, depending on the hardware specification, there are many cases where even for devices that are physically connected, there are devices which cannot be logically connected due to the logical connection status of other devices found in the broadcast receiving apparatus. FIG. 14 shall be used as the reference hardware configuration for the tenth embodiment. In the hardware configuration in FIG. 14, two each of the tuner and AV decoder exist; namely the tuner 1401a and the tuner 1401b, and the AV decoder 1403a and the AV decoder 1403b, respectively. Even in this case, the device logical connection paths shall be as shown in FIG. 31A to D, and a tuner and an AV decoder are connected with a PID filter and a descrambler placed in between.

In an environment such as the one above, in the present embodiment, it is assumed that as a hardware specification of the TS decoder 1402, a default exists to the effect that "PES packets obtained from an MPEG-2 transport stream inputted from the same tuner cannot be outputted simultaneously to a plurality of AV decoders. To be specific, for example, while a PES packet which is sorted out using a PID filter, from an MPEG-2 transport stream inputted to the TS decoder 1402 from the tuner 1401a, is being outputted to the AV decoder 1403a, a PES packet sorted out from the same MPEG-2 transport stream using a different PID filter cannot be outputted to the AV decoder 1403b. In an environment such as the one above, the possibility of connection between a PID filter and an AV decoder is dynamically changed, depending on the logical connection status between the tuner and PID filter. This is because the possibility of connection between the PID filter and the AV decoder is also changed, depending on the presence or absence of a connection between the tuner and the PID filter.

In such a case, "connection conditions between the PID filters and between the AV decoders" is new information that has to be managed by the device manager. For example, under the current environment, during the logical connection of a PID filter and an AV decoder, the condition for allowing the logical connection is either the "the designated PID filter is not logically connected to either tuner," or "the designated PID filter is logically connected to a tuner but such tuner is not logically connected to another PID filter," or "the designated PID filter is logically connected to a tuner and such tuner is logically connected to another PID filter, but such other PID filter is not logically connected to another AV decoder."

In the present embodiment, a device logical connection condition management unit is introduced into the device manager 2205f, as a new component. The device logical connection condition management unit manages the logical connection conditions of devices such as those mentioned above, and by accessing the device logical connection condition management unit when necessary, the device manager 2205f is able to obtain a device logical connection condition. The device logical connection condition management unit holds information in the primary storage unit 1208, the secondary storage unit 1207, and the ROM 1209, and is managed by the device manager 2205f.

Figure 43:
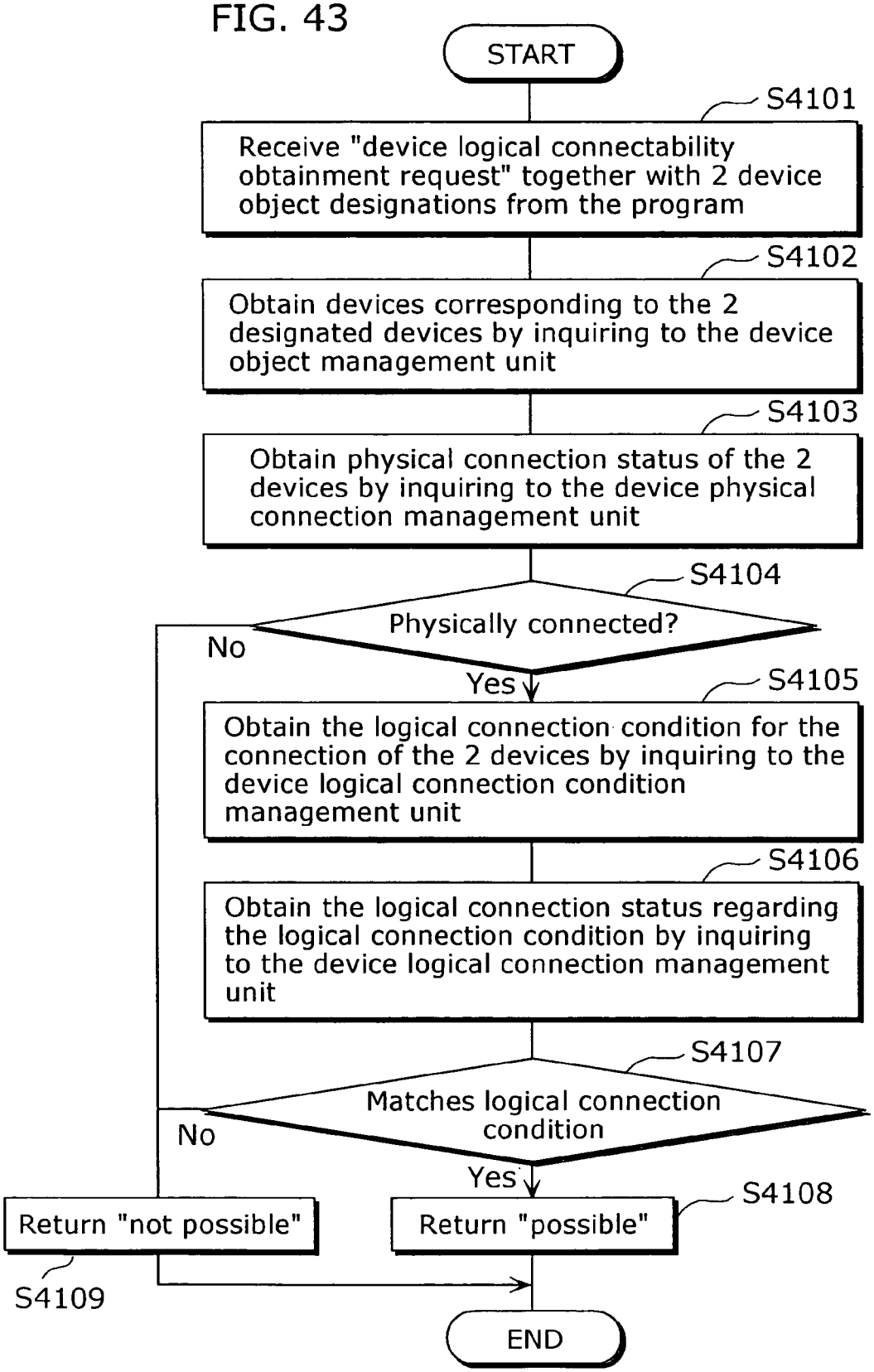
FIG. 43 shows the sequence for device connectability obtainment in the tenth embodiment of the present invention.

FIG. 43 shows the sequence in the case where the device manager 2205f receives a "device logical connectability obtainment request" from the Java program. Upon receiving a "device logical connectability obtainment request" issued by the Java program (S4101), the device manager 2205f obtains the devices corresponding to the two designated device objects by accessing the device object management unit 3202 (S4102). Next, it obtains the physical connection status of the two corresponding devices by inquiring to the device physical connection management unit 3203 (S4103). If the devices are physically connected (S4104), the device logical connection condition pertaining to the logical connection of the two devices is obtained by inquiring to the device logical connection condition management unit introduced in the present embodiment (S4105). Next, following the obtained device logical connection condition, a device logical condition status corresponding to such condition is obtained from the device logical connection management unit 3204 (S4106). The device logical connection status is judged as to whether or not it matches the device logical connection condition (S4107), and if found to be matching, a response of "possible" is returned (S4108). If conditions are not met in the judgment procedure S4104 and judgment procedure S4107, a result of "not possible" is returned (S4109). In the PID filter and AV decoder example, the logical connection condition, "the designated PID filter is not logically connected to any tuner," or "the designated PID filter is logically connected to a tuner but such tuner is not logically connected to another PID filter," or "the designated PID filter is logically connected to a tuner and such tuner is logically connected to another PID filter, but such other PID filter is not logically connected to an AV decoder which is different from the one designated," is obtained in the procedure S4105. Accordingly, a procedure is adopted where the logical connection status between the devices in the combinations emerging from the logical connection condition in the procedure S4106 are evaluated, and judgment is made as to whether or not the logical connection condition is met in the procedure S4107.

In addition, in the case where the device manager 2205f receives a "device connection request" from the Java program, as in the logical connectability obtainment sequence in FIG. 43, the connection between other devices is evaluated using the device logical connection management unit 3204, following the device connection condition obtained from the device connection condition management unit, in addition to the condition obtainment (S3803) using the device physical connection management unit 3203 in FIG. 39. Connectability is judged after putting together such results. In this case, in the case where connection is not possible according to the judgment from the connection condition, an error which expresses that the connection is not possible according to the connection condition, can be returned to the Java program.

Through the performance of an implementation such as the one above, the present invention can be applied even in a hardware configuration where the possibility of connection is dynamically changed according to the connection status of devices.

Eleventh Embodiment

In the first embodiment, there is a limitation to the effect that the respective devices (the PID filter, the section filter, the descrambler) within the TS decoder 1202 are allowed only a one-to-one logical connection with each other. However, in actuality, there are TS decoders which allow one-to-many logical connections for the respective devices. In addition, there are also hardware configurations where the maximum number of connections between devices is prescribed. In the present embodiment, a premise is assumed that for one PID filter, a plurality of section filters, the maximum number being five, can be logically connected.

In such an environment, the device manager 2205f has to manage "the maximum number of logical connections between the respective devices". In this environment, the condition is "the PID filter can be logically connected simultaneously to five section filters."

In the present embodiment, a device logical connection maximum number management unit is introduced into the device manager 2205f as a new component. The device logical connection maximum number management unit manages the maximum number for logical connections between devices which expresses, as is mentioned above, the device of which device type and the number of logical connections that can be constructed for a device. When necessary, it can be accessed by the device manager 2205f, and the maximum number for device logical connections can be obtained. The device logical connection maximum number management unit holds information in the primary storage unit 1208, the secondary storage unit 1207, and the ROM 1209, and is managed by the device manager 2205f. In addition, it can also be managed using dedicated hardware such as a registry.

Figure 44:
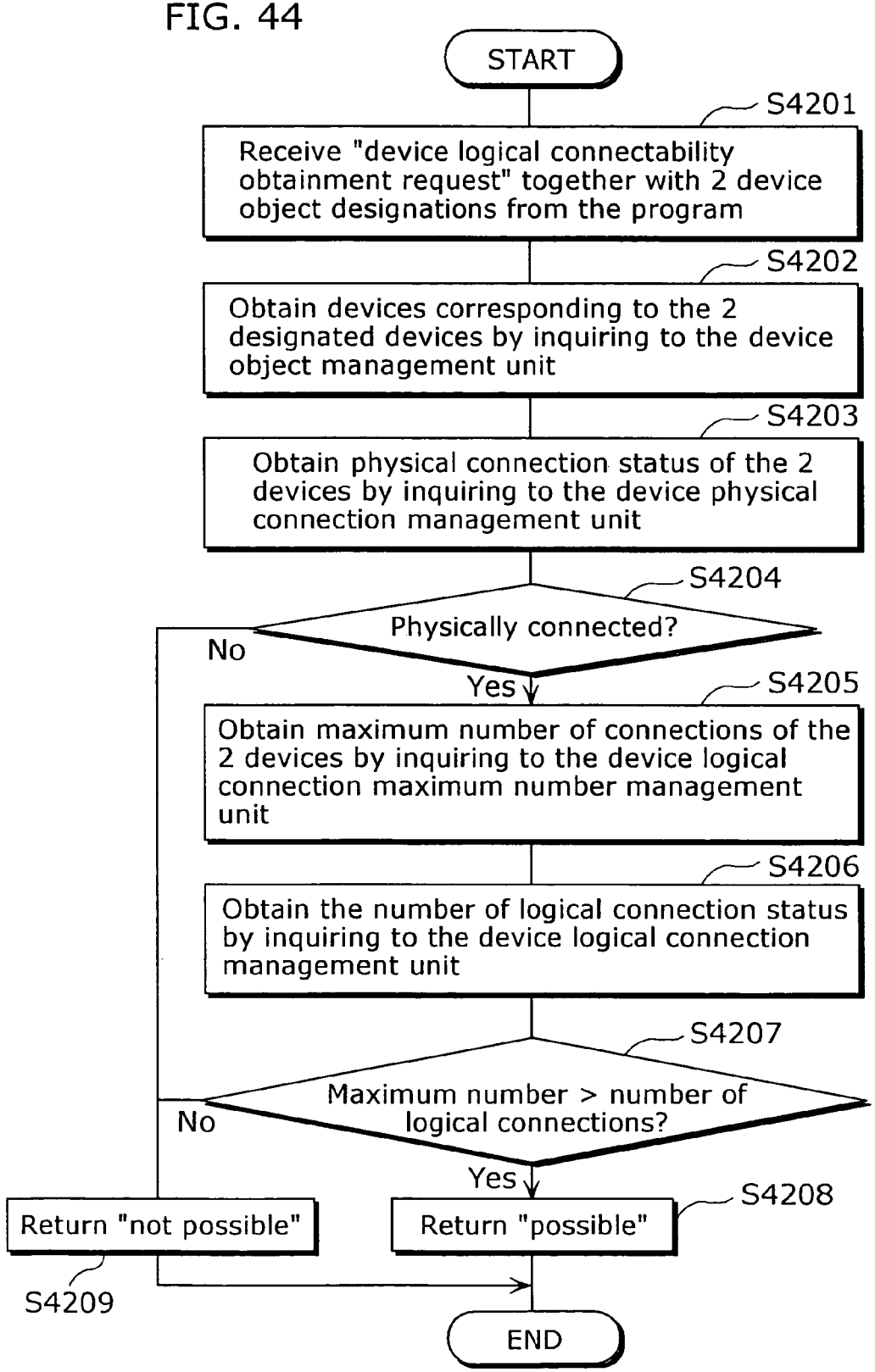
FIG. 44 shows the sequence for device connectability obtainment in the eleventh embodiment of the present invention.

FIG. 44 shows the sequence in the case where the device manger 2205f receives a "device logical connectability obtainment request" from the Java program. Upon receiving the "device logical connectability obtainment request" issued by the Java program (S4201), the device manager 2205f obtains the devices corresponding to the two designated device objects by accessing the device object management unit 3202 (S4202). Next, it obtains the physical connection status of the two corresponding devices by inquiring to the device physical connection management unit 3203 (S4203). If they are physically connected (S4204), the maximum number for logical connections pertaining to the logical connections of the two devices is obtained by inquiring to the device logical connection maximum number management unit introduced in the present embodiment (S4205). Next, in order to determine the number of logical connections already existing, the device logical connection status is obtained from the device logical connection management unit 3204 (S4206). Judgment is made as to whether or not the logical connections are within the maximum number for logical connections (S4207), and a result of "possible" is returned if the condition is met (S4208). In the case where conditions are not met in the judgment procedure S4204 and the judgment procedure S4207, a result of "not possible" is returned (S4209). In the PID filter and section filter example, "5" is obtained as the maximum number for logical connections in the procedure S4205. Next, the number of existing logical connections is acquired by obtaining the logical connection status of the designated filter and the other section filters (S4206). Using such information, the maximum number for logical connections and the number of existing logical connections are compared in the judgment procedure S4207, and a response of "possible" is returned if the number of existing logical connections is smaller (S4208).

Furthermore, in the case where the device manager 2205f receives a "device connection request" from the Java program, in the same manner as the logical connectability obtainment sequence in FIG. 44, an evaluation is made as to whether or not the maximum number obtained from the device logical connection maximum number management unit has been reached using the device logical connection management unit 3204, in addition to the condition obtainment using the device physical connection management unit 3203 shown in FIG. 39 (S3803). Connectability is then judged after such results are put together. If it is judged as being "possible", the logical connection between the devices is carried out. In the case that it is judged as not logically connectable as a result of the maximum number for device logical connections already being reached, an implementation is possible where an error message to that effect is returned to the Java program.

Figure 45:
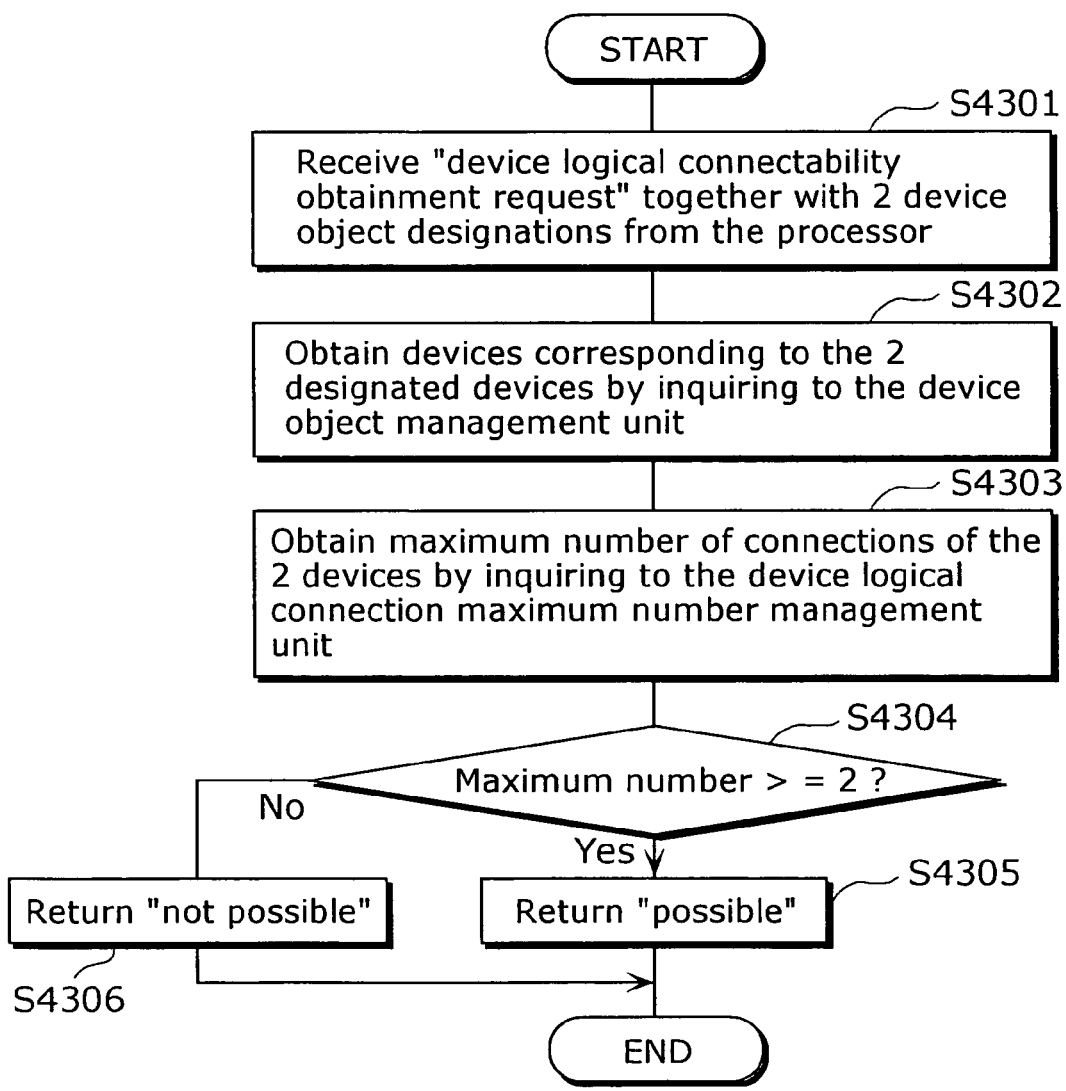
FIG. 45 shows the sequence for the simplest implementation of device connectability obtainment in the eleventh embodiment of the present invention.

Moreover, in the state shown in the present embodiment, a device having a maximum number of connections of two or higher, can be included in a plurality of device connection paths, and is considered as being "shareable." If the Java program is able to find out whether or not a certain device is "shareable," the logical connection of excess devices is averted, and effective logical connection, from the viewpoint of device management, is made possible. In the present embodiment, a device connection shareability obtainment function is provided to the Java program as the eighth function of the device manger 2205f. Using the present function, the Java program can find out whether or not a device represented by a device object is shareable. FIG. 45 shows a sequence diagram of the simplest implementation of the present function. The device manger 2205f, which receives one device type and one device object designation along with a "device connection shareability obtainment request" from the Java program (S4301), first obtains a corresponding device by inquiring to the device object management unit 3202 (S4302). Next, with regard to the subject device, the maximum number for logical connections for the designated device type is obtained by inquiring to the device logical connection maximum number management unit (S4303). If this number is two or higher (S4304), it is possible to have two or more logical connections existing simultaneously between the device and the devices matching the designated device type, and it can be judged as shareable (S4305). Moreover, instead of returning a result of "possible" or "not possible" to the Java program, as mentioned above, there is also a method of returning the maximum number for logical connections itself, as the method for representing the result "shareable". Even if such an implementation is carried out, the Java program is able to judge whether or not a device is "shareable".

Through implementations such as the one above, the present invention can be applied even in a hardware configuration where the maximum number for simultaneous connections is prescribed.

Moreover, the simultaneous existence of the device logical connection management unit described in the tenth embodiment and the device logical connection maximum number management unit discussed in the present embodiment is, naturally, also assumed. In such a case, during device logical connectability obtainment, as well as during device logical connection, both the judgment of the logical connection condition (S4105 to S4107) in FIG. 43 as well as the judgment of the logical connection maximum number (S4205 to S4207) in FIG. 44 are necessary.

Twelfth Embodiment

In the first embodiment, using the logical connection status obtainment function which is the fifth function of the device manager 2205f, when inquiring about a logical connection status, the Java program is only able to obtain information as to whether or not logical connection has been carried out between two devices. However, it is possible to have a situation where the Java program will need to know what other device is logically connected to a certain device.

The device object obtainment function, which is the third function of the device manager 2205f in the present embodiment, is expanded to provide the Java program with a function for obtaining information regarding which device a certain device is logically connected to at that point. With this function, when the Java program designates one device object and issues a "device object obtainment request", the device manager 2205f, having received the above, searches for the devices that, at that point, are logically connected to the device corresponding to the designated device object, from within the information regarding logical connection status managed by the device logical connection management unit 3204, and returns all the device objects corresponding to the devices found. In addition, in the case where the designation by the Java program includes the device type, the devices that are of the designated device type are further selected from among the devices that are logically connected to the designated device, at that point. The device objects corresponding to such selected devices are all returned.

In the present embodiment, the Java program can obtain, in a single operation, the devices that are logically connected to a certain device.

Thirteenth Embodiment

In the first embodiment, when the Java program uses the logical connectability obtainment function, which is the fourth function of the device manager 2205f, to inquire about a logical connectability, only the logical connectability between the two devices designated by the Java program can be obtained. However, it is possible to have a situation where the Java program will need to know what other devices are logically connectable to a certain device.

The device object obtainment function, which is the third function of the device manager 2205f in the present embodiment, is expanded to provide the Java program with a function for obtaining information regarding which devices are logically connectable to a certain device at that point. With this function, when the Java program designates one device object and issues a "device object obtainment request", the device manager 2205f, having received the above, searches for the devices that are logically connectable to the devices corresponding to the designated device object, from within the information regarding physical connections managed by the device physical connection management unit 3203, and returns all the device objects corresponding to the devices found. In addition, in the case where the Java program also designates a device type, only the devices that are of the designated device type are further selected, and the device objects corresponding to such selected devices are all returned.

In the present embodiment, the Java program is able to find out, in a single operation, the devices that are logically connectable to a certain device.

Fourteenth Embodiment

In the first embodiment, when the Java program uses the logical connectability obtainment function which is the fourth function of the device manager 2205f, as well as the logical connection status obtainment function which is the fifth function, only the logical connectability, as well as the logical connection status between the two devices designated by the Java program can be obtained. However, there are instances where the Java program will need to know which devices are connectable to a certain device, and which among such devices are not yet connected. In such a case, in the first embodiment, there was a need to evaluate the logical connectability and logical connection status of each device object obtained by the designation of a device type.

In the present embodiment, the device object obtainment function which is the third function the device manager 2205f, is expanded to provide the Java program with a function for obtaining information regarding which devices are at that point, not only connectable to a certain device, but also not yet logically connected. With this function, when the Java program designates one device object and issues a "device object obtainment request", the device manager 2205f, having received the above, first searches for the devices that are logically connectable to the device corresponding to the designated device object, from within the information regarding physical connections managed by the device physical connection management unit 3203. Next, it searches from among the located devices, those that are not yet logically connected, and the device objects corresponding to the devices obtained are returned. In addition, in the case where the Java program also designates a device type, only devices that are of the designated device type are further selected, and all the device objects corresponding to such selected devices are returned.

In the present embodiment, the Java program is able to find out in a single operation, the devices that, aside from being logically connectable to a certain device, are not yet logically connected.

Fifteenth Embodiment

In the first embodiment, judgment of the device logical connection status is carried out within the implementation of the device logical connection function, which is the sixth function of the device manager 2205f. In this case, judgment of the logical connection status of a device is carried out in the procedure S3806 in FIG. 39. In the first embodiment, at this point, the two types of judgments, which are "whether there is already a logical connection between the two designated devices" and "whether one of the two designated devices is logically connected to a different device which is of the same device type as the other device", are carried out. The former is for avoiding waste in the connection status, and the latter is for the purpose of not changing device logical connection paths.

In the present embodiment, within the implementation of the device logical connection function which is the sixth function of the device manager 2205f, only the judgment of "whether the two designated devices are already connected" is performed in the judgment of the logical connection status of devices carried out in the procedure S3806 in FIG. 39, and if they are already connected, nothing is done. Even if one of the two devices is connected to a different device which is of the same device type as the other device, the original device logical connection path is automatically cancelled, and the two designated devices are logically connected instead. The new logical connection path is recorded in the device logical connection management unit 3204.

In the case where this implementation is adopted, the device logical connection cancellation function which is the seventh function of the device manager 2205f becomes unnecessary. This is because, even if there is a logical connection already in existence during the performance of a device logical connection, it is cancelled automatically.

According to the present embodiment, the Java program can construct new device logical connection paths without minding device logical connection paths that are already in existence. However, as there is a possibility that even device logical connection paths which the Java program wants to leave intact will be cancelled automatically during the logical connection of devices, there is a need for the Java program itself, to manage such respective device logical connection paths and the device objects that compose them.

Sixteenth Embodiment

In the first embodiment, as well as the fifteenth embodiment, when the Java program performs a logical connection, as well as a logical connection cancellation using the sixth and seventh functions of the device manager 2205f, the device manager 2205f does not return the result.

For example, in the case shown in FIG. 39, when judging the possibility of a logical connection (S3804), as well as when judging logical connection status (S3806) using the result returned by the device physical connection management unit 3203, the decision as to whether or not to actually perform the logical connection is made (S3807). However, in the first embodiment as well as the fifteenth embodiment, whether or not the logical connection process is carried out, such result is not known to the Java program.

For example, in the case shown in FIG. 40, when judging a logical connection status (S3904) using the result returned by the device logical connection management unit 3204, the decision as to whether or not to actually perform a logical connection cancellation (S3905) is made. However, in the first embodiment, whether the logical connection cancellation is performed or not performed, such result is not known to the Java program.

In the present embodiment, during the use of the logical connection function, as well as the logical connection cancellation function, which are the sixth and seventh functions of the device manager 2205f, whether or not the logical connection as well as the logical connection cancellation is actually carried out is returned synchronously with the execution of the Java program. With regard to the logical connection function, the two types of results to be returned in the sequence in FIG. 39 are, "device connection successful" and "device connection failed". With regard to the logical connection cancellation function, the two types of results to be returned in the sequence in FIG. 40 are, "device connection cancellation successful" and "device connection cancellation failed".

Seventeenth Embodiment

In the sixteenth embodiment, when the Java program performs logical connection as well as logical connection cancellation using the sixth and seventh function of the device manager 2205f, the device manager 2205f returns the result of whether logical connection as well as logical connection cancellation is carried out. However, although in the sequence in FIG. 39 for example, there are three reasons why a connection is not carried out, namely "connection not possible" as judged in the procedure S3804, or "already connected", as well as "another device connection path exists", as judged in the procedure S3806, the Java program is unable to find out the reason why a device connection was not carried out, from the results of whether or not the connection of a device was carried out.

In the present embodiment, during the use of the device logical connection function as well as the device connection cancellation function which are the sixth and seventh functions of the device manager 2205f, the result of whether or not a logical connection is actually carried out, and in addition, in the case where it is not carried out, the reason indicating why it was not carried out, are returned synchronously. For example, in the case of the sequence in FIG. 39, the four types of results returned are "device logical connection successful", "devices not connectable", "devices already logically connected", and "another device logical connection path exists". In the case of the sequence in FIG. 40, for example, the two types of results returned are "device logical connection cancellation successful" and "device is not in a logical connection status".

Eighteenth Embodiment

In the seventeenth embodiment, when the Java program carries out a logical connection using the sixth function of the device manager 2205f, the device manager 2205f returns four types of results. However, among such results, as the result "devices already logically connected" indicates that logical connection is ongoing between the devices, as a post-process status, it is equivalent to "device logical connection successful".

In the present embodiment, when the device logical connection function which is the sixth function of the device manager 2205f is used, the result of whether or not a logical connection is actually carried out, and in addition, in the case where it is not carried out, the reason indicating why it was not carried out, are returned synchronously. However, in the case having "devices already logically connected", a result indicating "device logical connection successful" is returned. In other words, the results returned in the case of the sequence in FIG. 39 for example, are the to three types, namely "device logical connection successful", "device not logically connectable", and "another device logical connection path exists".

Nineteenth Embodiment

In embodiments sixteen to eighteen, when the Java program uses the functions of the device manager 2205*f*, each function is implemented by a synchronized process, and it is not possible to proceed with the execution of the Java program while the device manager 2205*f* carries out the processes of each function. For example, in the span that the device manager 2205*f* processes the logical connection of devices when the Java program issues a "device logical connection request", the Java program has to wait until the logical connection processing by the device manager 2205*f* is concluded. However, depending on the devices being handled by the device manager 2205*f*, there are instances where the logical connection of devices takes time. If the connection process for such devices is implemented as an asynchronous process, it is convenient for the Java program, as the Java program is able to proceed with other processes while the device manager 2205*f* processes the logical connection of such devices.

In the present embodiment, asynchronous result notification is carried out with regard to the functions implemented by the device manager 2205*f*. For that purpose, the device manager holds a device processing result notification listener registration function, as a ninth function. The device processing result notification listener is registered in the device manager 2205*f* by the Java program during the use of the first to eighth functions of the device manager 2205*f*, for the purpose of asynchronously receiving the results of such processes. In order to receive the asynchronous notifications, the Java program registers the device processing result notification listener for receiving the asynchronous notification, in the device manager 2205*f*, prior to or simultaneously with, the use of the functions of the device manager 2205*f*. Subsequently, the Java program uses the functions of the device manager 2205*f*. The device manager 2205*f* relays the processing result to the Java program through the device processing result notification listener.

In the present embodiment, in order to register a device processing result notification listener, the device manager 2205*f* possesses a device listener management unit, for the first time. The device listener management unit is accessed by the device manager 2205*f* and provides a registered device processing result notification listener. The device listener management unit holds information in the primary storage unit 1208, or the secondary storage unit 1207, or the ROM 1209, and is managed by the device manager 2205*f*.

Figure 46:
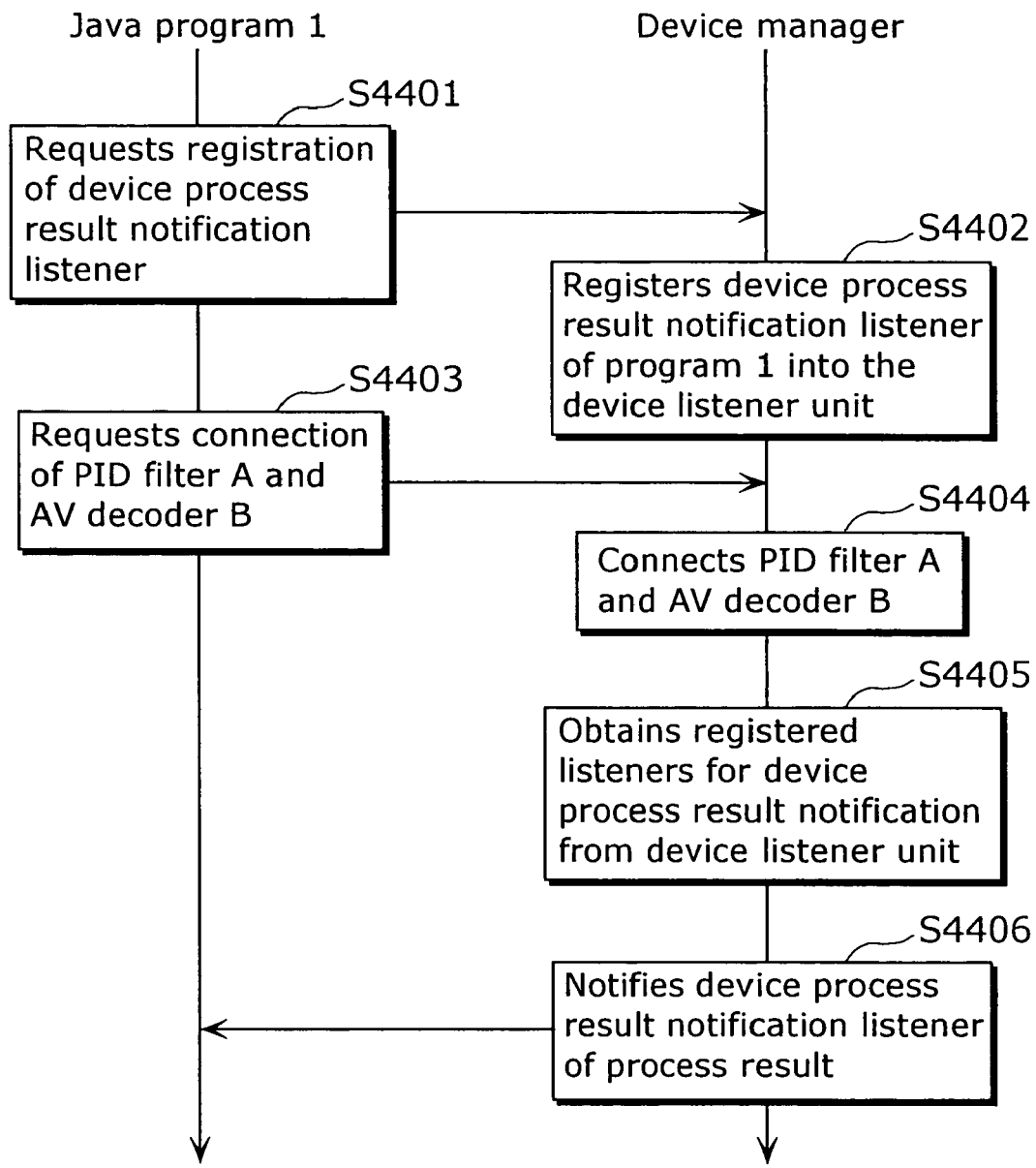
FIG. 46 shows an example of a sequence for device connection by a program in the nineteenth embodiment of the present invention.

FIG. 46 shows the sequence of a device logical connection which is the sixth function, as an example of an asynchronous operation by the Java program used in the present embodiment. First, a Java program 1 issues a "device processing result notification listener registration request" to the device manager 2205*f* (S4401). Having received the request, the device manager 2205*f* groups the device processing result notification listener for the Java program 1 with the Java program 1, and registers it in the device listener management unit (S4402). Next, the Java program issues a "device logical connection request" regarding a PID filter A and an AV decoder B to the device manager 2205*f* (S4403), and the device manager logically connects the PID filter A and the AV decoder B (S4404). From the conclusion of the procedure S4403 onward, the Java program is able to proceed with its own execution, while the device manager 2205*f* carries out the logical connection process for the PID filter A and the AV decoder B. When the logical connection process is concluded, the device manager 2205*f* obtains the device processing result notification listener of the Java program 1, from the device listener management unit (S4405), and relays the logical connection result (S4406).

Moreover, in the present embodiment, there is no need to asynchronize all the functions provided by the device manager 2205*f*. For example, it is possible to apply an implementation where asynchronous notification is only carried out with the device logical connection function which is the sixth function, as well as the device logical connection cancellation function which is the seventh function of the device manager 2205*f*, and synchronous notification is carried out for the other functions.

Through the application of the present embodiment, the Java program is able to proceed with the execution of the Java program itself, during the use of a time-consuming function of the device manager 2205*f*, enabling the realization of efficient operation.

Twentieth Embodiment

In the nineteenth embodiment, as the device processing result notification listener registered by the Java program is registered in the device manager 2205*f* without a device object designation, the processing results for all devices is relayed to the same device processing result notification listener. However, depending on the Java program, there are cases where it is desirable to register a different device processing result notification listener for each device.

In the present embodiment, when the Java program uses the device processing result notification listener registration function which is the ninth function of the device manager 2205*f*, it designates one device object together with the device processing result notification listener. The device manager 2205*f* groups the Java program, the device processing result notification listener, and the device represented by the device object, and records it in the device listener management unit. During the carrying out of a notification, the device manager 2205*f* obtains, in advance, the device processing result notification listener for the device concerned with the process performed, and carries out the notification only to the device processing result notification listener obtained.

Twenty-First Embodiment

In the first embodiment, the device object obtained by using the device object obtainment function which is the third function of the device manager 2205*f*, is used only as an identifier for a device found in the broadcast receiving apparatus, and does not hold information regarding the device itself. For that reason, the Java program, itself, has to manage the group of device objects obtained through the issuance of a "device object obtainment request" to the device manager 2205*f* by the Java program. For example, in the first embodiment, when device objects are obtained by designating "section filter" for the device type, a Y number of device objects can be obtained. When managing these, the Java program needs to use a "device type", as well as an "index indicating the numbering of the device object". This is highly inconvenient, from a device management viewpoint.

In the present embodiment, the device object itself, stores the information regarding the device corresponding to such device object. At the least, all device objects hold "the device type of its device" and "the ID which is uniquely assigned among the devices that are of the same device type". Accordingly, as the device object itself, holds information, it is possible to make management simple for the Java program. In addition, to further simplify device management, it is possible for the device object to manage supplementary information regarding the device object itself. For example, the management of "device names" by device objects can be considered. By handling such names, a more diversified handling of device management becomes possible for the Java program. For example, by assigning the names "tuner A" and "tuner B" respectively, to the tuner 1401*a* and the tuner 1401*b* in FIG. 14, the Java program can make use of the respective names when managing the devices.

These functions are realized through the management of the type, ID, and name, of each device by the device basic information management unit 3201. It is implemented, during the obtainment of a device object by the Java program, when the device manager 2205*f* accesses the device basic information management unit 3201 to obtain the device name, and returns the items set in the device object.

Twenty-Second Embodiment

In the first embodiment, the device objects obtained using the device object obtainment function which is the third function of the device manager 2205*f*, are designated during the use of a function of the device manager 2205*f*, as an identifier for devices present in the broadcast receiving apparatus. Furthermore, in the twenty-first embodiment, the device object holds information for identifying the device corresponding to it, and the Java program can obtain such information from the device object. In the present embodiment, the function of the device object is further expanded, adding a function for using the functions of the device manager 2205*f* through the device object. To be specific, among the functions of the device manager 2205*f*, the device object receives relays to the device manager 2205*f*, requests concerning the device object obtainment function which is the third function, the device logical connectability obtainment function which is the fourth function, the device logical connection status obtainment function which is the fifth function, the device logical connection function which is the sixth function, and the device logical connection cancellation function which is the seventh function. On such occasion, it relays to the device manager, the device to which it has a one-to-one correspondence as the designated device.

Figure 47:
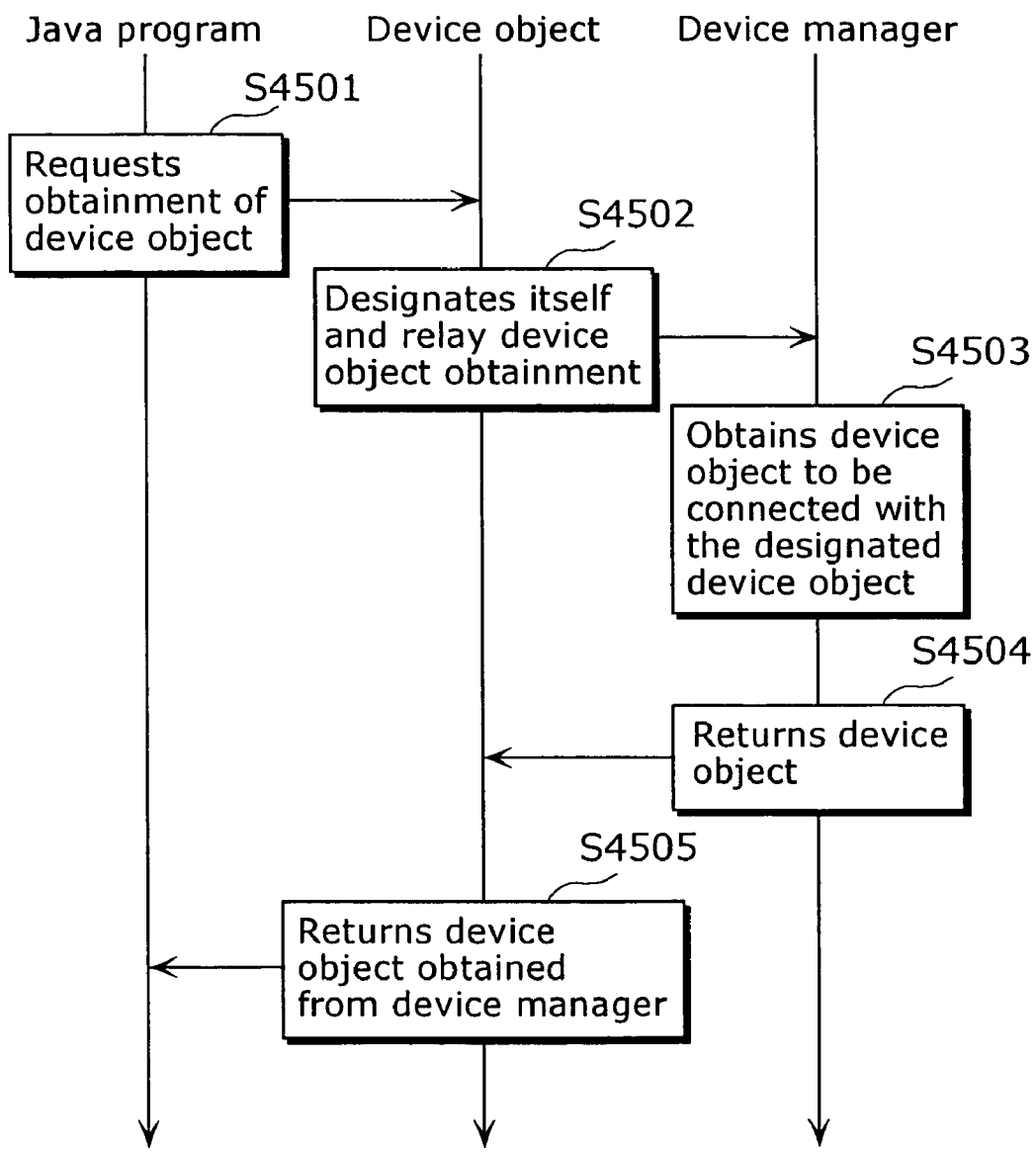
FIG. 47 shows the sequence for device object obtainment in the twenty-second embodiment of the present invention.

During the use of the device object obtainment function which is the third function the Java program can realize the function defined in the twelfth embodiment, the thirteenth embodiment, and the fourteenth embodiment, with regard to the device object obtainment function. In the twelfth embodiment, the device object in a logically connected status with the designated device can be obtained through the designation of one device object and the issuance of a "device object obtainment request" to the device manager 2205*f*. In this case, in the present embodiment, it is possible to issue a "device object obtainment request" to the device object. FIG. 47 shows the sequence for such a case. Upon the issuance of a "device object obtainment request" to the device object by the Java program (S4501), the device object receiving such request designates itself, and relays the "device object obtainment request", to the device manager 2205*f* (S4502). The device manager 2205*f* obtains the device object of the device that is in a logically connected status with the device represented by the original device object (S4503), and returns it to such original device object (S4504). It is then returned to the Java program by the device object (S4505). Likewise, in the case where the Java program designates a device type, it designates itself and such device type, and relays the "device object obtainment request" to the device manager 2205*f*. It then returns to the Java program, the device object returned by the device manager 2205*f*. In the thirteenth embodiment, the device objects representing the devices that are logically connectable to the designated device can be obtained through the designation of one device object and the issuance of a "device object obtainment request" to the device object 2205*f*. In addition, in the fourteenth embodiment, the device objects representing the devices that are logically connectable with the designated device and are, moreover, not yet in a logically connected status, can be obtained through the designation of one device object and the issuance of a "device object obtainment request" to the device object 2205*f*. Even with regard to these, the device object can receive requests, and it is possible to obtain the device objects sought by the Java program through the sequence in FIG. 47.

During the use of the device logical connectability obtainment function which is the fourth function, in the first embodiment, the Java program designates two device objects, and the possibility for logical connection between the devices represented by these device objects is obtained. In the case where this is relayed by a device object, the Java program designates one device object, and issues a "device logical connectability obtainment request" to the device object. Upon receiving such request, the device object designates itself and the device object designated by the Java program, and relays the "device logical connectability obtainment request", to the device manager 2205*f*. The device manager 2205*f* obtains the logical connectability through the same sequence in FIG. 37 of the first embodiment, and returns it to the original device object. The original device object then returns the logical connectability obtained from the device manager 2205*f*, to the Java program. Moreover, in the sequence during the obtainment of the logical connectability by the device manager 2205*f*, it is also possible to use the information held by the device logical connection condition management unit and the device logical connection maximum number management unit, in accordance with FIG. 43 and FIG. 44, for such judgment.

During the use of the device logical connection status obtainment function which is the fifth function, in the first embodiment, the Java program designates two device objects, and obtains the logical connection status between the devices they represent. In the case where this is relayed by a device object, the Java program designates one device object and issues a "device logical connection status obtainment request" to the device object. Upon receiving such request, the device object designates itself and the device object designated by the Java program, and relays the "device logical connection status obtainment request", to the device manager 2205*f*. The device manager 2205*f* obtains the logical connection status through the same sequence as in FIG. 38 of the first embodiment, and returns it to the original device object. The original device object returns the logical connection status obtained from the device manager 2205*f*, to the Java program.

During the use of the device logical connection function which is the sixth function, in the first embodiment, the Java program designates two device objects, and establishes a logical connection between the devices they represent. In the case where this is relayed by a device object, the Java program designates one device object and issues a "device logical connection request" to the device object. Upon receiving such request, the device object designates itself and the device object designated by the Java program, and relays the "device logical connection request" to the device manager 2205f. The device manager 2205f performs logical connection through the same sequence as in FIG. 39 in the first embodiment. Moreover, in an implementation where the device manager 2205f returns the logical connection result, the device object returns the logical connection result obtained from the device manager 2205f, to the Java program. In addition, in the case where the device manager 2205f possesses a device logical connection condition management unit and a device logical connection maximum number management unit, the information held by these units is used for judgment during the judgment of the possibility for logical connection, prior to logical connection.

During the use of the device logical connection cancellation function which is the seventh function, in the first embodiment, the Java program designates two device objects, and cancels the logical connection between the devices they represent. In the case where this is relayed by a device object, the Java program designates one device object and issues a "device logical connection cancellation request" to the device object. Upon receiving such request, the device object designates itself and the device object designated by the Java program, and relays the "device logical connection cancellation request", to the device manager 2205f. The device manager 2205f cancels the logical connection through the same sequence as in FIG. 40 in the first embodiment. Moreover, if it is an implementation where the device manager 2205f returns a logical connection cancellation result, the device object returns the logical connection cancellation result acquired from the device manager 2205f to the Java program.

During the use of the device connection shareability obtainment function which is the eighth function, in the eleventh embodiment, the Java program designates one device object and one device type, and obtains a judgment result on whether or not it is possible to set a plurality of device logical connection paths between the device represented by the designated device object and the devices that are of the designated device type. In the case where this is relayed by a device object, the Java program designates one device type and issues a "device logical connection shareability obtainment request" to the device object. The device object designates the device type designated by the Java program, and itself, as the designated device object, and relays the "device logical connection shareability obtainment request". The device manager 2205f obtains the logical connection shareability in the same manner as in the eleventh embodiment, and returns this to the device object. The device object returns the result obtained from the device manager 2205f, to the Java program.

During the use of the device processing result notification listener registration function which is the ninth function, in the twentieth embodiment, the Java program designates a device processing result notification listener as well as one device object. In the case where this is relayed by a device object, the Java program designates a device processing result notification listener and issues a "device processing result notification listener registration request" to the device object. The device object designates the device processing result notification listener designated by the Java program, and itself, as the designated device object, and relays the "device processing result notification listener registration request". In the same manner as in the twentieth embodiment, the device manager 2205f groups the device processing result notification listener with the device and the Java program, and records it in the device listener management unit. From here on, when the Java program performs a process concerning such device, a result notification is made to the device process result notification listener.

A device object is not required to hold all of the respective functions mentioned above. In a configuration where a device object relays requests for each of the functions from the Java program, functions that do not exist in the device manager 2205f, depending to the embodiment, cannot be possessed by the device object. In addition, even for functions present in the device manager 2205f, the decision as to which among such functions are to be relayed by the device object can me made, depending on the implementation.

Twenty-Third Embodiment

In the first embodiment, during the device number obtainment (S3402) in FIG. 35, the number of the devices that bear the designated device type is returned. In the present embodiment, it assumed that it is possible to obtain the number of all devices present in a broadcast receiving apparatus, without device type designation. This can be implemented by eliminating the designation of a device type in the procedure S3401, obtaining the number of all the devices in the procedure S3402, and providing this to the Java program.

Twenty-Fourth Embodiment

In the first embodiment, during the device object obtainment (S3505) in FIG. 36, the device objects corresponding to all the devices bearing the designated device type are returned. In the present embodiment, it is assumed that it is possible to obtain the device objects corresponding to all the devices existing in a broadcast receiving apparatus, without device designation. This can be implemented by eliminating the designation of a device type in the procedure S3501, obtaining the device objects corresponding to all the devices in the procedure S3402, and providing this to the Java program. In addition, in this case, in order for the obtained device objects to provide the Java program with information on what they represent, it is required for each device object to hold information regarding itself. At the least, it is assumed that they hold their device type.

Twenty-Fifth Embodiment

The broadcast receiving apparatus assumed in the present invention can simultaneously execute a plurality of Java programs. For that reason, there are instances where a plurality of Java programs that alter the logical connection paths of devices, exist. In that case, there are instances where the Java program needs to find out the change in the logical connection status of a certain device. For example, in the case where the device to be used by the Java program 1 is already logically connected by the Java program 2, if the Java program 1 is able to find out the timing of the cancellation of the logical connection regarding such device, it would be convenient as there is no need for the Java program 1 to periodically check the logical connection status of such device.

Figure 48:
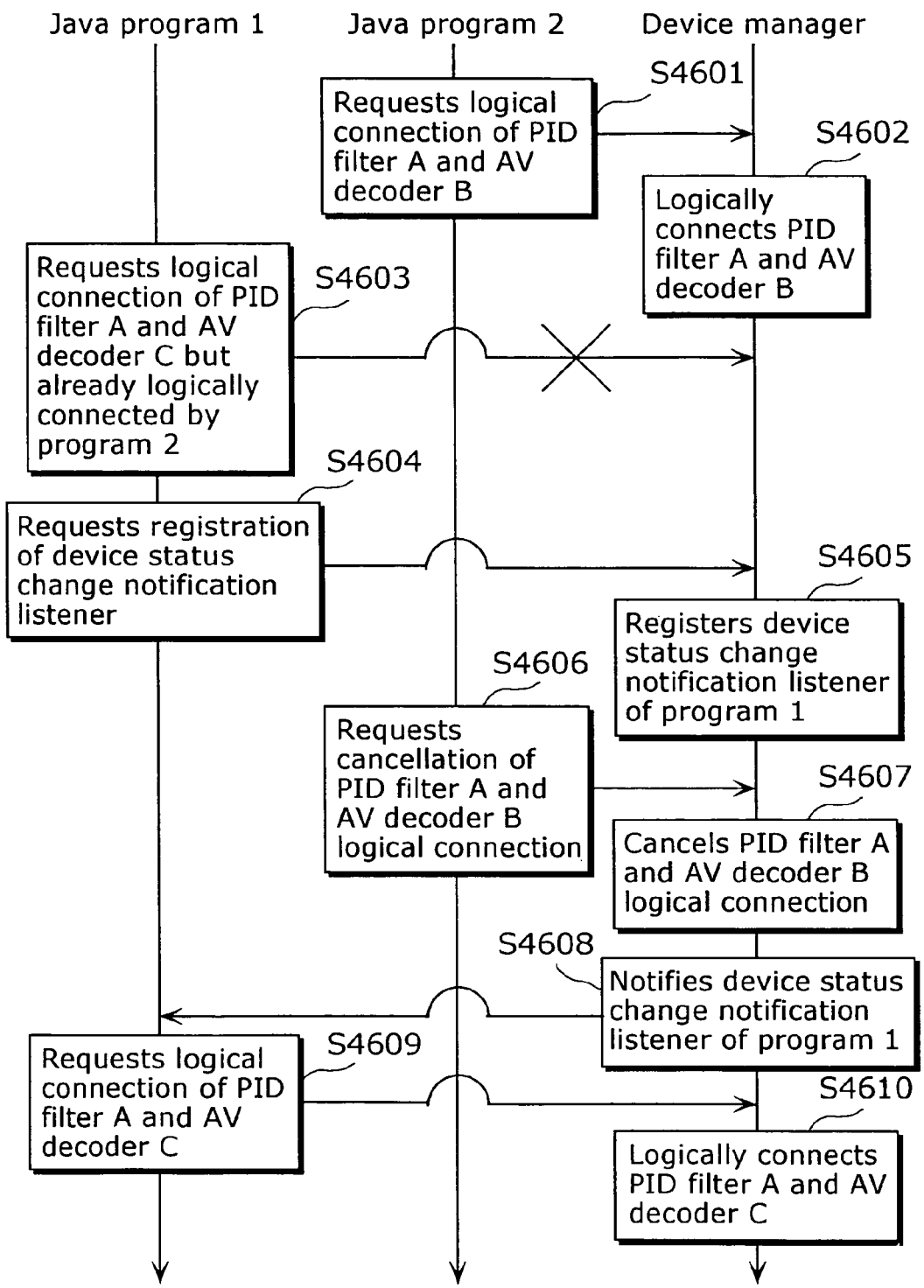
FIG. 48 shows the sequence during the operation of a plurality of programs, in the twenty-fifth embodiment of the present invention.

In the present embodiment, a device status change notification listener registration function is introduced, as the tenth function of the device manager 2205f. FIG. 48 shows an example of the use of the present function. First, a Java program 2 issues to the device manager 2205f, a "device logical connection request" for the PID filter A and the AV decoder B (S4601), and the logical connection is carried out (S4602). Subsequently, the Java program 1 issues a "device logical connection request" for the PID filter A and the AV decoder C, but the logical connection fails (S4603) as the Java program 2 is already performing the logical connection with regard to the PID filter. At this point, the Java program 1 designates a device status change notification listener and the PID filter A, and issues a "device status change notification listener registration request" (S4604). Upon receiving the "device status change notification listener registration request", the device manager 2205*f* groups the designated device status change notification listener and the device represented by the designated device object, and stores it in the device listener management unit. In the case of this example, the PID filter A and the device status change notification listener are grouped and stored in the device listener management unit (S4605). The Java program issues the device logical connection cancellation request for the PID filter A and the AV decoder B (S4606), and the device manager 2205*f* performs the connection cancellation (S4607). The device status change notification listener for the PID filter A is obtained from device listener management unit, and notification is carried out (S4608). In that state, as no one should be carrying out a logical connection on the PID filter A, the Java program 1 issues the "device logical connection request" for the PID filter A and the AV decoder C (S4609), and the device manager 2205*f* performs the logical connection (S4610).

Twenty-Sixth Embodiment

The broadcast receiving apparatus assumed in the present invention can simultaneously execute a plurality of Java programs. In addition, it is assumed that the individual Java programs hold a priority level. In a case such as this, from a device management viewpoint, it would be natural to assume that a logical connection path constructed by a Java program with a low priority level can be re-configured by a Java program with a high priority level. When a "device logical connection request" is issued to the device manager 2205*f*, in the case where it is for devices which are not yet logically connected, the device logical connection management unit 3204 records the priority level of the Java program that logically connects the devices on the occasion of the logical connection. In the case of a device which is already logically connected, the device manager 2205*f* checks the priority level of the Java program currently carrying out the logical connection, held by the device logical connection management unit 3204. In the case where the priority level of the Java program issuing the "device logical connection request" this time is higher, it changes the logical connection following the present command, and records the priority level of the new Java program in the device logical connection management unit 3204.

Figure 49:
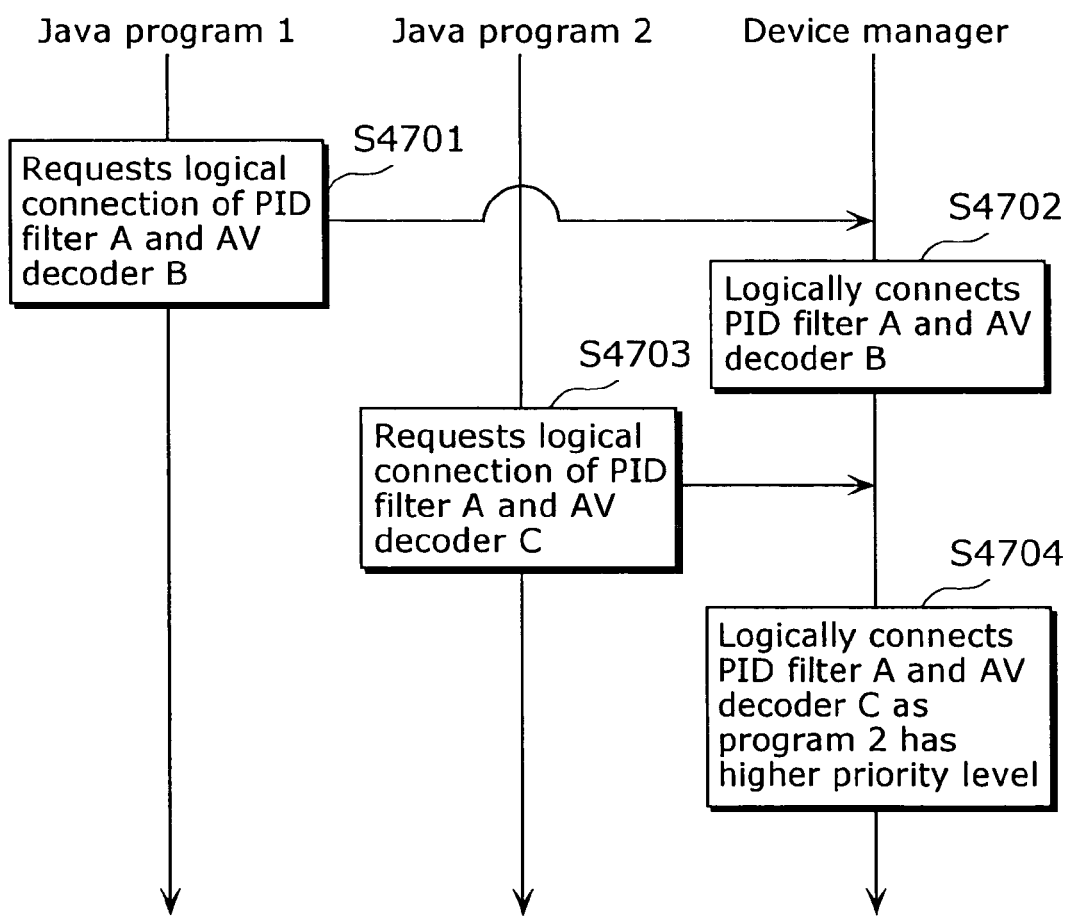
FIG. 49 shows the sequence of operation during the occurrence of a device connection conflict between programs, in the twenty-sixth embodiment of the present invention.

FIG. 49 shows a specific sequence. Assume that a Java program 1 and a Java program 2 are Java programs simultaneously operating on a broadcast receiving apparatus, with the Java program 2 having a higher priority level than the Java program 1. First, the Java program issues a "device logical connection request" for a PID filter A and an AV decoder B (S4701). Upon receiving this, the device manager 2205*f* logically connects the PID filter A and the AV decoder B, in accordance with the request (S4702). Subsequently, the Java program 2, which has a higher priority level than the Java program 1, issues a "device logical connection request" for the PID filter A and an AV decoder C (S4703). Upon receiving this, the device manager 2205*f*, finding out that the PID filter A is already connected to the AV decoder B, compares the priority levels of the Java program 1 which performed the already established logical connection, and the Java program 2 which issued the new logical connection request. As the priority level of the Java program 2 is higher, the device manager 2205*f* logically connects the PID filter A and an AV decoder C (S4704).

Twenty-Seventh Embodiment

In the twenty-sixth embodiment, although a device connection is changed implicitly, it becomes possible to receive a notification regarding the changing of the device logical connection path by a Java program other than itself by registering a device status change notification listener for the devices, at the time the Java program issues a "device logical connection request", or before a "device logical connection request" is issued.

In the present embodiment, the device listener management unit holds the device status change notification listener registered by the Java program. When the designated device is already logically connected when the device manager 2205*f* receives a "device logical connection request" from the Java program, and a change of the device logical connection path is carried out based on a priority level evaluation as in the twenty-sixth embodiment, if a device status change notification listener for the Java program which lost the device logical connection path is registered in the device listener management unit, an event is activated.

Figure 50:
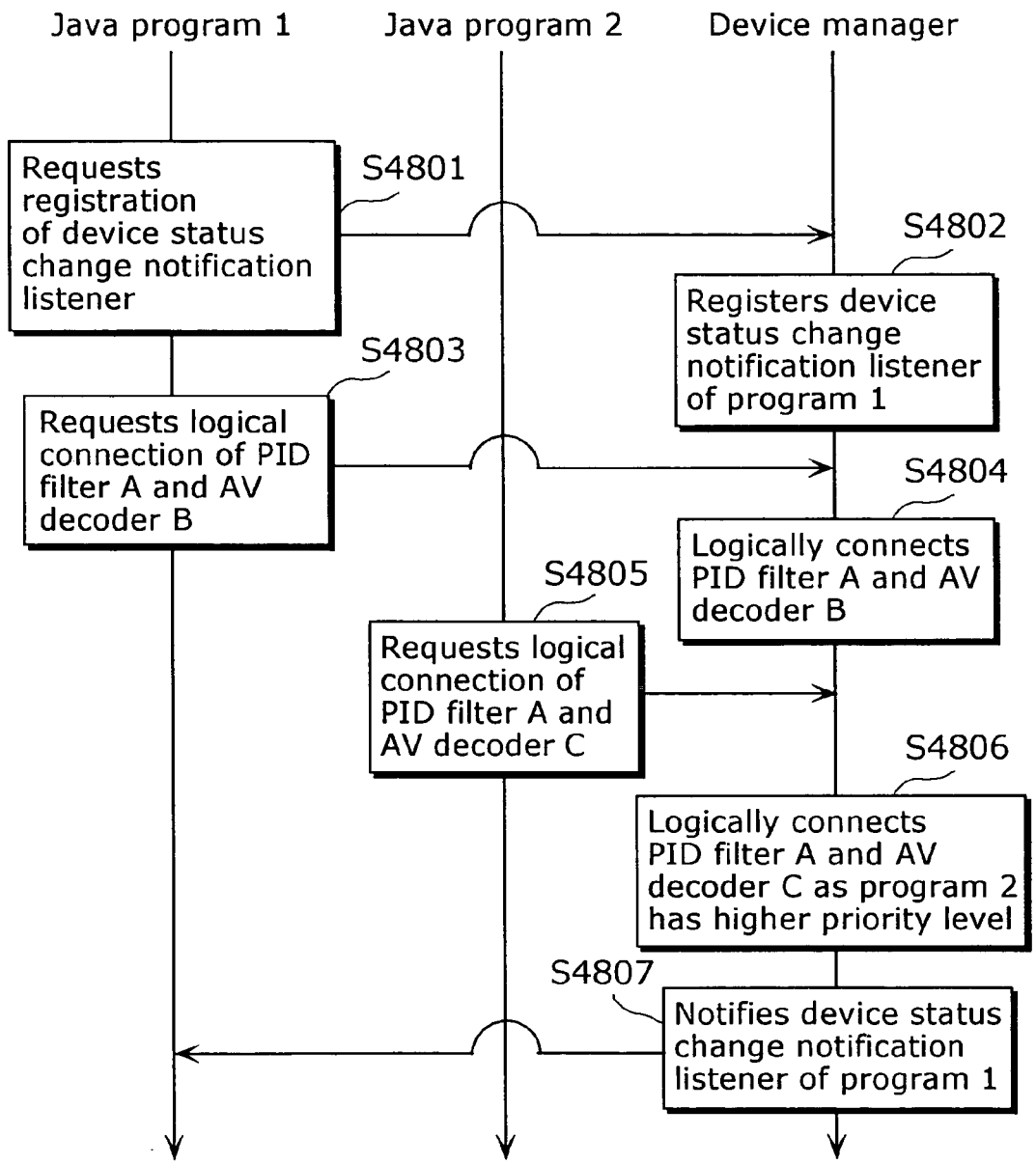
FIG. 50 shows the sequence of operation during the occurrence of a device connection conflict between programs, in the twenty-seventh embodiment of the present invention.

FIG. 50 shows a specific sequence. Assume that a Java program 1 and a Java program 2 are Java programs simultaneously operating on a broadcast receiving apparatus, with the Java program 2 having a higher priority level than the Java program 1. First, the Java program 1 issues, to the device manager 2205*f*, a "device status change notification listener registration request" for registering a device status change notification listener (S4801). Upon receiving the request, the device manager 2205*f* registers the device status change notification listener of the Java program 1 (S4802). Next, the Java program issues a "device logical connection request" for a PID filter A and an AV decoder B (S4803). Upon receiving this, the device manager 2205*f* performs the logical connection of the PID filter A and the AV decoder B, in accordance with the request (S4804). Subsequently, the Java program 2, which has a higher priority level than the Java program 1, issues a "device logical connection request" for the PID filter A and an AV decoder C (S4805). Upon receiving this, the device manager 2205*f*, finding out that the PID filter A is already connected to the AV decoder B, compares the priority levels of the Java program 1 which performed the already established logical connection, and the Java program 2 which issued the new logical connection request. As the priority level of the Java program 2 is higher, the device manager 2205*f* performs the logical connection of the PID filter A and the AV decoder C (S4806). In addition, as the Java program 1 has registered a device status change notification listener in the procedure S4801, the device manager sends notice that the PID filter A and the AV decoder B, connected by the Java program 1, has been performed of a logical connection cancellation (S4807).

Twenty-Eighth Embodiment

According to the twenty-seventh embodiment, by continuing the logical connection as is, the Java program which has lost a device logical connection to another Java program having a higher priority level can receive a usage possible notification using a device change notification listener, when the Java program taking possession concludes or performs logical connection cancellation. Even after the device manager 2205*f* carries out a re-configuration of the device logical connection path and notifies the Java program which lost the logical connection, the device logical connection management unit 3204 still holds the device status change notification listener of the Java program which lost the logical connection. Then, when the Java program taking possession has cancelled the logical connection or has concluded its execution, the device manager 2205*f* notifies anew, the Java program which lost possession.

Figure 51:
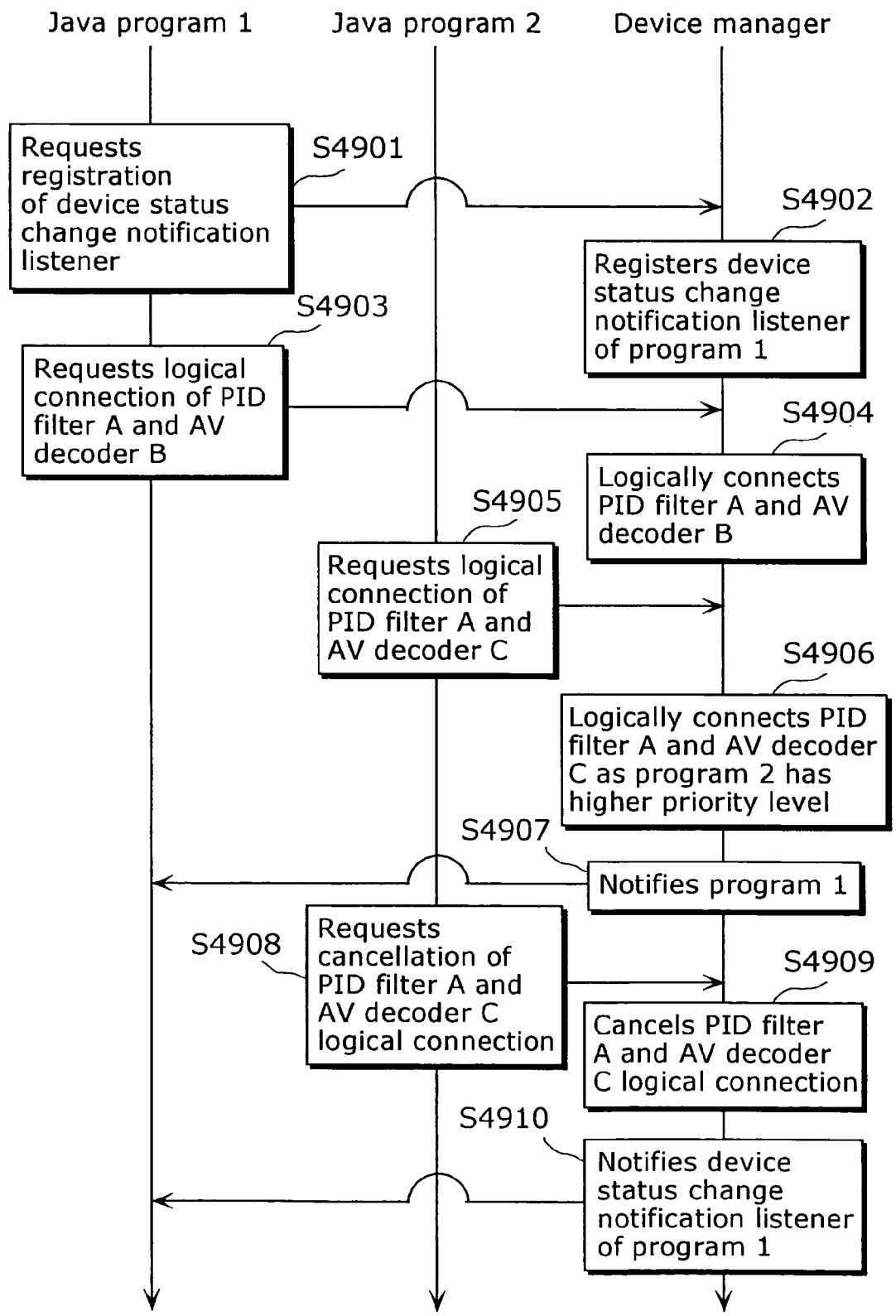
FIG. 51 shows the sequence of operation during the occurrence of a device connection conflict between programs, in the twenty-eighth embodiment of the present invention.

FIG. 51 shows a specific sequence. Assume that a Java program 1 and a Java program 2 are Java programs simultaneously operating on a broadcast receiving apparatus, with the Java program 2 having a higher priority level than the Java program 1. First, the Java program 1 issues, to the device manager 2205*f*, a "device status change notification listener registration request" for registering a device status change notification listener for receiving a device status change notice (S4901). Upon receiving the request, the device manager 2205*f* registers the device status change notification listener of the Java program 1 (S4902). Next, the Java program issues a "device logical connection request" for a PID filter A and an AV decoder B (S4903). Upon receiving this, the device manager 2205*f* performs the logical connection of the PID filter A and the AV decoder B, in accordance with the request (S4904). Subsequently, the Java program 2, which has a higher priority level than the Java program 1, issues a "device logical connection request" for the PID filter A and an AV decoder C (S4905). Upon receiving this, the device manager, finding out that the PID filter A is already connected to the AV decoder B, compares the priority levels of the Java program 1 which performed the already established logical connection, and the Java program 2 which issued the new logical connection request. As the priority level of the Java program 2 is higher, the device manager 2205*f* performs the logical connection of the PID filter A and an AV decoder C (S4906). In addition, as the Java program 1 has registered a device status change notification listener in the procedure S4901, the device manager 2205*f* sends notice that the PID filter A and the AV decoder B, connected by the Java program 1, has been performed of a logical connection cancellation (S4907). Subsequently, when the Java program 2 issues a "device logical connection cancellation request" for the PID filter A and the AV decoder C (S4908), the device manager 2205*f* cancels the logical connection of the PID filter A and the AV decoder C (S4909), and carries out a notification to the Java program 1 to the effect that a logical connection for the PID filter A is possible.

Moreover, in FIG. 51, after the PID filter A and the AV decoder C are logically connected following the request of the Java program 2, there are instances where the Java program 2 concludes execution for some reason, before canceling the logical connection. In such a case, as the device manager can be notified by the AM 5005*b* which performs application management, that the Java program 2 has concluded, and in that case, the logical connection established by the Java program 2 is performed of logical connection cancellation. On that occasion, in the case where competition with the Java program 1 had occurred, a status change notification is carried out to the device status change notification listener of the Java program 1.

Twenty-Ninth Embodiment

In the twenty-eighth embodiment, in the case where the Java program which took the logical connection of a device performs logical connection cancellation or concludes execution, only a notification to the Java program which lost possession is performed, although at this time, the previous logical connection is restored. In addition, at this time, in the case where the object of the previous logical connection is already being logically connected by a different Java program, judgment of priority level is also performed even at this stage. If the logical connection is restored, a notification to that effect is carried out to the Java program which lost possession.

Figure 52:
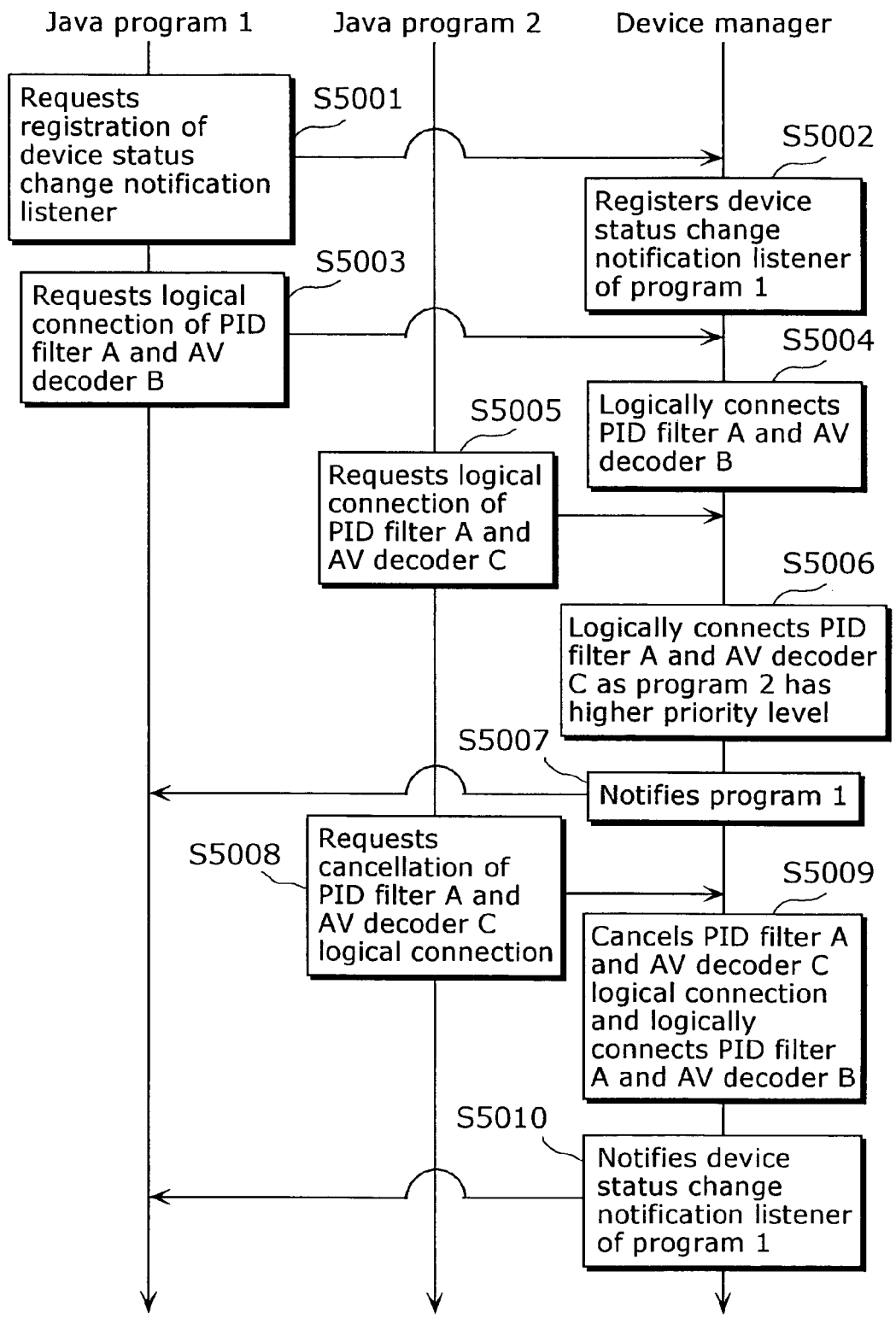
FIG. 52 shows the sequence of operation during the occurrence of a device connection conflict between programs, in the twenty-ninth embodiment of the present invention.

FIG. 52 shows a specific sequence. Assume that a Java program 1 and a Java program 2 are Java programs simultaneously operating on a broadcast receiving apparatus, with the Java program 2 having a higher priority level than the Java program 1. First, the Java program 1 issues, to the device manager 2205*f*, a "device status change notification listener registration request" for registering a device status change notification listener for receiving a device status change notification (S5001). Upon receiving the request, the device manager 2205*f* registers the device status change notification listener of the Java program 1 (S5002). Next, the Java program issues a "device logical connection request" for a PID filter A and an AV decoder B (S5003). Upon receiving this, the device manager 2205*f* performs the logical connection of the PID filter A and the AV decoder B, in accordance with the request (S5004). Subsequently, the Java program 2, which has a higher priority level than the Java program 1, issues a "device logical connection request" for the PID filter A and an AV decoder C (S5005). Upon receiving this, the device manager 2205*f*, finding out that the PID filter A is already connected to the AV decoder B, compares the priority levels of the Java program 1 which performed the already established logical connection, and the Java program 2 which issued the new logical connection request. As the priority level of the Java program 2 is higher, the device manager 2205*f* performs logical connection of the PID filter A and an AV decoder C (S5006). In addition, as the Java program 1 has registered a device status change notification listener in the procedure S5001, the device manager 2205*f* sends notice that the PID filter A and the AV decoder B, connected by the Java program 1, has been performed of a logical connection cancellation (S5007). Subsequently, when the Java program issues a "device logical connection cancellation request" for the PID filter A and the AV decoder C (S5008), the device manager 2205*f* cancels the logical connection of the PID filter A and the AV decoder C (S5009), and performs the re-connection of the PID filter A and the AV decoder B. It then carries out a notification to the Java program 1, to the effect that the re-connection of the PID filter A and the AV decoder B has been carried out (S5010).

Moreover, in FIG. 52, after the PID filter A and the AV decoder C are logically connected following the request of the Java program 2, there are instances where the Java program 2 concludes execution for some reason, before canceling the logical connection. In such a case, as the device manager can be notified by the AM 5005*b* which performs application management, that the Java program 2 has concluded, and in that case, the logical connection established by the Java program 2 is performed of logical connection cancellation. In the case where competition with the Java program 1 had occurred, the logical connection requested by that Java program is established again, and a status change notification is carried out to the device status change notification listener of the Java program 1.

Thirtieth Embodiment

In the first embodiment, the device logical connection management unit 3204 only manages device logical connection status. However, even with regard to devices which have been constructed of a device logical connection path by the performance of logical connection by the Java program, no effect is manifested unless they are being used. In the present embodiment, a device use status management unit is introduced, and the use status of devices is managed. During the issuance of a "device logical connection request" by the Java program, even if the existing connection is constructed by a low priority level Java program, re-construction of the connection is not carried out when the device manager 2205f inquires to the device use status management unit, and it is in use.

Thirty-First Embodiment

In the third embodiment, it is indicated that as long as devices exist within the broadcast receiving apparatus, information regarding such devices is handled by the respective units in the device manager 2205f by which the device manager 2205f can the manage logical connection. However, as in the device within the adapter in FIG. 15, there are also devices not previously existing in the broadcast receiving apparatus which are added on subsequently. With regard to this, the device manager 2205f within the broadcast receiving apparatus is unable to manage information on these devices, in advance.

In the present embodiment, the device manager 2205f performs management, even with regard to these devices. For that purpose a device description obtainment unit, a device description interpretation unit, and a device physical connection change obtainment unit are introduced within the device manager 2205f.

The device description obtainment unit possesses a function for obtaining a device description held by a newly added device, from such device. The device description obtainment unit is implemented as a library for reading a device description from a device. It is held by the ROM 1209, and used by the CPU 1506.

The device description interpretation unit interprets the device description obtained from the device, and rearranges it in a form which is understandable to the device manager 2205f. The device description interpretation unit is implemented as a library for interpreting device descriptions. It is held by the ROM 1509, and used by the CPU 1506.

The device physical connection change obtainment unit is used to obtain the changes in the physical connection relationship of devices located within the broadcast receiving apparatus, resulting from the addition of a device. The device manager 2205f realizes two functions using the device physical connection change obtainment unit. One is the detection of a change in the device configuration existing within the broadcast receiving apparatus. When a change in the device configuration (addition or removal of a device) occurs, the device manager 2205f is able to detect such change by receiving a notification from the device physical connection change obtainment unit. The other is the obtainment of a change in the physical connection configuration of devices. It becomes possible for the device manager 2205f to obtain the change in the physical connection configuration of devices. The device physical connection change obtainment unit is implemented as a library for obtaining changes in the physical connection of devices. It is held by the ROM 1509, and used by the CPU 1506.

A device description is held by the device that is added. Upon the start-up of the broadcast receiving apparatus, the device manager reads the device description of the connected device using the device description obtainment unit, and interprets using the device description interpretation unit. The interpreted information is subsequently set in the information of other modules within the broadcast receiving apparatus. A device description includes, a "device type character string" in particular, and if necessary, a "device logical connection condition" and a "device logical connection maximum number". "Device type" is managed by the device basic information management unit 3201. The "device logical connection condition" and the "device logical connection maximum number" represent the requirements prescribed in the hardware specification of the device that is added, and are managed by the device connection condition management unit and the device logical connection maximum number management unit. In addition, the device manager 2205f obtains the changed physical connections brought about by the addition of the device, through the device physical connection change obtainment unit, and sets this in the device physical connection management unit 3203. Hereinafter, the device manager 2205f can operate without modifying the implementation sequence of the functions of the device manager 2205f, defined in the first embodiment.

Thirty-Second Embodiment

Although the device description reading pattern is discussed in the thirty-first embodiment, in addition, in the present embodiment, a device description can be read during the start-up of the broadcast receiving apparatus. In this case, for example, in the case where the adapter 1511 in FIG. 15 is dynamically added, where in addition, a device which can be dynamically added is provided, the device manager 2205f detects this by receiving a notification from the device physical connection change obtainment unit, and the addition of the device is carried out in the same manner as in the thirty-first embodiment. Within such addition sequence, the device manager 2205f obtains the device description, carries out interpretation, and sets the information in each unit. In addition, it obtains the change in the physical configuration and sets this in the device physical connection management unit 3203. Through an implementation in this manner, the device manager 2205f can respond to the dynamic addition of connections.

Thirty-Third Embodiment

Although discussion regarding the dynamic addition of devices was made in the thirty-second embodiment, there are also many instances where, in such manner, devices that can be dynamically added are dynamically deleted. In such a case, the device manager 2205f detects this through the notification from the device physical connection change obtainment unit, and it sets the device physical configuration in the device physical connection management unit 3203, using the device physical connection change obtainment unit. In addition, among logical connections existing at that time, the logical connection for the devices using the deleted physical connection is automatically cancelled. At that point, if a device status change notification listener is registered, a notification, to the effect that the logical connection was automatically cancelled, is carried out to the Java program through the device status change notification listener.

As a result, the device manager 2205f can respond to the dynamic deletion of devices.

Thirty-Fourth Embodiment

In embodiments one to thirty-two, the devices managed by the device manager 2205f are treated as unit devices, with device objects as reference. For that reason, logical connection becomes a troublesome operation for the Java program, as individual devices have to be designated in the logical connection stage.

In the present embodiment, the concept of a "device set" which enables the collective handling of device groups is introduced, and it is assumed that the device object 2205f can receive inputs of an object representing a device set. A device set is defined as the collection of device objects, and in addition, the device set holds the sequence in which device objects are registered in the device set. In other words, a device set represents the "device string making up a device logical connection path". In the embodiments up to this point, during the use of each function of the device manager 2205f, it is only possible to represent the logical connection between two devices with the use of two device objects. In the present embodiment, during the use of the functions of the device manager 2205f, it is possible to assume the designated device logical connection path as a subject by designating the device set representing the "device logical connection path" structured from a plurality of devices. For example, in the case where data transmitted by an MPEG-2 section is obtained using a section filter, the device objects corresponding to each of the devices, namely the tuner, the PID filter, and the section filter, are obtained through the device manager 2205f. The device objects to be logically connected are set in the device set, in the desired logical connection sequence, and judgment of logical connectability as well as the performance of logical connection using such device set is made possible. At this point, the device manager 2205f only performs a logical connection using the respective devices within the device manager 2205f, when a device logical connection path can be established in the sequence in which the devices included in the device set are set. With this, the Java program is able to perform the logical connection itself, with ease.

Thirty-Fifth Embodiment

In the thirty-fourth embodiment, in the case where the Java program designates a device set and issues a "device logical connection request", the device manager 2205f only carries out a connection when logical connection is possible in the sequence in which the devices within the designated device set are set. In the present embodiment, in such a case, even if logical connection is not possible between all devices within the designated device set, logical connection is carried out for the segments which can be logically connected.

Thirty-Sixth Embodiment

In the thirty-fourth and thirty-fifth embodiments, the concept of the device set is introduced, and an implementation is done where devices of a plurality of types can be handled all at once. However, in the thirty-sixth embodiment, as a more advanced function, the device manager 2205f provides a function for carrying out the logical connection of devices through the designation of the object representing a function. For example, in the case where the section filter is used, in the thirty-fourth embodiment, the device objects corresponding to the individual devices are set in a device set, and it is necessary use such device set to perform the logical connection operation. However, in the thirty-sixth embodiment, it is assumed that a "function" can be designated to the device manager 2205f. For example, by designating a function such as "sorting of a W number of MPEG-2 sections is desired", and using the device logical connection function which is the sixth function of the device manager 2205f, the devices required for the designated "function" are automatically logically connected, and the device set holding the device objects corresponding to the devices within the device logical connection path actually established is returned. As a result, by designating the desired "function" itself, the Java program can acquire the device logical connection paths required for such function without having to know "which devices should be logically connected in which manner in order to realize a desired function".

In the present embodiment, a function object for representing a "function" is defined. The Java program sets the "function" that it needs to use in the function object. Such function object is designated to the device manager 2205f, and the function of the device manager 2205f is used.

There is a need for the device manager 2205f to derive the necessary device logical connection paths from the "function" held by the function object. In the present embodiment, a function interpretation unit is introduced into the device manager 2205f. The function interpretation unit is implemented as a library having the function for deriving the devices included in the device logical connection paths necessary to realize such function, when the device manager 2205f receives a function object. It is held in the ROM 1209 and used by the CPU 1206.

When function objects are designated during the use of its respective functions, the device manager 2205f derives the required devices using the function interpretation unit. The device manager 2205f applies the respective function, with regard to the devices acquired. For example, in the case where for instance, "sort W number of MPEG-2 sections" is designated when using the device logical connection function which is the sixth function, the device manager 2205f first uses the function interpretation unit to obtain all the devices necessary to establish the device logical connection path required to "sort W number of MPEG-2 sections", and establishes the device logical connection path.

Using the present function, the Java program is able to establish a device logical connection path by designating the "function" that it needs to use.

Thirty-Seventh Embodiment

In the first to thirty-sixth embodiments, the device logical connection paths that are established while the broadcast receiving apparatus is running are cancelled in the event of a broadcast receiving apparatus power cut-off, requiring the Java program in the broadcast receiving apparatus to carry out the device logical connections once again, upon re-starting. In the present embodiment, when power is applied to the broadcast receiving apparatus, the device manager 2205f automatically re-establishes the device logical connection paths that existed at the time the broadcast receiving apparatus was last shut down. For this reason, the device logical connection management unit 3204 is placed in the secondary storage unit 1207, so that the information managed by the device logical connection management unit 3204 is not erased, even when power is cut-off. When power is applied to the broadcast receiving apparatus, the device manager 2205f checks the device logical connection management unit 3204 present in the secondary storage unit 1207, and automatically performs the logical re-connection of the device logical connection paths that were still logically connected when the power source was cut-off.

Thirty-Eighth Embodiment

In the thirty-seventh embodiment, when power is applied to the broadcast receiving apparatus, the device logical connection paths during the last power cut-off are restored automatically. However, the Java program operating on the broadcast receiving apparatus has no means for recognizing which device logical connection path was restored. In the present embodiment, when power is applied to the broadcast receiving apparatus, the device logical connection paths found during the last power cut-off are automatically restored. At the same time, notification regarding the automatically restored devices is made upon the start of the Java program issuing the "device logical connection request" establishing the device logical connection paths that are automatically restored. This can be implemented through a procedure where, during the storage of device logical connection path information by the device logical connection management unit 3204 found in the secondary storage unit 1207, the identifier of the Java program issuing the request is stored at the same time, and during the restoration of the device logical connection paths when power is applied to the broadcast receiving apparatus, the Java program identifier is obtained, and notification is carried out if a matching Java program is operating.

In each of the previously mentioned embodiments, it is assumed that all broadcast receiving apparatuses execute programs written in the Java language. However, as the present invention is not dependent on the language, the present invention can be applied, in the same manner as in each of the embodiments mentioned previously, even in an environment where programs written in other languages are executed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The broadcast receiving apparatus relevant to the present invention realizes more detailed device management by providing the program operating on the broadcast receiving apparatus with a means for the connection/connection cancellation of devices present in a broadcast receiving apparatus. It enables the operation of a more high-functioned program on an information processing apparatus such as, a broadcast receiving apparatus such as a digital television, a personal computer, a mobile phone, and an apparatus that performs processing of data within recording media.

The invention claimed is:

1. A single broadcast receiving apparatus having a plurality of devices with specific functions controlled based on a request from an application program received via a broadcast, the single broadcast receiving apparatus comprising:
   a receiver, in the single broadcast receiving apparatus, that receives a broadcast signal which includes an application program and audio visual (AV) data;
   an extractor, in the single broadcast receiving apparatus, that extracts the application program included in the received broadcast signal;
   a program executor, in the single broadcast receiving apparatus, that executes the extracted application program;
   a device manager, in the single broadcast receiving apparatus, that manages the plurality of devices included inside the single broadcast receiving apparatus; and
   an audio visual data processor, in the single broadcast receiving apparatus, that processes the AV data included in the received broadcast signal,
   wherein the device manager includes:
   a device identifier notifier that notifies the application program of identifier device identifiers that each identify a corresponding one of the plurality of devices included inside the single broadcast receiving apparatus, based on the request from the application program executed by the program executor; and
   an information path setter that, when the application program which has been notified by the device identifier notifier designates at least two devices from among the plurality of devices included inside the single broadcast receiving apparatus, and sets an information transfer path between the designated at least two devices,
   the audio visual data processor is configured to process the AV data included in the received broadcast signal using the designated at least two devices between which the information transfer path has been set, and
   the information path setter sets an information transfer path in a designated sequence between devices having a plurality of device identifiers designated by the application program,
   wherein the device manager further includes a device shareability notifier that notifies the application program of whether or not a device specified by a device identifier designated by the application program can be set in a plurality of information transfer paths,
   wherein the device shareability notifier notifies the application program of whether or not a device specified by a device identifier designated by the application program can be set in a plurality of information transfer paths, by sending notice of a maximum number of information transfer paths in which the device can be set in.

2. The single broadcast receiving apparatus according to claim 1, wherein the device identifier notifier notifies the application program of the device identifiers corresponding to devices that are of a type designated by the application program.

3. The single broadcast receiving apparatus according to claim 1,
   wherein the device identifier notifier notifies the application program of the device identifiers corresponding to all devices that can be set in an information transfer path with a device specified by a device identifier designated by the application program.

4. The single broadcast receiving apparatus according to claim 1,
   wherein the device identifier notifier notifies the application program of the device identifiers corresponding to all devices that are set in an information transfer path with a device specified by a device identifier designated by the application program.

5. The single broadcast receiving apparatus according to claim 1,
   wherein the device identifier notifier notifies the application program of the device identifiers corresponding to devices that can be set in an information transfer path with a specified device, and at the same time, are not yet a part of an information transfer path, said specified device being specified by a device identifier designated by the application program.

6. The single broadcast receiving apparatus according to claim 1,
   wherein the device manager further includes a function interpreter that specifies devices that are necessary for realizing a greater function, based on a function identifier which indicates the greater function realized by a second plurality of the devices designated by the application program, and the information path setter sets an information transfer path between the devices specified by the function interpreter.

7. The single broadcast receiving apparatus according to claim 1,
wherein the application program receives a response from the device manager and synchronously resumes a process, when the application program makes a request to the device manager.

8. The single broadcast receiving apparatus according to claim 1,
wherein the application program asynchronously executes a process regardless of a response from the device manager, when the application program makes a request to the device manager.

9. The single broadcast receiving apparatus according to claim 1,
wherein the information path setter does not set a new information transfer path, in the case where any of a second plurality of devices designated by the application program is already set as a part of another information transfer path.

10. The single broadcast receiving apparatus according to claim 1,
wherein the information path setter notifies the application program of a process result indicating whether a setting of an information transfer path between a second plurality of devices designated by the application program succeeds or fails.

11. The single broadcast receiving apparatus according to claim 10,
wherein the information path setter notifies the application program of a reason for failure, in the case where the setting of the information transfer path between the second plurality of devices designated by the application program fails.

12. The single broadcast receiving apparatus according to claim 1,
wherein the device manager further includes an information path canceller that performs setting cancellation of the information transfer path set between the designated at least two devices, based on a request from the application program executed by the program executor.

13. The single broadcast receiving apparatus according to claim 12,
wherein the device identifier notifier notifies the application program executed by the program executor of device identifiers for identifying the plurality of devices, based on a request from the application program, and
the information path canceller performs setting cancellation of the information transfer path set in a designated sequence between devices designated by the application program using a plurality of device identifiers.

14. The single broadcast receiving apparatus according to claim 12,
wherein the device manager further includes a function interpreter that specifies devices that are necessary for realizing a greater function, based on a function identifier which indicates the greater function realized by a second plurality of the devices designated by the application program, and
the information path canceller performs setting cancellation of an information transfer path set between the devices specified by the function interpreter.

15. The single broadcast receiving apparatus according to claim 12,
wherein the information path canceller notifies the application program of a process result indicating whether a setting cancellation of an information transfer path between a second plurality of devices designated by the application program succeeds or fails.

16. The single broadcast receiving apparatus according to claim 15,
wherein the information path canceller notifies the application program of a reason for failure, in the case where the setting cancellation of the information transfer path between the second plurality of devices designated by the application program fails.

17. The single broadcast receiving apparatus according to claim 1,
wherein the device manager further includes a device number notifier that notifies the application program of a number of the plurality of devices existing in the single broadcast receiving apparatus, based on a request from the application program executed by the program executor.

18. The single broadcast receiving apparatus according to claim 17,
wherein the device number notifier notifies the application program of the number of the plurality of devices corresponding to a type of a device, said type being designated by the program.

19. The single broadcast receiving apparatus according to claim 1,
wherein the device manager further includes a path setting possibility notifier that notifies the application program of whether or not an information transfer path can be set between the devices, based on a request by the application program executed by the program executor.

20. The single broadcast receiving apparatus according to claim 19,
wherein the device identifier notifier notifies the application program executed by the program executor of device identifiers for identifying the plurality of devices, based on a request from the application program, and
the path setting possibility notifier notifies the application program of whether or not an information transfer path can be set in a designated sequence between devices designated by the application program using a plurality of device identifiers.

21. The single broadcast receiving apparatus according to claim 19,
wherein the device manager further includes a function interpreter that specifies devices that are necessary for realizing a greater function, based on a function identifier which indicates the greater function realized by a second plurality of the devices designated by the application program, and
the path setting possibility notifier notifies the application program of whether or not an information transfer path can be set between the devices specified by the function interpreter.

22. The single broadcast receiving apparatus according to claim 1,
wherein the device manager further includes a path status notifier that notifies the application program of whether or not an information transfer path is set between the designated at least two devices, based on a request from the application program executed by the program executor.

23. The single broadcast receiving apparatus according to claim 22, wherein the device identifier notifier notifies the application program executed by the program executor of device identifiers for identifying the plurality of devices, based on a request from the application program, and the path status notifier notifies the application program of whether or not an information transfer path is set in a designated sequence between the devices designated by the application program using a plurality of device identifiers.

24. The single broadcast receiving apparatus according to claim 22, wherein the device manager further includes a function interpreter that specifies devices that are necessary for realizing a greater function, based on a function identifier which indicates the greater function realized by a second plurality of the designated by the application program, and the path setting possibility notifier notifies the program of whether or not an information transfer path is set between the devices specified by the function interpreter.

25. The single broadcast receiving apparatus according to claim 1, wherein the information path setter always preferentially sets an information transfer path which has been requested first, in the case where setting of information transfer paths which include the same device are requested by a plurality of application programs executed by the program executor.

26. The single broadcast receiving apparatus according to claim 1, wherein the program executor manages priority levels among a plurality of application programs to be executed, and performs application program priority comparison using the priority levels.

27. The single broadcast receiving apparatus according to claim 26, wherein the information path setter always preferentially sets an information transfer path for an application program having a high priority level, in the case where setting of information transfer paths which include the same device are requested by a plurality of programs executed by the program executor.

28. The single broadcast receiving apparatus according to claim 26, wherein, in the case where, after setting an earlier information transfer path, a setting of an information transfer path including a device set in the earlier information transfer path is requested by another application program having a higher priority level than a priority level of an application program which requested the earlier transfer path, the information path setter sets the information transfer path requested by said another application program and notifies the application program which requested the earlier information transfer path about the setting.

29. The single broadcast receiving apparatus according to claim 28, wherein, in the case where the device set in the earlier information transfer path and then set in the information transfer path requested by said another application program becomes usable again, the information path setter notifies the application program which requested the earlier information transfer path that the device is usable again.

30. The single broadcast receiving apparatus according to claim 28, wherein, in the case where the device set in the earlier information transfer path, and then set in the information transfer path requested by said another application program becomes usable again, the information path setter resets the earlier information transfer path and notifies the application program which requested the earlier information transfer path, of the resetting.

31. The single broadcast receiving apparatus according to claim 1, wherein the device manager controls the device according to a request from the application program, and notifies the application program of information regarding the device according to a request from the application program.

32. An information processing method used in a single broadcast receiving apparatus having a plurality of devices with specific functions controlled based on a request from an application program received via a broadcast, the method comprising:

receiving a broadcast signal which includes an application program and audio visual (AV) data;

extracting the application program included in the received broadcast signal;

executing the extracted application program;

managing the plurality of devices included inside the single broadcast receiving apparatus; and processing the AV data included in the received broadcast signal, wherein the managing the plurality of devices includes notifying the application program of device identifiers that each identify a corresponding one of the plurality of devices included inside the single broadcast receiving apparatus, based on the request from the application program, and setting an information transfer path between at least two devices designated from among the plurality of devices included inside the single broadcast receiving apparatus, when the application program has been notified, in the processing of the AV data included in the received broadcast signal, the AV data, included in the received broadcast signal is processed using the designated at least two devices between which the information transfer path has been set, and in the setting of an information transfer path, an information transfer path is set in a designated sequence between devices having a plurality of device identifiers designated by the application program, wherein the device manager further includes a device shareability notifier that notifies the application program of whether or not a device specified by a device identifier designated by the application program can be set in a plurality of information transfer paths, wherein the device shareability notifier notifies the application program of whether or not a device specified by a device identifier designated by the application program can be set in a plurality of information transfer paths, by sending notice of a maximum number of information transfer paths in which the device can be set in.

33. A non-transitory computer readable medium that stores a program which causes a computer to perform information processing for a plurality of devices, included inside a single broadcast receiving apparatus, with specific functions, the computer readable medium comprising:

a receiving code segment, recorded on the computer readable medium, executable to receive a broadcast signal which includes an application program and audio visual (AV) data;

an extracting code segment, recorded on the computer readable medium, executable to extract the application program included in the received broadcast signal;

a program execution code segment, recorded on the computer readable medium, executable to execute an application program;

a device management code segment, recorded on the computer readable medium, executable to manage the plurality of devices included inside the single broadcast receiving apparatus; and an audio visual data processing code segment, recorded on the computer readable medium, executable to process the AV data included in the received broadcast signal, wherein the device management code segment further includes:

a device identifier notification code segment, recorded on the computer readable medium, executable to notify the application program of device identifiers each identifying a corresponding one of the plurality of devices included inside the single broadcast receiving apparatus, based on a request from the application program executed by the program execution code segment; and an information path setting code segment, recorded on the computer readable medium, executable to set, when the application program which has been notified by the device identifier notification code segment designates at least two devices from among the plurality of devices included inside the single broadcast receiving apparatus, an information transfer path between the designated devices, wherein the AV data included in the received broadcast signal is processed using the at least two devices between which the information transfer path has been set, and the information path setting code segment is executable to set an information transfer path in a designated sequence between devices having a plurality of device identifiers designated by the application program, wherein the device manager further includes a device shareability notifier that notifies the application program of whether or not a device specified by a device identifier designated by the application program can be set in a plurality of information transfer paths, wherein the device shareability notifier notifies the application program of whether or not a device specified by a device identifier designated by the application program can be set in a plurality of information transfer paths, by sending notice of a maximum number of information transfer paths in which the device can be set in.

* * * * *